United States Patent
Luo et al.

(10) Patent No.: US 11,115,972 B2
(45) Date of Patent: Sep. 7, 2021

(54) TECHNIQUES FOR UPDATING RESOURCE TYPES

(71) Applicant: QUALCOMM Incorporated, San Diego, CA (US)

(72) Inventors: Jianghong Luo, Skillman, NJ (US); Navid Abedini, Somerset, NJ (US); Muhammad Nazmul Islam, Littleton, MA (US); Luca Blessent, Whitehouse Station, NJ (US); Tao Luo, San Diego, CA (US); Junyi Li, Chester, NJ (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/667,607

(22) Filed: Oct. 29, 2019

(65) Prior Publication Data

US 2020/0145965 A1 May 7, 2020

Related U.S. Application Data

(60) Provisional application No. 62/755,133, filed on Nov. 2, 2018.

(51) Int. Cl.
*H04W 72/04* (2009.01)
*H04W 76/36* (2018.01)
(Continued)

(52) U.S. Cl.
CPC ..... *H04W 72/042* (2013.01); *H04W 72/0413* (2013.01); *H04W 76/36* (2018.02); *H04W 92/12* (2013.01); *H04W 92/20* (2013.01)

(58) Field of Classification Search
CPC ........... H04W 72/042; H04W 72/0413; H04W 72/04; H04W 72/12; H04W 72/1278;
(Continued)

(56) References Cited

U.S. PATENT DOCUMENTS

| | | | | |
|---|---|---|---|---|
| 2013/0136110 A1* | 5/2013 | Yamamoto | ............ | H04L 1/0026 370/336 |
| 2013/0272293 A1* | 10/2013 | Nguyen | ................ | H04W 74/02 370/347 |

(Continued)

FOREIGN PATENT DOCUMENTS

WO    WO-2018026466 A1    2/2018

OTHER PUBLICATIONS

AT&T: "Enhancements to Support NR Backhaul Links," 3GPP Draft, 3GPP TSG RAN WG1 Meeting #94bis, R1-1810690, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051518094, 15 pages, Retrieved from the Internet: URL: http://www.3gpp.org/ftp/tsg_ran/WG1_RL1/TSGR1_94b/Docs/R1-1810690.zip [retrieved on Sep. 29, 2018] Chapter 2.3 "Frame Structure Design and Backhaul Multiplexing".

(Continued)

*Primary Examiner* — Un C Cho
*Assistant Examiner* — Rasha K Fayed
(74) *Attorney, Agent, or Firm* — Holland & Hart LLP

(57) ABSTRACT

A parent access node may establish a first link with a child access node. In some cases, the parent access node may determine to release a resource of the first. The parent access node may transmit downlink signaling indicating release of the resource. As such, the child node may schedule a child link resource (e.g., a parent-controlled resource) correspond- (Continued)

ing to the released resource. The child node may then communicate with a child node of its own in accordance with the scheduling of the child link resource. In some cases, the resource release indication may be associated with a one-time resource release, or may be associated with a semi-persistent release (e.g., until the parent node reclaims the released resources). In some examples, the child node may transmit an uplink message to request resources from the parent node (e.g., and the resource release may be based on the request).

31 Claims, 28 Drawing Sheets

(51) Int. Cl.
*H04W 92/20* (2009.01)
*H04W 92/12* (2009.01)

(58) Field of Classification Search
CPC ......... H04W 72/0446; H04W 72/1289; H04W 72/1226; H04W 72/1242; H04W 72/082; H04W 72/1231; H04W 72/08; H04W 72/0406; H04W 72/0493; H04W 72/1268; H04W 72/1273; H04W 72/14; H04W 72/1257; H04W 72/0426; H04W 72/048; H04W 72/0433; H04W 72/1215; H04W 76/36; H04W 92/20; H04W 92/10; H04W 16/04; H04W 84/047; H04W 24/10; H04W 28/0236; H04W 28/04; H04W 74/0833; H04W 74/08; H04W 74/04; H04W 74/085; H04W 56/0015; H04L 5/0058; H04L 5/023; H04L 5/0048; H04L 1/003; H04L 1/0025; H04L 1/0004; H04L 1/0007; H04L 1/001; H04L 1/0013; H04L 1/0039; H04L 1/1607; H04L 27/0006; H04B 7/0617
See application file for complete search history.

(56) References Cited

U.S. PATENT DOCUMENTS

| | | | | |
|---|---|---|---|---|
| 2017/0346616 | A1* | 11/2017 | Liu | H04L 5/0005 |
| 2017/0353863 | A1* | 12/2017 | Shi | H04W 16/02 |
| 2018/0160406 | A1* | 6/2018 | Hao | H04W 16/14 |
| 2018/0368175 | A1* | 12/2018 | Jeon | H04W 72/04 |
| 2019/0132824 | A1* | 5/2019 | Jeon | H04L 5/0092 |
| 2019/0174466 | A1* | 6/2019 | Zhang | H04L 5/0048 |
| 2019/0306924 | A1* | 10/2019 | Zhang | H04W 72/046 |
| 2019/0349079 | A1* | 11/2019 | Novlan | H04B 7/15542 |
| 2020/0008146 | A1* | 1/2020 | Uhling | H04W 72/1205 |
| 2020/0092880 | A1* | 3/2020 | Choi | H04L 5/0094 |

OTHER PUBLICATIONS

Ericsson: "Summary of 7.2.3.1 Enhancements to Support NR Backhaul Links", 3GPP Draft, 3GPP TSG RAN WG1 Meeting #94bis, R1-1811844, 3rd Generation Partnership Project (3GPP), Mobile Competence Centre, 650, Route Des Lucioles, F-06921 Sophia-Antipolis Cedex, France vol. RAN WG1, No. Chengdu, China, Oct. 8, 2018-Oct. 12, 2018, Oct. 9, 2018, XP051519169, 21 pages, Retrieved from the Internet: URL:http://www.3gpp.org/ftp/tsg%5Fran/WG1%5FRL1/TSGR1%5F94b/Docs/R1%2D1811844%2Ezip [retrieved on Oct. 9, 2018], Chapter 3 "Dynamic Resource Allocation between Backhaul and Access Links".
International Search Report and Written Opinion—PCT/US2019/058900—ISA/EPO—dated Feb. 5, 2020 (190286WO).
LG Electronics: "Discussions on Mechanisms to Support NR IAB Scenarios," 3GPP Draft, 3GPP TSG RAN WG1 Meeting #94bis, R1-1810273, Discussions on NR IAB Support_VO, 3rd Generation Partnership Project, (3gpp), Mobile Competence Centre ; 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051517687, 7 pages, Retrieved from the Internet: URL: http://www.3gpp.org/ftp/tsg%5Fran/WG1%5FRL1/TSGR1%5F94b/Docs/R1%2D1810273%2Ezip [retrieved on Sep. 29, 2018] Chapter 6 "Access and backhaul Timing," Chapter 7 "TDM Patterns".
Qualcomm Incorporated: "Resource Management in IAB Network," 3GPP Draft, 3GPP TSG RAN WG1 Meeting #94bis, R1-1811258, 3rd Generation Partnership Project (3GPP), Mobile Competence Centre ; 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051518661, 8 pages, Retrieved from the Internet:URL: http://www.3gpp.org/ftp/tsg%5Fran/WG1%5FRL1/TSGR1%5F94b/Docs/R1%2D1811258%2Ezip [retrieved on Sep. 29, 2018] Chapter 2.1 "Indication of Resource Partition Pattern", 2.2 Interaction between Resource Partition Pattern and Rel15 Resource Allocation, Chapter 2.3 "Dynamic Coordination with Extended SFI and UL Feedback", Chapter 3 "Conclusion".

* cited by examiner

Periodic GC-PDCCH

Periodic GC-PDCCH

TECHNIQUES FOR UPDATING RESOURCE TYPES

CROSS REFERENCE

The present application for patent claims the benefit of U.S. Provisional Patent Application No. 62/755,133 by LUO, et al., entitled "TECHNIQUES FOR UPDATING RESOURCE TYPES," filed Nov. 2, 2018, assigned to the assignee hereof, and expressly incorporated herein.

BACKGROUND

The following relates generally to wireless communications, and more specifically to techniques for updating resource types.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communications systems may include access nodes to facilitate wireless communication between user equipment and a network. For example, an LTE or NR base station may provide a mobile device access to the internet via the wireless network. Access nodes typically have a high-capacity, wired, backhaul connection (e.g., fiber) to the network. In some deployments, however, it may be desirable to deploy a larger number of access nodes in a small area to provide acceptable coverage to users. In such deployments, it may be impractical to connect each access node to the network via a wired connection, and certain networks or portions thereof may be configured as integrated access and backhaul (IAB) networks where one or more access nodes have wireless backhaul connections to the network. Efficient deployment and operation of such access nodes with wireless backhaul connections may be desirable to enable efficient backhaul connections and enhance end user coverage.

SUMMARY

The described techniques relate to improved methods, systems, devices, and apparatuses that support techniques for updating resource types. Generally, the described techniques provide for improved resource management (e.g., in an integrated access and backhaul (IAB) network) as well as efficient slot format updating.

Network devices within a wireless communications system (e.g., within an IAB network) may communicate according to some synchronized frame structure. In some examples, resources (e.g., corresponding to the synchronized frame structure) may be allocated (and in some cases provisionally allocated) to different wireless communication links to support relay of communications throughout the network. Techniques for improved resource management (e.g., techniques for updating resource types, techniques for resource release, techniques for resource return/reclaim, etc.) are shown and described.

A parent access node may establish a first link with a child access node. In some cases (e.g., when the child node is capable of half-duplex communications), the parent access node may determine to release a resource of the first link (e.g., such that the child node may communicate on its own child link). The parent access node may transmit downlink signaling indicating release of the resource. As such, the child node may schedule a child link resource (e.g., a parent-controlled resource) corresponding to the released resource. The child node may then communicate with a child node of its own (e.g., a grandchild of the parent node) in accordance with the scheduling of the child link resource. In some cases, the downlink signaling indicating release of the resource (e.g., the resource release indication) may be associated with a one-time resource release, or may be associated with a semi-persistent release (e.g., the resources may be released until the parent node reclaims the released resources via a physical downlink control channel (PDCCH) message or a downlink medium access control (MAC) control element (CE)). In some cases, the child node may transmit an uplink message to the parent node indicating that some or all of the released resources will not be used (e.g., the child node may return some or all of the resources released by the parent node).

Other aspects of the described techniques are directed to efficient slot format updating. In some cases, transmission time interval (TTI) formatting (e.g., uplink, downlink, or flexible directionality) may be indicated and/or configured via a slot format indicator (SFI) included in periodic group-common physical downlink control channel (GC-PDCCH) signaling. Techniques for updating SFI, as well as techniques for using SFI to release and reclaim resources are shown and described.

A network device (e.g., such as a base station, an IAB node, and IAB donor, a parent access node, etc.) may transmit a TTI format indicator (e.g., an SFI via GC-PDCCH) to a second device that indicates a TTI format (e.g., a slot format) and a number of TTIs to which the TTI format applies. In some cases, the number of TTIs associated with the TTI format indicator may exceed the periodicity of the GC-PDCCH. The network device may select a second TTI format (e.g., due to changing traffic load conditions, the presence of bursty traffic, etc.), and may transmit a second TTI format indicator to the second device (e.g., at a next GC-PDCCH occasion that occurs prior to the expiration of the first TTI format indicator) that overwrites the first TTI format indicator over some overlap region. As such, the network device and the second device may communicate in accordance with the updated TTI format indicator for at least a portion of the overlap region (e.g., at least a portion of the TTIs where first TTI format indicator and the second TTI format indicator overlap). In some cases, the second TTI format indicator may be used to reclaim resources previously released.

A method of wireless communication by an access node is described. The method may include receiving downlink signaling indicating a resource release for a resource of a first link configured between a parent access node and the access node, scheduling a parent-controlled resource corresponding to the resource of a second link configured between the access node and a child access node based on the downlink signaling, and communicating with the child access node via the parent-controlled resource based on the scheduling.

An apparatus for wireless communication by an access node is described. The apparatus may include a processor, memory in electronic communication with the processor, and instructions stored in the memory. The instructions may be executable by the processor to cause the apparatus to receive downlink signaling indicating a resource release for a resource of a first link configured between a parent access node and the access node, schedule a parent-controlled resource corresponding to the resource of a second link configured between the access node and a child access node based on the downlink signaling, and communicate with the child access node via the parent-controlled resource based on the scheduling.

Another apparatus for wireless communication by an access node is described. The apparatus may include means for receiving downlink signaling indicating a resource release for a resource of a first link configured between a parent access node and the access node, scheduling a parent-controlled resource corresponding to the resource of a second link configured between the access node and a child access node based on the downlink signaling, and communicating with the child access node via the parent-controlled resource based on the scheduling.

A non-transitory computer-readable medium storing code for wireless communication by an access node is described. The code may include instructions executable by a processor to receive downlink signaling indicating a resource release for a resource of a first link configured between a parent access node and the access node, schedule a parent-controlled resource corresponding to the resource of a second link configured between the access node and a child access node based on the downlink signaling, and communicate with the child access node via the parent-controlled resource based on the scheduling.

In some examples of the method, apparatuses, and non-transitory computer-readable medium described herein, receiving the downlink signaling further may include operations, features, means, or instructions for receiving the downlink signaling indicating timing information corresponding to the resource release, where the scheduling of the parent-controlled resource of the second link may be based on the timing information. In some examples of the method, apparatuses, and non-transitory computer-readable medium described herein, receiving the downlink signaling further may include operations, features, means, or instructions for receiving the downlink signaling indicating the timing information that indicates a single time period for the resource release. In some examples of the method, apparatuses, and non-transitory computer-readable medium described herein, receiving the downlink signaling further may include operations, features, means, or instructions for receiving the downlink signaling indicating the timing information that indicates a semi-persistent time period for the resource release.

Some examples of the method, apparatuses, and non-transitory computer-readable medium described herein may further include operations, features, means, or instructions for receiving second downlink signaling indicating that at least a portion of a resource corresponding to the resource release may be being reclaimed, and updating scheduling of the parent-controlled resource based on the second downlink signaling. Some examples of the method, apparatuses, and non-transitory computer-readable medium described herein may further include operations, features, means, or instructions for transmitting an uplink message indicating that at least a portion of a resource corresponding to the resource release may be not being used.

In some examples of the method, apparatuses, and non-transitory computer-readable medium described herein, the uplink message may be a physical uplink control channel message or an uplink medium access control message. Some examples of the method, apparatuses, and non-transitory computer-readable medium described herein may further include operations, features, means, or instructions for indicating a request to use the parent-controlled resource, where the receiving the downlink signaling may be based on the indicating. In some examples of the method, apparatuses, and non-transitory computer-readable medium described herein, indicating the request further may include operations, features, means, or instructions for transmitting the request as a physical uplink control channel message, an uplink medium access control message, or a radio resource control message.

In some examples of the method, apparatuses, and non-transitory computer-readable medium described herein, indicating the request further may include operations, features, means, or instructions for transmitting at least one of a traffic load indicator or a resource utilization indicator to indicate the request. In some examples of the method, apparatuses, and non-transitory computer-readable medium described herein, scheduling the parent-controlled resource further may include operations, features, means, or instructions for scheduling a set of distributed units of the access node based on the downlink signaling. In some examples of the method, apparatuses, and non-transitory computer-readable medium described herein, scheduling the parent-controlled resource further may include operations, features, means, or instructions for identifying a subset of a set of distributed units of the access node to which the downlink signaling corresponds, and scheduling the subset of the set of distributed units of the access node based on the downlink signaling.

In some examples of the method, apparatuses, and non-transitory computer-readable medium described herein, scheduling the parent-controlled resource of a second link further may include operations, features, means, or instructions for receiving a semi-static resource pattern for the parent access node and for each additional parent access node of the access node, identifying that a resource type of a resource corresponding to the resource release for the each additional parent access node may be a not available resource type, and scheduling the subset of the set of distributed units of the access node based on the downlink signaling and the resource type. In some examples of the method, apparatuses, and non-transitory computer-readable medium described herein, scheduling the parent-controlled resource further may include operations, features, means, or instructions for receiving a semi-static resource pattern for the parent access node and for each additional parent access node of the access node, and determining a resource type for a corresponding resource for the each additional parent access node based on the semi-static resource pattern.

In some examples of the method, apparatuses, and non-transitory computer-readable medium described herein, scheduling the parent-controlled resource further may include operations, features, means, or instructions for monitoring for second downlink signaling indicating a second resource release for a third link between the at least one additional parent access node and the access node based on the resource type, and determining to schedule the parent-controlled resource based on receiving the second downlink signaling indicating the second resource release. In some examples of the method, apparatuses, and non-transitory computer-readable medium described herein, scheduling the soft resources of a second link further may include operations, features, means, or instructions for monitoring for second downlink signaling indicating a second resource release for a third link between the at least one additional parent access node and the access node based on the resource type, and determining not to schedule the parent-controlled resource based on determining that the second downlink signaling may have not been received.

In some examples of the method, apparatuses, and non-transitory computer-readable medium described herein, scheduling the parent-controlled resource further may include operations, features, means, or instructions for receiving child access node information corresponding to a child access node of the parent access node, where the parent-controlled resource may be scheduled based on the child access node information. Some examples of the method, apparatuses, and non-transitory computer-readable medium described herein may further include operations, features, means, or instructions for determining that a second child link may have been established with a second child access node, and transmitting, to the child access node, second child access node information of the second child access node.

In some examples of the method, apparatuses, and non-transitory computer-readable medium described herein, transmitting the second child access node information further may include operations, features, means, or instructions for transmitting the second child access node information indicating a resource pattern of a distributed unit of the access node for the second child access node. In some examples of the method, apparatuses, and non-transitory computer-readable medium described herein, transmitting the second child access node information further may include operations, features, means, or instructions for transmitting the second child access node information indicating a dynamic downlink indication for controlling a resource of the second child access node. In some examples of the method, apparatuses, and non-transitory computer-readable medium described herein, transmitting the second child access node information further may include operations, features, means, or instructions for transmitting the second child access node information indicating a semi-static slot format configuration or a dynamic slot format configuration of the second child access node.

In some examples of the method, apparatuses, and non-transitory computer-readable medium described herein, transmitting the second child access node information further may include operations, features, means, or instructions for transmitting the second child access node information indicating a semi-static resource allocation or a dynamic resource allocation scheduled by a grant for the second child access node. In some examples of the method, apparatuses, and non-transitory computer-readable medium described herein, the downlink signaling indicating the resource release may be a TTI format indicator message (e.g., a slot format indicator (SFI) message) carried by a group-common physical downlink control channel, a downlink control information scheduling grant carried by a physical downlink control channel, or a MAC CE.

A method of wireless communication by a parent access node is described. The method may include establishing a first link between the parent access node and a child access node, determining to release a resource of the first link that corresponds to a parent-controlled resource of the child access node, and transmitting downlink signaling indicating release of the resource.

An apparatus for wireless communication by a parent access node is described. The apparatus may include a processor, memory in electronic communication with the processor, and instructions stored in the memory. The instructions may be executable by the processor to cause the apparatus to establish a first link between the parent access node and a child access node, determine to release a resource of the first link that corresponds to a parent-controlled resource of the child access node, and transmit downlink signaling indicating release of the resource.

Another apparatus for wireless communication by a parent access node is described. The apparatus may include means for establishing a first link between the parent access node and a child access node, determining to release a resource of the first link that corresponds to a parent-controlled resource of the child access node, and transmitting downlink signaling indicating release of the resource.

A non-transitory computer-readable medium storing code for wireless communication by a parent access node is described. The code may include instructions executable by a processor to establish a first link between the parent access node and a child access node, determine to release a resource of the first link that corresponds to a parent-controlled resource of the child access node, and transmit downlink signaling indicating release of the resource.

In some examples of the method, apparatuses, and non-transitory computer-readable medium described herein, transmitting the downlink signaling further may include operations, features, means, or instructions for transmitting the downlink signaling indicating timing information for the release of the resource. In some examples of the method, apparatuses, and non-transitory computer-readable medium described herein, the timing information indicates a single time period or a semi-persistent time period for the resource release. Some examples of the method, apparatuses, and non-transitory computer-readable medium described herein may further include operations, features, means, or instructions for transmitting second downlink signaling indicating that at least a portion of a resource corresponding to the resource release may be being reclaimed. Some examples of the method, apparatuses, and non-transitory computer-readable medium described herein may further include operations, features, means, or instructions for receiving an uplink message indicating that at least a portion of the resource may be not being used, and scheduling a transmission via the at least the portion of the resource.

In some examples of the method, apparatuses, and non-transitory computer-readable medium described herein, the uplink message may be a physical uplink control channel message or an uplink medium access control message. Some examples of the method, apparatuses, and non-transitory computer-readable medium described herein may further include operations, features, means, or instructions for receiving an indication of a request for the parent-controlled resource, where transmitting the downlink signaling may be based on the indication. In some examples of the method, apparatuses, and non-transitory computer-readable medium described herein, receiving the indication of the request further may include operations, features, means, or instructions for receiving the request as a physical uplink control channel message, an uplink medium access control message, or a radio resource control message.

In some examples of the method, apparatuses, and non-transitory computer-readable medium described herein, receiving the indication of the request further may include operations, features, means, or instructions for receiving at least one of a traffic load indicator or resource utilization indicator to indicate the request, where transmitting the downlink signaling may be based on receiving the traffic load indicator or the resource utilization indicator. In some examples of the method, apparatuses, and non-transitory computer-readable medium described herein, the downlink signaling indicates at least one distributed unit of the child access node to which the downlink signaling applies. Some examples of the method, apparatuses, and non-transitory computer-readable medium described herein may further include operations, features, means, or instructions for transmitting a semi-static resource pattern of the parent access node to the child access node.

Some examples of the method, apparatuses, and non-transitory computer-readable medium described herein may further include operations, features, means, or instructions for transmitting, to the child access node, child access node information corresponding to a second child access node of the parent access node. In some examples of the method, apparatuses, and non-transitory computer-readable medium described herein, the downlink signaling indicating the resource release may be a TTI indicator message carried by a group-common physical downlink control channel, a downlink control information scheduling grant carried by a physical downlink control channel, or a medium access control MAC CE.

A method of wireless communication by an access node is described. The method may include receiving, via a group-common control channel, a TTI format indicator, identifying a TTI format and a number of TTIs to which the TTI format applies based on the TTI format indicator, the number of TTIs exceeding a periodicity of the group-common control channel, updating the TTI format indicator for a subset of the number of TTIs, and communicating in accordance with the updated TTI format indicator for the subset of the number of TTIs.

An apparatus for wireless communication by an access node is described. The apparatus may include a processor, memory in electronic communication with the processor, and instructions stored in the memory. The instructions may be executable by the processor to cause the apparatus to receive, via a group-common control channel, a TTI format indicator, identify a TTI format and a number of TTIs to which the TTI format applies based on the TTI format indicator, the number of TTIs exceeding a periodicity of the group-common control channel, update the TTI format indicator for a subset of the number of TTIs, and communicate in accordance with the updated TTI format indicator for the subset of the number of TTIs.

Another apparatus for wireless communication by an access node is described. The apparatus may include means for receiving, via a group-common control channel, a TTI format indicator, identifying a TTI format and a number of TTIs to which the TTI format applies based on the TTI format indicator, the number of TTIs exceeding a periodicity of the group-common control channel, updating the TTI format indicator for a subset of the number of TTIs, and communicating in accordance with the updated TTI format indicator for the subset of the number of TTIs.

A non-transitory computer-readable medium storing code for wireless communication by an access node is described. The code may include instructions executable by a processor to receive, via a group-common control channel, a TTI format indicator, identify a TTI format and a number of TTIs to which the TTI format applies based on the TTI format indicator, the number of TTIs exceeding a periodicity of the group-common control channel, update the TTI format indicator for a subset of the number of TTIs, and communicate in accordance with the updated TTI format indicator for the subset of the number of TTIs.

In some examples of the method, apparatuses, and non-transitory computer-readable medium described herein, the updating further may include operations, features, means, or instructions for receiving, via a downlink control channel, downlink control information including a cancellation indicator that indicates to cancel the TTI format indicator for the subset of the number of TTIs. In some examples of the method, apparatuses, and non-transitory computer-readable medium described herein, communicating in accordance with the updated TTI format indicator further may include operations, features, means, or instructions for determining not to communicate within the subset of the number of TTIs based on the updated TTI format indicator. In some examples of the method, apparatuses, and non-transitory computer-readable medium described herein, updating the TTI format indicator further may include operations, features, means, or instructions for updating the TTI format indicator to a default TTI format for the subset of the number of TTIs.

In some examples of the method, apparatuses, and non-transitory computer-readable medium described herein, updating the TTI format indicator further may include operations, features, means, or instructions for receiving, via a second instance of the group-common control channel, a second TTI format indicator that indicates a second TTI format, where the communication may be in accordance with the second TTI format indicator. Some examples of the method, apparatuses, and non-transitory computer-readable medium described herein may further include operations, features, means, or instructions for receiving configuration signaling indicating a first value for a duration indicator that indicates the first number of TTIs to which the TTI format applies and a second value for the duration indicator that indicates a second number of TTIs to which a second TTI format applies.

In some examples of the method, apparatuses, and non-transitory computer-readable medium described herein, receiving the TTI format indicator further may include operations, features, means, or instructions for receiving, via an instance of the group-common control channel, an indicator generated based on the TTI format indicator and the first value for the duration indicator. In some examples of the method, apparatuses, and non-transitory computer-readable medium described herein, updating the TTI format indicator further may include operations, features, means, or instructions for receiving downlink control information generated based on the second value for the duration indicator and an indicator of the second TTI format.

A method of wireless communication by a parent access node is described. The method may include transmitting, via a group-common control channel, a first TTI format indicator that indicates a first TTI format and a number of TTIs to which the TTI format applies, the number of TTIs exceeding a periodicity of the group-common control channel, selecting a second TTI format for a subset of the number of TTIs, and communicating in accordance with the second TTI format for the subset of the number of TTIs.

An apparatus for wireless communication by a parent access node is described. The apparatus may include a processor, memory in electronic communication with the processor, and instructions stored in the memory. The instructions may be executable by the processor to cause the apparatus to transmit, via a group-common control channel, a first TTI format indicator that indicates a first TTI format and a number of TTIs to which the TTI format applies, the number of TTIs exceeding a periodicity of the group-common control channel, select a second TTI format for a subset of the number of TTIs, and communicate in accordance with the second TTI format for the subset of the number of TTIs.

Another apparatus for wireless communication by a parent access node is described. The apparatus may include means for transmitting, via a group-common control channel, a first TTI format indicator that indicates a first TTI format and a number of TTIs to which the TTI format applies, the number of TTIs exceeding a periodicity of the group-common control channel, selecting a second TTI format for a subset of the number of TTIs, and communicating in accordance with the second TTI format for the subset of the number of TTIs.

A non-transitory computer-readable medium storing code for wireless communication by a parent access node is described. The code may include instructions executable by a processor to transmit, via a group-common control channel, a first TTI format indicator that indicates a first TTI format and a number of TTIs to which the TTI format applies, the number of TTIs exceeding a periodicity of the group-common control channel, select a second TTI format for a subset of the number of TTIs, and communicate in accordance with the second TTI format for the subset of the number of TTIs.

Some examples of the method, apparatuses, and non-transitory computer-readable medium described herein may further include operations, features, means, or instructions for transmitting, via a downlink control channel, downlink control information including a cancellation indicator that indicates to cancel the first TTI format indicator for the subset of the number of TTIs. Some examples of the method, apparatuses, and non-transitory computer-readable medium described herein may further include operations, features, means, or instructions for selecting a second TTI format based on determining to reclaim the subset of the number of TTIs. Some examples of the method, apparatuses, and non-transitory computer-readable medium described herein may further include operations, features, means, or instructions for selecting a default TTI format for the subset of the number of TTIs.

In some examples of the method, apparatuses, and non-transitory computer-readable medium described herein, selecting the second TTI format further may include operations, features, means, or instructions for transmitting, via a second instance of the group-common control channel that occurs before a last TTI of the number of TTIs, a second TTI format indicator. Some examples of the method, apparatuses, and non-transitory computer-readable medium described herein may further include operations, features, means, or instructions for transmitting configuration signaling indicating a first value for a duration indicator that indicates a first number of TTIs to which the first TTI format applies and a second value for the duration indicator that indicates a second number of TTIs to which a second TTI format applies.

In some examples of the method, apparatuses, and non-transitory computer-readable medium described herein, transmitting the first TTI format indicator further may include operations, features, means, or instructions for transmitting downlink control information generated based on the TTI format indicator and the first value for the duration indicator. In some examples of the method, apparatuses, and non-transitory computer-readable medium described herein, selecting the second TTI format further may include operations, features, means, or instructions for transmitting, via a second instance of the group-common control channel, downlink control information generated based on the second value for the duration indicator and an indicator of the second TTI format. In some examples of the method, apparatuses, and non-transitory computer-readable medium described herein, transmitting the indicator further may include operations, features, means, or instructions for determining a number of overlapping TTIs of the first TTI format and the second TTI format and a number of downstream access nodes relative to the parent access node, and determining to select the second format based on the number of overlapping TTIs and the number of downstream nodes.

A method of wireless communication by an access node is described. The method may include receiving downlink signaling indicating a resource release for a resource of a first link configured between a parent access node and the access node, as well as timing information corresponding to the resource release. The method may further include scheduling a parent-controlled resource corresponding to the resource of a second link configured between the access node and a child access node based on the downlink signaling and the timing information, and communicating with the child access node via the parent-controlled resource based on the scheduling.

An apparatus for wireless communication by an access node is described. The apparatus may include a processor, memory in electronic communication with the processor, and instructions stored in the memory. The instructions may be executable by the processor to cause the apparatus to receive downlink signaling indicating a resource release for a resource of a first link configured between a parent access node and the access node, as well as timing information corresponding to the resource release. The instructions may be executable by the processor to further cause the apparatus to schedule a parent-controlled resource corresponding to the resource of a second link configured between the access node and a child access node based on the downlink signaling and the timing information, and communicate with the child access node via the parent-controlled resource based on the scheduling.

Another apparatus for wireless communication by an access node is described. The apparatus may include means for receiving downlink signaling indicating a resource release for a resource of a first link configured between a parent access node and the access node, as well as timing information corresponding to the resource release. The apparatus may include means for scheduling a parent-controlled resource corresponding to the resource of a second link configured between the access node and a child access node based on the downlink signaling and the timing information, and means for communicating with the child access node via the parent-controlled resource based on the scheduling.

A non-transitory computer-readable medium storing code for wireless communication by an access node is described. The code may include instructions executable by a processor to receive downlink signaling indicating a resource release for a resource of a first link configured between a parent access node and the access node, as well as timing information corresponding to the resource release. The code may further include instructions executable by a processor to schedule a parent-controlled resource corresponding to the resource of a second link configured between the access node and a child access node based on the downlink signaling and the timing information, and communicate with the child access node via the parent-controlled resource based on the scheduling.

A method of wireless communication by an access node is described. The method may include indicating a request to use a parent-controlled resource, receiving downlink signaling indicating a resource release for a resource of a first link configured between a parent access node and the access node based at least in part on the request, scheduling the parent-controlled resource corresponding to the resource of a second link configured between the access node and a child access node based on the downlink signaling, and communicating with the child access node via the parent-controlled resource based on the scheduling.

An apparatus for wireless communication by an access node is described. The apparatus may include a processor, memory in electronic communication with the processor, and instructions stored in the memory. The instructions may be executable by the processor to cause the apparatus to indicate a request to use a parent-controlled resource, receive downlink signaling indicating a resource release for a resource of a first link configured between a parent access node and the access node based at least in part on the request, schedule the parent-controlled resource corresponding to the resource of a second link configured between the access node and a child access node based on the downlink signaling, and communicate with the child access node via the parent-controlled resource based on the scheduling.

Another apparatus for wireless communication by an access node is described. The apparatus may include means for indicating a request to use a parent-controlled resource, receiving downlink signaling indicating a resource release for a resource of a first link configured between a parent access node and the access node based at least in part on the request, scheduling the parent-controlled resource corresponding to the resource of a second link configured between the access node and a child access node based on the downlink signaling, and communicating with the child access node via the parent-controlled resource based on the scheduling.

A non-transitory computer-readable medium storing code for wireless communication by an access node is described. The code may include instructions executable by a processor to indicate a request to use a parent-controlled resource, receive downlink signaling indicating a resource release for a resource of a first link configured between a parent access node and the access node based at least in part on the request, schedule the parent-controlled resource corresponding to the resource of a second link configured between the access node and a child access node based on the downlink signaling, and communicate with the child access node via the parent-controlled resource based on the scheduling.

A method of wireless communication by an access node is described. The method may include receiving a semi-static resource pattern for a first parent access node and for each additional parent access node of the access node, receiving downlink signaling indicating a resource release for a resource of a first link configured between the first parent access node and the access node, scheduling a parent-controlled resource corresponding to the resource of a second link configured between the access node and a child access node based on the downlink signaling and the semi-static resource pattern for the first parent access node and for each additional parent access node of the access node, and communicating with the child access node via the parent-controlled resource based on the scheduling.

An apparatus for wireless communication by an access node is described. The apparatus may include a processor, memory in electronic communication with the processor, and instructions stored in the memory. The instructions may be executable by the processor to cause the apparatus to receive a semi-static resource pattern for a first parent access node and for each additional parent access node of the access node, receive downlink signaling indicating a resource release for a resource of a first link configured between a parent access node and the access node, schedule the first parent-controlled resource corresponding to the resource of a second link configured between the access node and a child access node based on the downlink signaling and the semi-static resource pattern for the first parent access node and for each additional parent access node of the access node, and communicate with the child access node via the parent-controlled resource based on the scheduling.

Another apparatus for wireless communication by an access node is described. The apparatus may include means for receive a semi-static resource pattern for a first parent access node and for each additional parent access node of the access node, receiving downlink signaling indicating a resource release for a resource of a first link configured between a parent access node and the access node, scheduling the first parent-controlled resource corresponding to the resource of a second link configured between the access node and a child access node based on the downlink signaling and the semi-static resource pattern for the first parent access node and for each additional parent access node of the access node, and communicating with the child access node via the parent-controlled resource based on the scheduling.

A non-transitory computer-readable medium storing code for wireless communication by an access node is described. The code may include instructions executable by a processor to receive a semi-static resource pattern for a first parent access node and for each additional parent access node of the access node, receive downlink signaling indicating a resource release for a resource of a first link configured between a parent access node and the access node, schedule the first parent-controlled resource corresponding to the resource of a second link configured between the access node and a child access node based on the downlink signaling and the semi-static resource pattern for the first parent access node and for each additional parent access node of the access node, and communicate with the child access node via the parent-controlled resource based on the scheduling.

DETAILED DESCRIPTION

Figure 1:
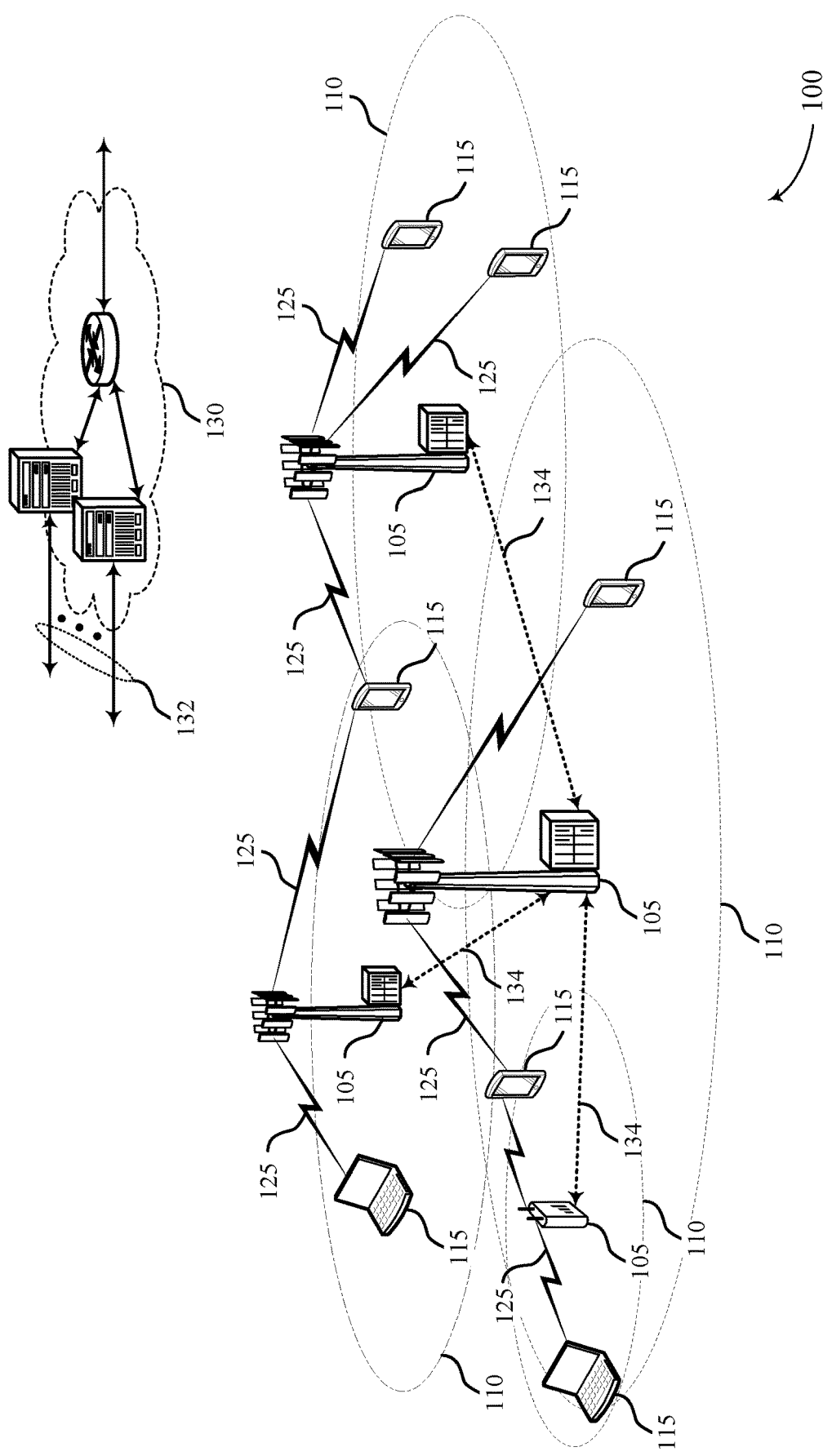
FIG. 1 illustrates an example of a system for wireless communications that supports techniques for updating resource types in accordance with aspects of the present disclosure.

In some wireless communications systems it may be desirable to deploy a large number of network devices (e.g., access nodes) in a small area to provide acceptable coverage to users. In such deployments, it may be impractical to connect each access node to the network via a wired connection. Therefore, some communications system (e.g., 5G new radio (NR) systems) may include infrastructure and spectral resources for wireless network access that additionally supports wireless backhaul link capabilities in supplement to wireline backhaul connections (e.g., providing an integrated access and backhaul (IAB) network architecture). Such systems may support both wireless access traffic (e.g., between network devices and UEs) and backhaul traffic (e.g., traffic between separate network devices). For example, network devices may support an IAB network (e.g., a self-backhauling network), where the network may share time and frequency resources between access traffic and backhaul traffic. In some cases, the IAB network may be implemented for millimeter-wave (mmW) systems (e.g., with narrow beams through beamforming techniques) to minimize interference (e.g., inter-link interference) between the different transmissions. Accordingly, the IAB network may enhance link capacity, reduce latency, and reduce cell deployment cost within the wireless communications system.

For example, an IAB network architecture may include a chain of connected wireless devices (e.g., starting with a donor network device connected to the core network and ending with a UE, with any number of relay network devices in between). Wireless devices may be connected via link resources that support network access (e.g., NR access) and backhaul capabilities (e.g., a wireline backhaul or wireless backhaul). A relay network device may refer to an intermediary node in a relay chain (e.g., an intermediary access node in an IAB relay chain). For example, a relay network device may relay communications between a parent network device (e.g., an IAB donor, or an IAB node upstream or higher on the relay chain) and a child network device (e.g., an IAB node downstream or lower on the relay chain). Thus, a relay network device may have an established communication link with a parent node (e.g., an established parent link for backhaul communications) as well as an established communication link with each child node (e.g., one or more established child links). While various examples provided herein describe IAB networks, the described techniques for updating resource types and transmission time interval (TTI) formats may be generally applied to any type of wireless network.

In some wireless communications systems, such as IAB networks, some network devices may operate under a half-duplex constraint (e.g., where a network device may not transmit and receive, or communicate over both a parent link and a child link, at the same time). In some scenarios, parent node utilization and child node utilization of a network device may conflict (e.g., a parent node of the network device and a child node of the network device may wish to communicate with, or utilize, the network device at the same time). To accommodate communications on both a parent link and child link, a network device may employ time division multiplexing (TDM) of parent link and child link resources. As such, parent link and child link resources may be associated with resource types (e.g., or availability criteria). For example, resource types may include downlink (DL) (e.g., hard downlink), uplink (UL) (e.g., hard uplink), flexible (F) (e.g., hard flexible), not available (N.A.), soft downlink (soft-DL), soft uplink (soft-UL), and soft flexible (soft-F). A hard resource (e.g., a self-controlled resource) may refer to a resource that is available (e.g., controllable or configurable by the access node itself) for the child link. A soft resource (e.g., a parent node controlled resource) may refer to a child link resource that is controlled by the parent node (e.g., a resource that must be approved or authorized by a parent node for use).

Conventional techniques for resource management (e.g., resource assignment, resource type updating, etc.) may, in some cases, result in inefficient use of system resources. For example, conventional techniques may not allow for hard resource assignment for child nodes in scenarios where a parent node is assigned hard or soft resources (e.g., as if both the parent node and the child node attempt to use their child node resources, there may be a half-duplex conflict for the child node). However, in some cases, the parent node may not utilize its hard or soft resources, which may ultimately equate to unnecessary barring of child node child link usage. Further, in some cases, a parent node may release resources for child node use (e.g., for a child node to utilize soft resources) and the child node may not use some or all of the released resources.

Techniques provided herein may enhance the efficiency of wireless communications systems, including systems that use wireless connections between network devices (e.g., access nodes) for backhaul communications (e.g., such as IAB networks). For example, child nodes may signal uplink messages notifying a parent node of returning of unused released resources (e.g., such that a parent node may use previously released resources that would otherwise go unused by the child node). In some cases, child nodes may signal uplink requests for soft resource use (e.g., such that a parent node may not unnecessarily release resources unless the child nodes requests the resources be released). These techniques, in addition to various other techniques described herein, may provide for enhanced control of soft resources within a wireless communications system. Efficient techniques for updating TTI formats within wireless communications systems are also discussed.

Aspects of the disclosure are initially described in the context of a wireless communications system. Example wireless communications systems, IAB chains, signaling, and process flows implementing the discussed techniques are then described. Aspects of the disclosure are further illustrated by and described with reference to apparatus diagrams, system diagrams, and flowcharts that relate to techniques for updating resource types.

FIG. 1 illustrates an example of a wireless communications system 100 that supports a techniques for updating resource types in accordance with one or more aspects of the present disclosure. The wireless communications system 100 includes network devices 105 (e.g., access nodes or base stations), UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system 100 may support techniques for updating resource types and TTI formats.

Network devices 105 may wirelessly communicate with UEs 115 via one or more network device antennas. Network devices 105 described herein may include or may be referred to by those skilled in the art as a base station, a base transceiver station, a radio base station, an access point, a network node, an access node, an IAB node, a wireless node, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include network devices 105 of different types (e.g., macro or small cell base stations, donor network devices including a central unit (CU) connected to the core network 130, relay network devices including mobile-termination (MT) functionality and distributed unit (DU) functionality, etc.). The UEs 115 described herein may be able to communicate with various types of network devices 105 and network equipment including macro eNBs, small cell eNBs, gNBs, relay base stations, and the like.

Each network device 105 may be associated with a particular geographic coverage area 110 in which communications with various UEs 115 is supported. Each network device 105 may provide communication coverage for a respective geographic coverage area 110 via communication links 125, and communication links 125 between a network device 105 and a UE 115 may utilize one or more carriers. Communication links 125 shown in wireless communications system 100 may include uplink transmissions from a UE 115 to a network device 105, or downlink transmissions from a network device 105 to a UE 115. Downlink transmissions may also be called forward link transmissions while uplink transmissions may also be called reverse link transmissions.

The geographic coverage area 110 for a network device 105 may be divided into sectors making up only a portion of the geographic coverage area 110, and each sector may be associated with a cell. For example, each network device 105 may provide communication coverage for a macro cell, a small cell, a hot spot, or other types of cells, or various combinations thereof. In some examples, a network device 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same network device 105 or by different network devices 105. The wireless communications system 100 may include, for example, a heterogeneous LTE/LTE-A/LTE-A Pro or NR network in which different types of network devices 105 provide coverage for various geographic coverage areas 110.

The term "cell" refers to a logical communication entity used for communication with a network device 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a network device 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a network device 105. Other UEs 115 in such a group may be outside the geographic coverage area 110 of a network device 105, or be otherwise unable to receive transmissions from a network device 105. In some cases, groups of UEs 115 communicating via D2D communications may utilize a one-to-many (1:M) system in which each UE 115 transmits to every other UE 115 in the group. In some cases, a network device 105 facilitates the scheduling of resources for D2D communications. In other cases, D2D communications are carried out between UEs 115 without the involvement of a network device 105.

Network devices 105 may communicate with the core network 130 and with one another. For example, network devices 105 may interface with the core network 130 through backhaul links 132 (e.g., via an S1, N2, N3, Next Generation (NG), or other interface). Network devices 105 may communicate with one another over backhaul links 134 (e.g., via an X2, Xn, or other interface, such as a wireless interface) either directly (e.g., directly between network devices 105) or indirectly (e.g., via core network 130).

Network devices 105 may support functionality for IAB network operation. For example, network devices 105 may be split into support entities (e.g., functionalities) for promoting wireless backhaul density in collaboration with NR communication access. In some cases, a network device 105 (e.g., a donor network device or donor IAB node) may be split into associated CU and DU entities, where one or more DUs may be partially controlled by an associated CU. The CU entity of the network device 105 may facilitate connection between the core network 130 and the network device (e.g., access node), for example, via a wireline or wireless connection to the core network 130. The one or more DUs of the network device 105 may control and/or schedule functionality for additional devices (e.g., one or more alternative network devices 105 and/or UEs 115) according to configured access and backhaul links. Based on supported CU and DU entities at a network device 105, such a network device 105 may be referred to as a donor base station (e.g., or IAB donor).

Additionally, in some cases, a network device 105 may be split into associated MT and base station DU entities, where MT functionality of the network device 105 may be controlled and/or scheduled by the DU entities of the one or more donor base stations (e.g., via a Uu interface). DUs associated with such a network device 105 may be controlled by MT functionality. In addition, DUs of the network device 105 may be partially controlled by signaling messages from CU entities of associated donor network devices (e.g., donor access nodes) on the configured access and backhaul links of a network connection (e.g., via an F1-application protocol (AP)). The DUs of the one or more network devices 105 may support one of multiple serving cells 110 of the network coverage area. The DUs of the one or more network devices 105 may control and/or schedule functionality for additional devices (e.g., one or more alternative network devices 105, UEs 115) according to configured access and backhaul links. Based on supported MT and DU entities at a network device 105, such a network device may be referred to as an intermediary access node (e.g., or IAB relay node).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

In some cases, at least some of the network devices, such as a network device 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or network device 105 may be distributed across various network devices (e.g., radio heads and access network controllers) or consolidated into a single network device (e.g., a network device 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and network devices 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as network devices 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, network device 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a network device 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a network device 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a network device 105 may use multiple antennas or antenna arrays to conduct beamforming operations for directional communications with a UE 115. For instance, some signals (e.g. synchronization signals, reference signals, beam selection signals, or other control signals) may be transmitted by a network device 105 multiple times in different directions, which may include a signal being transmitted according to different beamforming weight sets associated with different directions of transmission. Transmissions in different beam directions may be used to identify (e.g., by the network device 105 or a receiving device, such as a UE 115) a beam direction for subsequent transmission and/or reception by the network device 105. Some signals, such as data signals associated with a particular receiving device, may be transmitted by a network device 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the network device 105 in different directions, and the UE 115 may report to the network device 105 an indication of the signal it received with a highest signal quality, or an otherwise acceptable signal quality. Although these techniques are described with reference to signals transmitted in one or more directions by a network device 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the network device 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a network device 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105 or core network 130 supporting radio bearers for user plane data. At the Physical (PHY) layer, transport channels may be mapped to physical channels.

In some cases, UEs 115 and network devices 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a network device 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a predefined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using TDM techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., network devices 105 or UEs 115) may have a hardware configuration that supports communications over a particular carrier bandwidth, or may be configurable to support communications over one of a set of carrier bandwidths. In some examples, the wireless communications system 100 may include network devices 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or network device 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

As discussed above, in wireless communications system 100, one or more network devices 105 (e.g., donor network devices 105, donor IAB nodes, etc.) may include CUs and DUs, where one or more DUs associated with a donor base station may be partially controlled by a CU associated with the donor base station. A CU may be a component of a network management function, database, data center, or core network 130 (e.g., a 5G NR core network (5GC)). A CU may communicate with core network 130 via a backhaul link 132 (e.g., a wireline backhaul or a wireless backhaul). In IAB networks, a CU (e.g., a donor network device 105) may communicate with the core network 130 (e.g., the next generation core network (NGC)) via a backhaul link 132 (e.g., a wireline backhaul or wireless backhaul). The donor network device 105 may be referred to, for example in an IAB network, as an IAB donor and may be in communication with one or more IAB nodes (e.g., other network devices 105) operating as DUs relative to the IAB donor and one or more UEs.

For example, an IAB network may include a chain of wireless devices (e.g., starting with the donor network device 105, a radio access network (RAN) node that terminates an interface with the core network, and ending with a UE 115, with any number of IAB nodes or relay base stations in between). Intermediary or relay network devices (e.g., IAB nodes, relay base stations, relay nodes, etc.) may support MT functionality (which may also be referred to as UE function (UEF)) controlled and scheduled by an IAB donor, or another parent network device. Such network devices (e.g., relay base stations, relay nodes, etc.) may also support DU functionality (which may also be referred to as an access node function (ANF)) relative to additional entities (e.g., IAB nodes, UEs, etc.) within the relay chain or configuration of the access network (e.g., downstream). In some cases, MT functionality may refer to an implementation that supports at least some aspects of a MT or a UE (e.g., as defined by 3GPP Technical Specification (TS) 23.101 version 8.0.0 Release 8). These relay mechanisms may forward traffic along to the additional entities, extend the range of wireless access for one or more base stations, enhance the density of backhaul capability within serving cells 110, etc.

In some examples, wireless communications system 100 may employ one or more wired and wireless backhaul links (e.g., backhaul link 132 or backhaul link 134) for establishing connectivity between a core network (e.g., core network 130) and the one or more wireless nodes within wireless communications system 100. For example, wireless communications system 100 may include multiple network devices 105 (e.g., base stations, remote radio heads, etc.), where at least one network device 105 is coupled to a wireline backhaul link, such as an optical fiber cable. Additional network devices 105 may not be directly coupled to the core network 130 or to another network devices 105 via a wired backhaul link, and may use wireless backhaul links to communicate backhaul traffic. In such cases, the network devices 105 may wirelessly communicate backhaul access traffic to a high-capacity fiber point (e.g., a location where a network device is coupled with a wireline link to core network 130). Each of the backhaul links 132 and 134 may carry packets from the one or more established PDN gateways through the SGi interface and subsequently direct the packets through the core network and to the coupled wireless nodes over S1 interface.

While mobile access may sometimes be associated with single-hop communication links between a source and destination (e.g., an asymmetric link), wireless backhaul communications may support multi-hop transport and provide robustness through topological redundancy (e.g., alternative paths for data exchange within a wireless communications network). Accordingly, underlying links using wireless backhaul communications may be symmetric in nature and use large-scale resource coordination among the wireless communication links.

Figure 2:
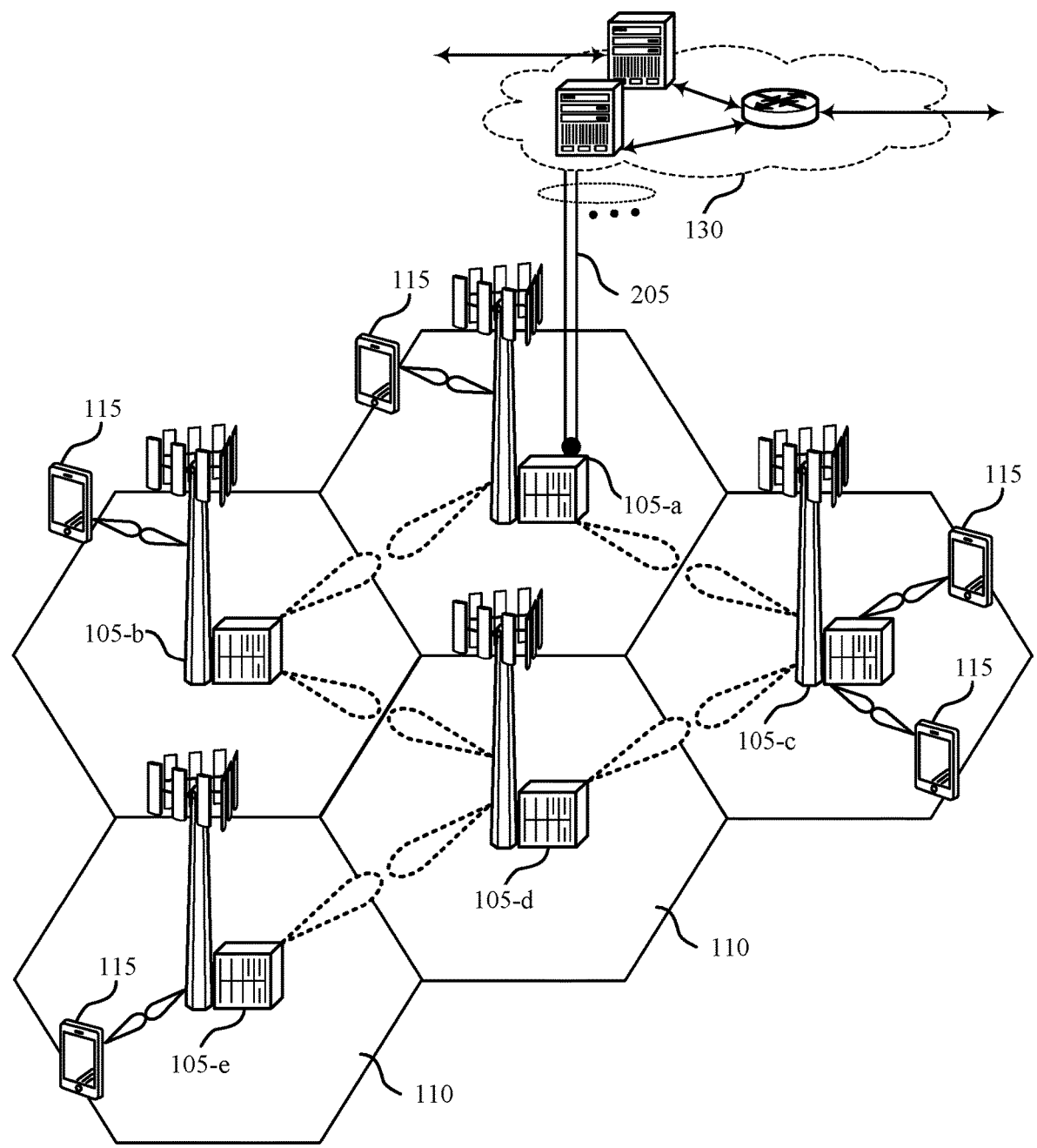
FIG. 2 illustrates an example of a wireless communications system that supports techniques for updating resource types in accordance with aspects of the present disclosure.

FIG. 2 illustrates an example of a wireless communications system 200 that supports aspects of techniques for updating resource types in accordance with one or more aspects of the present disclosure. In some examples, wireless communications system 200 may implement aspects of wireless communications system 100. Wireless communications system 200 may support one or more network devices 105 supporting network access to one or more UEs 115 within cell coverage areas 110. Infrastructure and spectral resources for network access within wireless communications system 200 may additionally support wireless backhaul link 210 capabilities in supplement to wireline backhaul 205 connections, providing an IAB network architecture. Aspects of the supporting functionalities of the network devices 105 may be referred to as IAB nodes. For example, FIG. 2 illustrates an wireless communications system 200 (e.g., an NR system) that may implement the IAB architecture by connecting one access node (e.g., network device 105-*a*) in the wireless communications system 200 to the core network 130 via a fiber point backhaul connection 205, while other network devices 105 in the wireless communications system 200 (e.g., network device 105-*b*, network device 105-*c*, network device 105-*d*, and network device 105-*e*) may exchange access traffic with the fiber point backhaul connection 205 via the wireless backhaul network, using wireless backhaul links 210 (e.g., using beamformed wireless backhaul connections). Each network device 105 may then communicate the access traffic with the one or more UEs 115 that it serves over the access network, using access links 215 (e.g., using beamformed wireless access connections).

In wireless communications systems that employ wireline links for backhaul communications, a wireless node may enjoy a robust wireline link to a network entity that coordinates aspects of backhaul communications (e.g., the network entity provides timing information, cell identity, etc.) for neighboring nodes to coordinate backhaul transmissions. However, in some systems, deploying a wireline link to wireless nodes may result in substantial expense and resource expenditure. For example, wireless nodes operating in mmW frequency ranges may be associated with a reduced coverage area (e.g., a smaller geographic footprint, directional transmissions, etc.), which may result in a deployment of a larger number of access nodes (e.g., network devices 105 or IAB nodes) to provide acceptable coverage areas to users. As a result, a number of network devices 105 within the wireless communication system may not be coupled with a wireline backhaul link and may instead use wireless backhaul links 210 for backhaul communications in a wireless backhaul network.

In some cases, network device 105-*a* may be split into associated base station CU and DU entities, where one or more DUs may be partially controlled by an associated CU. The CU entity of the network device 105-*a* may facilitate connection between the core network 130 and the network device 105-*a* (e.g., via a wireline backhaul link 205 or, in some cases, a wireless connection to the core network). The DUs of the network device 105-*a* may control and/or schedule functionality for additional devices (e.g., relay base stations or relay IAB nodes, such as network device 105-*b*, network device 105-*c*, and UEs 115) according to configured wireless backhaul links 210 and wireless access links 215. Based on the supported entities at the network device 105-*a* (e.g., such as the CU entity), the network device 105-*a* may be referred to as an IAB donor.

A relay network device (e.g., network device 105-*b* and network device 105-*c*) may support link connectivity with the IAB donor (e.g., network device 105-*a*) as part of a relay chain within the IAB network architecture. For example, network device 105-*b* may be split into associated MT and DU entities, where MT functionality of the network device 105-*b* may be controlled and/or scheduled by a DU entity of network device 105-*a*. DUs associated with network device 105-*b* may be controlled by MT functionality of the network device 105-*b*. In addition, in some cases, one or more DUs of the network device 105-*b* may be partially controlled by signaling messages from CU entities of associated IAB donor nodes (e.g., a CU of network device 105-*a*) of the network connection (e.g., via an F1-application protocol (AP)). The DU of the network device 105-*b* may support a serving cell 110 of the IAB network coverage area, and may provide for communications with one or more UEs 115 via access links 215. Based on the supported entities at the network device 105-*b*, the network device 105-*b* may be referred to as a relay network device, an IAB node, a relay node, etc.

A network device 105 (e.g., a relay network device) may thus be configured for ANF and UEF to allow the network device 105 to act as a scheduling entity and a receiving (e.g., scheduled) entity. Each of the functionalities may be operated via the one or more backhaul links 210. ANF may enable network devices 105 to operate as a scheduling entity over one or more access links 220, and communicate with one or more UEs 115 located within the IAB network. ANF may further enable network devices 105 to operate as a scheduling entity over one or more coupled backhaul links 210, to facilitate communication between the one or more other network devices 105 of the IAB network (i.e., via the mesh topology). UEF may enable network devices 105 to operate as a scheduled entity and communicate with one or more other network devices 105 to receive data. In some cases, a network device 105 may include a routing table for examining a received data packet and forwarding the packet along the best path of the IAB network toward the specified IP address of the packet's destination. In some cases, each relay network device 105 may be associated with a single MT function, and may thus employ backhaul relaying as shown. In some cases, relay base stations (e.g., relay network devices 105) may support multiple MT functions, in which case relay base stations (e.g., relay network devices 105) may be capable of multi-connected cellular backhaul.

Wireless communications system 200 may employ one or more wireless access links 215 for establishing mobile access to one or more coupled UEs 115. Each of the network devices 105 and the UEs 115 may be configured to support cellular radio access technologies (RATs), such as mmW-based RATs, for access traffic between the UEs 115 and the network devices 105. Moreover, each of network devices 105 may share resources of the configured RATs for access traffic with backhaul traffic over the network (e.g., as in the case of IAB). IAB network solutions may be increasingly beneficial with the evolution of cellular technologies due to enhancements in wireless link capacity. Specifically, IAB network solutions may provide solutions to densification of network cells (i.e., cost reduction of small cell deployments) and increases in data traffic, as a means to maximize spectrum efficiency through joint optimization and integration of access and backhaul resources within the network. For example, IAB network solutions may be suitable for mmW-based RATs due to a large bandwidth per channel and the mitigation of short term signal blocking.

An access link using a mmW-based RAT may be designed as an asymmetric single-hop link, which may be used for assigning control and scheduling tasks to a network device 105 while providing instruction to one or more UEs 115 for scheduling communication. In such cases, a network device 105 may coordinate wireless resources among multiple UEs 115, while each UE 115 may be assigned to one or more network devices 105. In some cases, inter-node links may be symmetric in nature and may form mesh topologies for enhanced robustness, where wireless transport may occur along multiple hops. The combination of the UEF and ANF capability at a network device 105 of the IAB network may allow the network device 105 to utilize switching operations over the wireless spectrum associated with the RAT, to transmit access traffic to/from UEs 115 and backhaul traffic to/from core network 130 (e.g., via backhaul links 210 to network device 105-a) providing coupled access to the one or more PDNs.

Using the techniques described herein, wireless communications system 200 may coordinate and configure wireless resources (e.g., for access traffic and backhaul traffic) and efficiently handle any system constraints (e.g., half-duplexed communications, inter-link interference, etc.). For instance, inter-link interference may be managed using spatial division multiple access (SDMA) techniques (e.g., through the use of narrow beams), and inter-node beam coordination may account for any remaining interference. Wireless communications system 200 may employ techniques for updating resource types, techniques for resource release, and techniques for resource return/reclaim as described herein.

Figure 3:
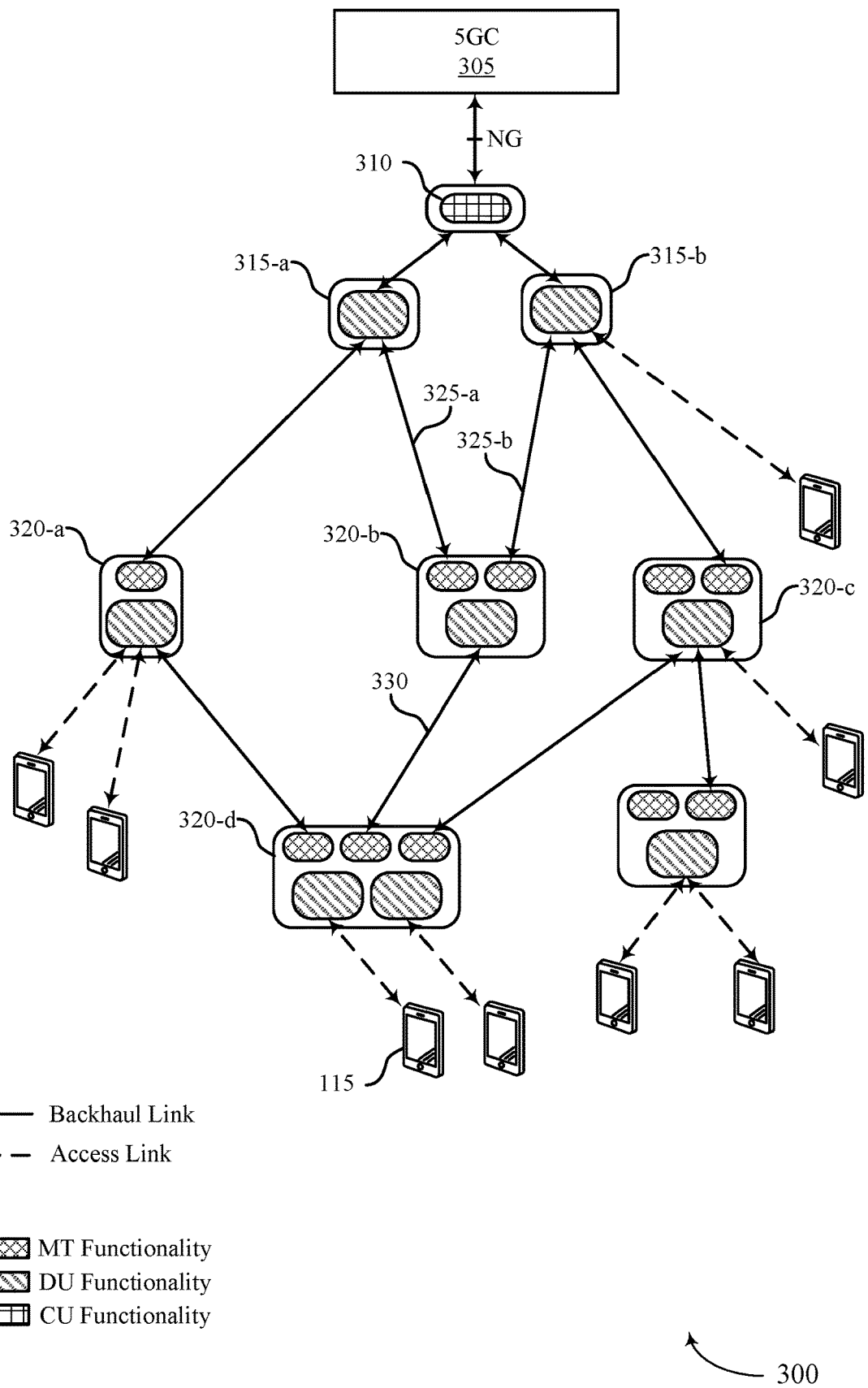
FIG. 3 illustrates an example of a wireless communications system that supports techniques for updating resource types in accordance with aspects of the present disclosure.

FIG. 3 illustrates an example of a wireless communications system 300 that supports techniques for updating resource types in accordance with one or more aspects of the present disclosure. In some examples, wireless communications system 300 may implement aspects of wireless communications system 100 and wireless communications system 200, as described with reference to FIGS. 1 and 2. For example, FIG. 3 illustrates a wireless communications system 300 (e.g., a NR system) that supports sharing of infrastructure and spectral resources for NR access with wireless backhaul link capabilities, in supplement to wireline backhaul connections, providing an IAB network architecture. Wireless communications system 300 may include a core network 305 (e.g., NGC), and network devices 320 (e.g., base stations, IAB nodes, etc.) that may be split into one or more support entities (e.g., functionalities) for promoting wireless backhaul density in collaboration with network communication access.

Wireless communications system 300 may include a donor network device (e.g., a donor IAB node, donor base station, etc.) split into associated CU 310 and DU 315 entities, where DUs 315 associated with the donor network device may be partially controlled by the associated CU 310 of the network device. In some cases, CU 310, DU 315-a and DU 315-b may be located within a single device. In other cases, DU 315-a and DU 315-b of the donor network device may be externally located, and may be in wired or wireless communication with the CU 310. CU may be a component of a database, data center, core network, or network cloud, and may host layer 3 (L3) (e.g., RRC, service data adaption protocol (SDAP), PDCP, etc.) functionality and signaling. Further CU 310 of the donor network device may communicate with core network 305 over, for example, an NG interface (which may be an example of a portion of a backhaul link). DUs 315 may host lower layer, such as layer 1 (L1) and layer 2 (L2) (e.g., RLC, MAC, PHY, etc.) functionality and signaling. A DU 315 entity of a donor network node may support one of multiple serving cells of the network coverage according to connections associated with backhaul and access links of the IAB network. DUs 315 of the IAB donor node may control both access links and backhaul links within the corresponding network coverage and provide controlling and scheduling for descendant (e.g., child) relay network devices 320 and/or UEs 115.

Network devices 320 may be split into associated MT and DU entities. MT functionality (e.g., UEF) of the network devices 320 (e.g., relay IAB nodes) may be controlled and/or scheduled by antecedent IAB nodes (e.g., by a donor network device or another upstream network device as its parent node) of the established connectivity via access and backhaul links of a coverage area. DUs associated with a network device 320 may be controlled by MT functionality of the network device (e.g., a DU of a network device may be controlled by the network device's own MT). In addition, DUs of the network devices 320 may be partially controlled by signaling messages from CU 310 entities of associated donor network devices of the network connection (e.g., via an F1-AP interface). The DUs of the network devices 320 may support one of multiple serving cells of the network coverage area. DU functionality (e.g., ANF) may schedule child IAB nodes and UEs, and may control both access links and backhaul links under its coverage. The techniques described herein may be applied to IAB nodes with any number of MT entities and any number of DU entities by extension or analogy, without departing from the scope of the present disclosure.

A network device 320 associated with a RAT may communicate with a donor network device CU (e.g., CU 310) via a backhaul link (e.g., wireline backhaul or wireless backhaul). Generally, one or more donor network device (e.g., IAB donors) may be in communication with one or more additional network devices 320 (e.g., IAB nodes or relay nodes) and one or more UEs 115. As an example, network device 320-d may support MT functionality controlled and scheduled by a donor network device and/or parent relative to the MT supported IAB nodes (e.g., such as network devices 320-b and 320-a). Network device 320-d may additionally support DU operability relative to additional entities (e.g., such as UEs 115) within the relay chain or configuration of the access network. For example, an IAB network architecture may include a chain of connected wireless devices (e.g., starting with a donor network device and ending with a UE 115, with any number of network devices 320 in between) via link resources that support NR access and backhaul capabilities (e.g., a wireline backhaul or wireless backhaul).

As discussed herein, a relay network device 320 may refer to a network device that includes at least one MT function and one DU. The relay network device 320 may connect to a parent network device or a donor network device via a MT function, and may further support connections to UEs 115 and child network devices via the DU. In some cases, network device DUs and donor network device DUs may be connected to a centralized donor CU (e.g., CU 310), which may hold a network management function, or be connected to a network management function. In some cases, the network management function may support link management, route management, topology management, resource management, etc. for the wireless communications system 300 (e.g., the IAB network). The connection between DUs across wireless backhaul links may use a modified form of the F1 protocol (e.g., F1*). Each relay node MT function may include a RRC connection to the CU 310. Further, each relay node DU may include a F1*control plane connection to the CU 310. In this manner, the network management function may support link configuration, route configuration, and resource configuration tasks for the wireless backhaul topology.

A relay network device 320 may relay communications between a parent network device (e.g., an IAB donor, or an IAB node upstream or higher on the relay chain) and a child network device (e.g., an IAB node downstream or lower on the relay chain). In some cases, the relay network device may refer to the DU functionality or ANF of an intermediary IAB node. A child node may refer to an IAB node (e.g., the MT of the IAB node) or a UE that is the child of another IAB node (e.g., such as the relay node). A parent node in communication with the relay node may refer to an upstream IAB node (e.g., a network device closer to the donor network device or a network device with less hops to the wireline backhaul link to the core network) or an IAB donor (e.g., the DU/ANF of the IAB node or IAB donor). In some cases, a parent node may be referred to as a control node (e.g., a control node may refer to a parent node or a DU of a parent node in communication with an MT of a relay node or other intermediary IAB node).

As such, wireless communications system 300 may implement 5G NR technologies (e.g., such as mmW) to support an access network (e.g., between an access node, such as network devices 320, and UEs 115) and a backhaul network (e.g., between access node, such as network devices 320). An IAB donor may refer to a network device with a wireline connection to the core network, and an IAB node may refer to a network device that relays traffic to or from the anchor (e.g., the donor) through 1 or more hops. IAB networks may thus share resources between access and backhaul, and may reuse aspects of access network frameworks. An IAB node may hold MT and DU functions. For example, the MT function of network device 320-d may act as or serve as a scheduled node (e.g., similar to a UE) scheduled by its parent node (e.g., network device 320-a). The DU function of network device 320-d may act as or serve as a scheduling node that schedules child nodes of the network device 320-d (e.g., such as UEs 115). DU functionality of a network device may also schedule child IAB nodes downstream in the relay chain (e.g., DU function of network device 320-a may act as or serve as a scheduling node that schedules network device 320-d).

In some cases, wireless communications systems may resource direction types (e.g., for time-domain resources in NR). For example, a time-domain resource may be assigned (e.g., or configured by the network) as a downlink resource, an uplink resource or a flexible resource. A DL resource may refer to a resource where downlink communication (e.g., downstream communications from a parent node to a child node) is allowed (e.g., such as synchronization signal block (SSB) resources, channel state information reference signal (CSI-RS) resources, physical downlink control channel (PDCCH) resources, physical downlink shared channel (PDSCH) resources, etc.). An UL resource may refer to a resource where uplink communication (e.g., upstream communications from a UE or child node to a parent node) is allowed (e.g., such as physical random access channel (PRACH) resources, physical uplink control channel (PUCCH) resources, physical uplink shared channel (PUSCH) resources, sounding reference signal (SRS) resources, etc.). A flexible resource may refer to a resource where the communication direction may be overwritten (e.g., to uplink or downlink) later by a scheduling node (e.g., by a donor network device, a parent network device, etc.).

Wireless communications systems further may support different layers or different types of DL/UL/Flexible assignment (e.g., wireless communications systems may use different mechanisms or techniques to specify DL/UL/Flexible slot configurations). For example, RRC messages may be used to convey semi-static slot configurations. Semi-static slot configurations (e.g., semi-static UL/DL/Flexible resource assignments configured via RRC signaling) may include cell-specific configurations (e.g., tdd-UL-DL-ConfigurationsCommon signaling in system information block (SIB)) and/or UE-specific configurations (e.g., tdd-UL-DL-ConfigurationsDedicated signaling in UE-specific RRC messages). Additionally or alternatively, wireless communications systems may use dynamic slot format indicators (SFIs) carried by group-common PDCCH (GC-PDCCH) to indicate UL/DL/Flexible resource assignments. In some cases, slot configurations configured via RRC signaling and dynamic SFIs may be referred to as explicit resource type configuration. Wireless communications systems may also support implicit indication of resource types for slot configuration. For example, a downlink or uplink direction for a slot or resource may be implied by semi-static channel allocation using RRC messages. Additionally or alternatively, a downlink or uplink direction for a slot or resource may be implied by dynamic downlink control information (DCI) scheduling grant carried by PDCCH. For example, a resource allocated for SSB through RRC may imply a direction for the resource based on the channel assignment.

In addition to the various techniques for configuration of resource assignments described above, wireless communications systems may further support overwriting rules (e.g., or priority rules) for such configuration techniques. That is, wireless communications systems may have a set of overwriting rules to determine which configuration is to be used in instances where more than one resource assignment or slot configuration is received for a given set of resources. For example, flexible resources in semi-static slot configuration may be overwritten to downlink or uplink symbols by SFI or implicit indication (e.g., RRC resource type configuration may be overwritten by SFI or implicit configuration of resource type). As another example, flexible resources in SFI may be overwritten (e.g., to uplink or downlink) by a dynamic DCI grant. As yet another example, semi-static channel allocation with implied downlink or uplink direction may be cancelled by SFI indicating flexible resource (e.g., an implicit uplink or downlink configuration may be overwritten as flexible via SFI). Other overwriting rules may also be implemented by analogy, without departing from the scope of the present disclosure.

In some examples, resource types may be defined or configured for different links between network devices (e.g., IAB nodes) in a wireless communications system. A network device may have one or more established parent links and one or more established child links. For example, network device 320-b may have parent links 325-a and 325-b for communications with parent nodes (e.g., in this case DU 315-a and DU 315-b). Network device 320-b may have a child link 330 for communication with a child node (e.g., network device 320-d). That is, a parent link may refer to a link between an MT of a network device 320 and a DU of a parent node, and a child link may refer to a link between a DU of a network device 320 and an MT of a child node. For example, link 330 may be referred to as a child link of network device 320-b, and may be referred to as a parent link of network device 320-d. In some cases, resources (e.g., resource type assignments, slot configurations, etc.) may be separately defined for a parent link and a child link.

Wireless communications systems may employ techniques for resource management in IAB networks. From an MT point-of-view, time-domain resources for a parent link may be configured as a downlink time resource, an uplink time resource, or a flexible time resource. From a DU point-of-view, time-domain resources for a child link may be configured as a DL time resource, an UL time resource, a F time resource, or a N.A. time resource (e.g., a resource type indicating the resource cannot be scheduled and is not to be used for communication on the DU child links).

Further, in some cases, some network devices may operate under a half-duplex constraint (e.g., where a network device may not transmit and receive, or communicate over both a parent link and a child link, at the same time). In some cases, parent and child node utilization of a network device may conflict (e.g., a parent node and a child node may wish to communicate with a network device at the same time). TDM may be used between the MT and the DU of the network device to accommodate such conflicting requests or otherwise overlapping communications with the parent node and the child node. Further, a MT of a network device may be transparent with the parent node as to the child node utilization of the network device and the resources requested by the DU.

As such, there may be two flavors (e.g., two different classes of availability or criteria for usage) for each of the downlink, uplink, and flexible time-resource types of the DU child link. For example, each of the downlink, uplink, and flexible time-resource types of the DU child link may further be configured as either hard (e.g., self-controlled) or soft (e.g., parent node controlled). A hard resource configuration may result in the corresponding time resource always being available for the DU child link. A soft resource configuration may result in the availability of the corresponding time resource for the DU child link being explicitly and/or implicitly controlled by the parent node. As such a DU may be configured with the following resource types: DL (e.g., hard downlink), UL (e.g., hard uplink), F (e.g., hard flexible), N.A., soft-DL, soft-UL, and soft-F. A soft resource (Soft Rx) (e.g., soft-DL, soft-UL, or soft-F resource) may initially be unavailable for a DU's child link, and may be converted to a hard resource (Hard Rx) (e.g., hard-DL, hard-UL, or hard-F resource) by a parent node (e.g., either explicitly or implicitly). Example resource assignments (e.g., resource type slot configurations) are described below, with reference to FIG. 4.

Figure 4:
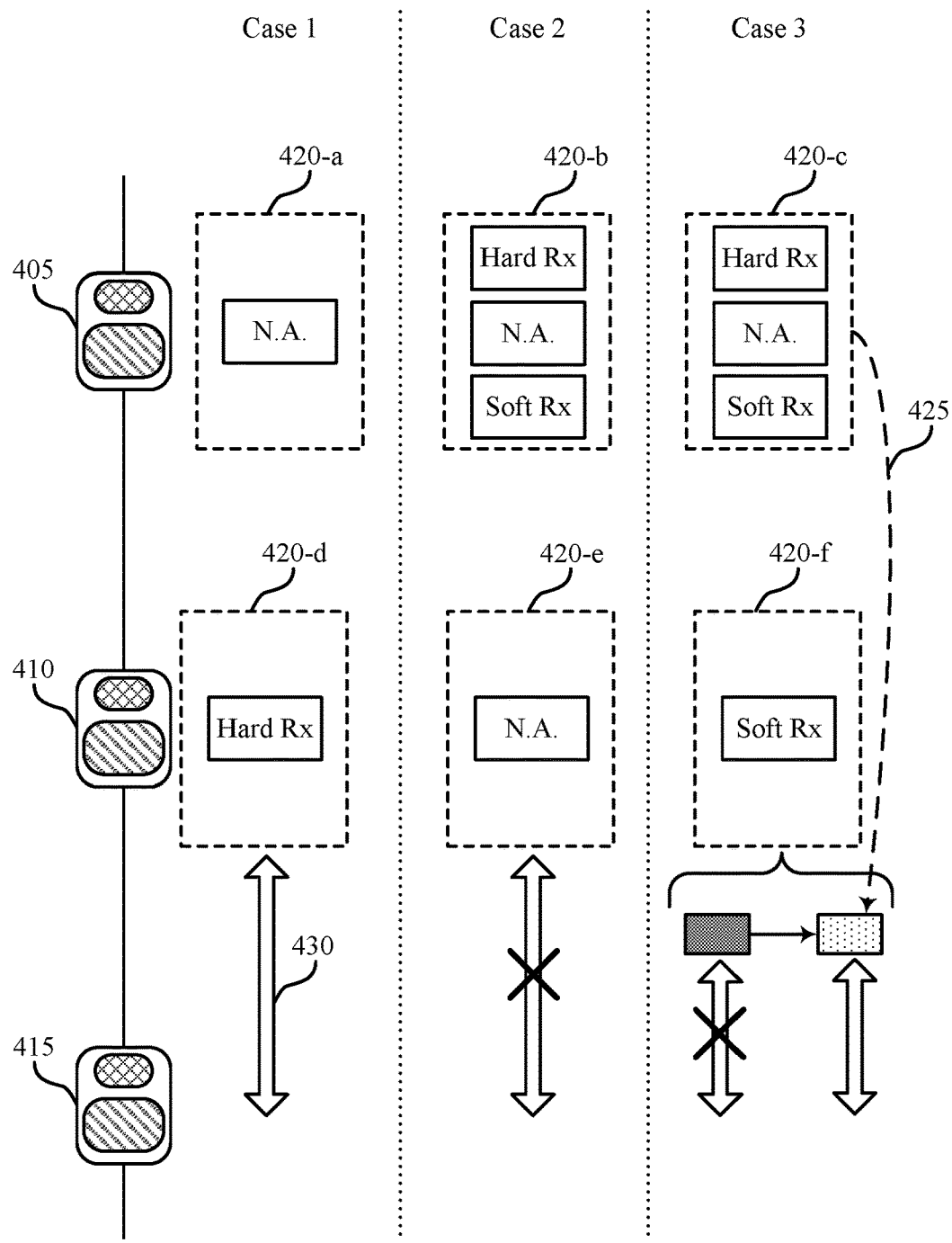
FIG. 4 illustrates an example of an integrated access and backhaul (IAB) chain that supports techniques for updating resource types in accordance with aspects of the present disclosure.

FIG. 4 illustrates an example of an IAB chain 400 that supports techniques for updating resource types in accordance with one or more aspects of the present disclosure. In some examples, IAB chain 400 may implement aspects of wireless communications system 100, wireless communications system 200, and wireless communications system 300. For example, IAB chain 400 may illustrate the perspective of IAB node 410 (e.g., a relay network device, a relay IAB node, etc.) and may include a parent node 405 and a child node 415, as described above with reference to FIGS. 1 through 3. Specifically, IAB chain 400 may illustrate three cases or scenarios of example resource type configurations for a parent link between IAB node 410 and parent node 405 and a child link between IAB node 410 and child node 415.

Network devices (e.g., IAB node 410 and parent node 405) may be configured with a resource during a given TTI (e.g., during a given slot or time resource). As discussed above, a resource may be associated with a resource type. Resource types may include DL, UL, F, N.A., soft-DL, soft-UL, and soft-F. A Hard Rx (e.g., DL, UL, F) may always be available for the DU child link. Not available resources (N.A.) are resources that cannot be scheduled or used for communication on the DU child links. A Soft Rx (e.g., soft-DL, soft-UL, soft-F) may initially be unavailable for a DU's child link, but may be converted to a Hard Rx by a parent node via an indication 425.

As discussed above, network devices (e.g., IAB node 410) may operate under a half-duplex constraint (e.g., where IAB node 410 may not transmit and receive, or communicate over both a parent link and a child link, at the same time). As such, resources may be configured to avoid half-duplex conflicts within an IAB network (e.g., as illustrated by FIG. 4). For example, if a child link of IAB node 410 is configured with Hard Rx resource type, parent nodes of IAB node 410 (e.g., child link of parent node 405, connecting parent node 405 to IAB node 410) may be configured with a N.A. resource type, as IAB node 410 may communicate using its child link without input from parent node 405 (e.g., as illustrated in Case 1). If a child link of IAB node 410 is configured with a N.A. resource type, parent nodes of IAB node 410 (e.g., child link of parent node 405, connecting parent node 405 to IAB node 410) may be configured with any resource type, as the child link of IAB node 410 may not be used for communications (e.g., as illustrated in Case 2). If a child link of IAB node 410 is configured with a soft resource type, parent nodes of IAB node 410 (e.g., child link of parent node 405, connecting parent node 405 to IAB node 410) may be configured with any resource type, as the child link of IAB node 410 may only be used for communications upon receipt of an indication 425 from parent node 405 (e.g., as illustrated in Case 3). In Case 3, the parent node 405 may thus overwrite (e.g., via the indication 425) the Soft Rx type of the child link of IAB node 410 to a Hard Rx type in scenarios where parent node 405 will not be using its child link. In scenarios where parent node 405 may use its child link, the parent node may refrain from overwriting the Soft Rx type configured for the child link of IAB node 410, such that the IAB node 410 may not schedule the resource.

For example, Case 1 illustrates parent node 405 configured with a child link resource type 420-a (a N.A. resource type). That is, the child link associated with the DU of parent node 405 may have a N.A. resource type configured, such that the parent node 405 may not schedule or communicate during the resource (e.g., the time slot or TTI associated with resource may be unavailable for uplink or downlink communication). As such, the child link associated with the DU of IAB node 410 may have a hard resource type configured as its child link resource type 420-d. IAB node 410 may be configured with a Hard Rx child link resource type 420-d as the parent node of IAB node 410 is configured with a N.A. child link resource type 420-a, ensuring the half-duplex constraint will not be violated. That is, IAB node 410 may be configured with a Hard Rx (e.g., DL, UL, F) as its parent node 405 is configured with a N.A. resource type, and thus will not communicate with the IAB node 410 during the particular resource. As such, IAB node 410 may communicate over link 430 (e.g., a child link with child node 415) during the resource using either downlink or uplink communications depending on whether the hard resource is configured as DL, UL, or F. In other words, in order for IAB node 410 to be configured with a Hard Rx child link resource type 420-d, all parent nodes of IAB node 410 (e.g., parent node 405) may be configured with N.A. resource types.

Case 2 illustrates IAB node 410 configured with a child link resource type 420-e (a N.A. resource type). As such, in Case 2, IAB node 410 may not communicate via the child link with child node 415. In such cases, the parent node 405 may be configured with a child link resource type 420-b that may be any of a Hard Rx resource type, Soft Rx resource type, or N.A. resource type (e.g., as IAB node 410 is sure to not communicate on its child link).

Case 3 illustrates IAB node 410 configured with a Soft Rx child link resource type 420-f (a soft resource type). In such cases, the parent node 405 may be configured with a child link resource type 420-c that may be any of a Hard Rx resource type, Soft Rx resource type, or N.A. resource type (e.g., as IAB node 410 may not communicate on its child link unless the soft resource is overwritten by parent node 405). For example, a Soft Rx type (e.g., child link resource type 420-f) may be a default non-schedulable state, but may be overwritten (e.g., may transition to a schedulable state) via an indication 425 from the parent node 405. In some cases, the indication 425 may overwrite the Soft Rx as either a hard DL, hard UL, or hard flexible resource type. In some cases, the parent node 405 may release resources (e.g., release its child link resources) and signal the indication 425 to IAB node 410 to overwrite the Soft Rx resource type associated with the child link of IAB node 410 (e.g., such that the IAB node 410 may communicate over its child link without half-duplexing conflicts on its parent link with parent node 405).

Figure 5:
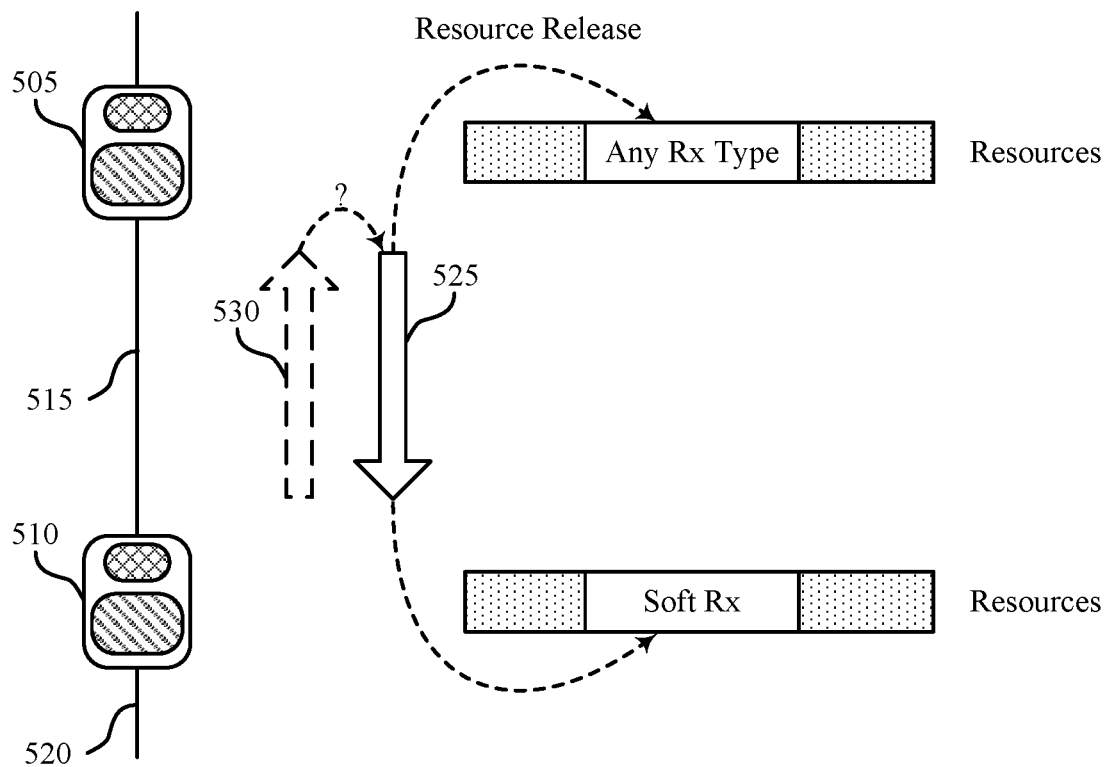
FIG. 5 illustrates an example of an IAB chain that supports techniques for updating resource types in accordance with aspects of the present disclosure.

FIG. 5 illustrates an example of an IAB chain 500 that supports techniques for updating resource types in accordance with one or more aspects of the present disclosure. In some examples, IAB chain 500 may implement aspects of wireless communications system 100, wireless communications system 200, and wireless communications system 300. For example, IAB chain 500 may illustrate the perspective of IAB node 510 (e.g., a relay network device, a relay IAB node, etc.) and may include a parent node 505, as described above with reference to FIGS. 1 through 3. Specifically, IAB chain 500 may illustrate parent node 505 release of parent link 515 (e.g., parent link of IAB node 510) resources, as well as parent node 505 control (e.g., via indication 525) of soft resources associated with a child link 520 (e.g., child link of IAB node 510, which may connect the IAB node 510 to a child node).

In some cases, wireless communications systems (e.g., and IAB chain 500) may support improved techniques for controlling soft resources of an IAB node (e.g., of IAB node 510). For example, an indication 525 for controlling soft resources of IAB node 510 may be included in a downlink signaling message from parent node 505 to the MT of the IAB node 510. In some cases, the indication 525 (e.g., the resource release indication) may indicate that one or more resources (e.g., resources of parent link 515 of IAB node 510) are released by the parent node 505. Released resources may not be used by parent link 515 between the parent node 505 and the MT of the IAB node 510. The released resources may be any resource type at the parent node 505 (e.g., Hard Rx, Soft Rx, or N.A. resource types associated with parent link 515 may be released by parent node 505 via indication 525). In some examples, by default, a N.A. resource may always be released. If released resources from parent node 505 correspond to the soft resources at the IAB node 510 (e.g., if any resources released by the parent node correspond to the same slots or TTIs configured at Soft Rx for the IAB node 510), the IAB node 510 may schedule the soft resources over its child link 520. As such, any time IAB node 510 has a resource configured as a soft resource type, if the resource corresponds to (e.g., is associated with the same slot or TTI) a resource released by the parent node 505, the IAB node 510 may use the soft resources over child link 520 (e.g., upon indication the associated resource release from parent node 505 via indication 525).

In some cases, downlink signaling including an indication 525 may be referred to as enhanced downlink signaling messages. Downlink signaling messages with indication of resource release (e.g., with indication 525) may include SFI carried by GC-PDCCH, a DCI scheduling grant carried by PDCCH, a MAC control element (MAC CE), etc. That is, indication 525 from a parent node 505 to an IAB node 510, indicating release of certain parent link 515 resources, may be included in SFI, DCI, a MAC CE, etc. As such, downlink indications 525 may be used by parent node 505 to control soft resource use by the IAB node 510 (e.g., the parent node 505 may allow use of the soft resources via sending an indication 525 to IAB node 510, or may prohibit IAB node 510 use of soft resources by refraining from sending a resource release indication 525). In some cases, indication 525 may be referred to as downlink signaling indicating a resource release. Indication 525 may indicate a resource release for a resource of parent link 515 configured between a parent access node (e.g., parent node 505) and the IAB node 510.

In some examples, the resource release (e.g., indication 525) may be associated with a time behavior, which may be configured by RRC or, in some cases, may be preconfigured for the IAB network (e.g., spec defined). In some cases, the indication 525 may indicate to a one-time release of the indicated resources. In other cases, the indication 525 may indicate a semi-persistent release (e.g., where the resources may be released until the resources are later recalled). In such cases, an additional downlink signaling message for reclaiming released resources may be employed (e.g., additional downlink signaling for resource reclaim may be carried by PDCCH or a downlink MAC CE.

In some cases, an IAB node (e.g., IAB node 510) may signal an uplink message to notify the parent node of returning unused released resources. For example, if IAB node 510 receives an indication 525 from parent node 505 indicating a set of resources have been released, IAB node 510 may, in some cases, transmit an uplink message indicating some or all of the released resources will not be used by the IAB node 510 (e.g., such that the parent node 505 may reclaim released resources that are not being used by IAB node 510). Such uplink resource returning may be implemented when IAB node 510 only uses some of the released resources and would like to give back the remaining resources (e.g., the remaining resources of the released resources that will not be used) to parent node 505. In some cases, the uplink message (e.g., the uplink resource return message) may be carried by PUCCH or uplink MAC CE.

In some examples, IAB node 510 may transmit a resource request 530 to parent node 505. The resource request 530 may be an uplink explicit or implicit request for using soft resources. An explicit request may be the request for using soft resources, and additional information such as a number of requested resources may also be provided. In some cases, the additional information may be included in the resource request 530. An implicit request may be some related information. For example, traffic loading, resource utilization of the IAB node 510 over its child links (e.g., resource utilization over child link 520), etc. may trigger the release of resources by the parent node 505. For example, high resource utilization of the child link of the IAB node 510 may trigger release of resources by parent node 505 such that IAB node 510 may use additional resources. In some cases, the traffic loading or resource utilization may be monitored by parent node 505, when the traffic loading or resource utilization exceeds some threshold, the parent node 505 may release resources. When traffic loading or resource utilization is below a threshold, indicating low traffic demand, the parent node 505 may determine not to release resources. The uplink resource request 530 may be carried by PUCCH, an uplink MAC CE, an uplink RRC message, etc. Upon reception of the uplink request, parent node 505 may determine whether an explicit or implicit downlink indication is to be used for the IAB node 510 (e.g., for the IAB node 510 on its use of soft resources).

Figure 6A:
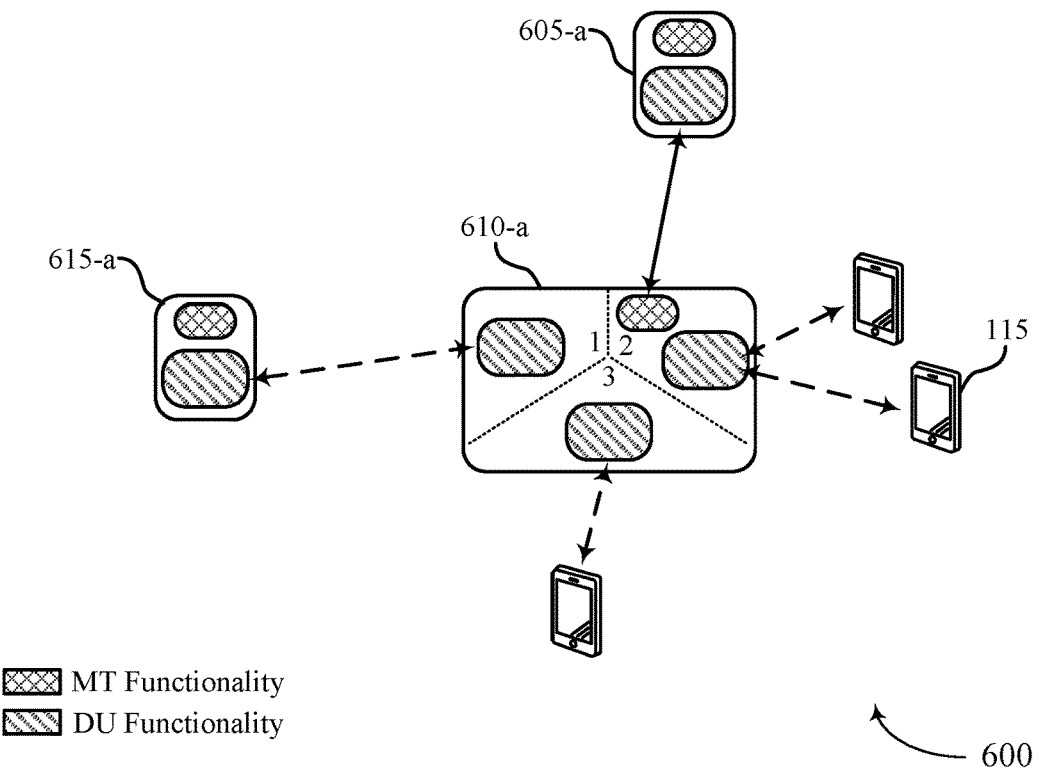
FIGS. 6A and 6B illustrate examples of IAB chains that support techniques for updating resource types in accordance with aspects of the present disclosure.
Figure 6B:
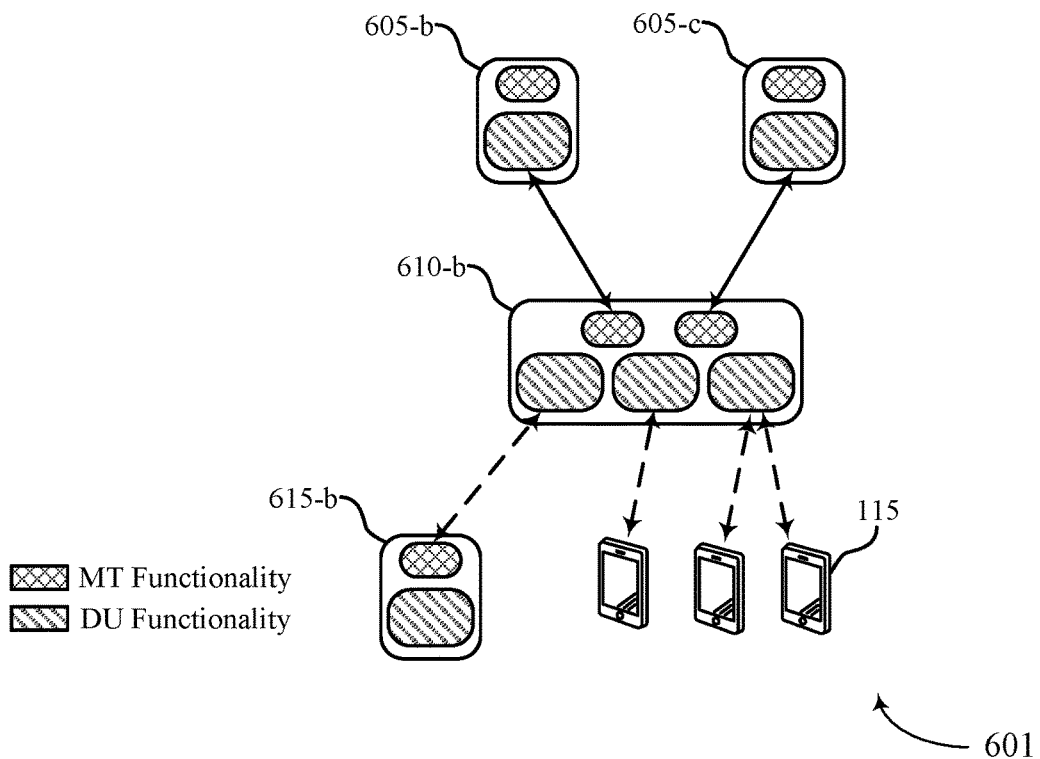

FIG. 6 illustrates examples of IAB chain 600 and IAB chain 601, each of which may support techniques for updating resource types in accordance with one or more aspects of the present disclosure. In some examples, IAB chain 600 and IAB chain 601 may implement aspects of wireless communications system 100, wireless communications system 200, and wireless communications system 300. For example, IAB chain 600 and IAB chain 601 may each illustrate a perspective of an IAB node 610 (e.g., a relay network device, a relay IAB node, etc.) and may include parent nodes 605 and child nodes (e.g., child nodes 615 and UEs 115), as described above with reference to FIGS. 1 through 3. Specifically, IAB chain 600 may illustrate an IAB node 610-*a* that includes multiple DU entities, and IAB chain 601 may illustrate an IAB node 610-*b* that includes multiple DU entities and multiple MT entities.

IAB chain 600 may include IAB node 610-*a* relaying information (e.g., communications) between parent node 605-*a* and one or more of child node 615-*a* and child node UEs 115. The IAB node 610-*a* may include a single MT entity and multiple DU entities (e.g., three DU entities). Further, the single MT entity of IAB node 610-*a* may be connected to a single parent node (e.g., parent node 605-*a*) via a single parent link.

IAB chain 601 may include IAB node 610-*b* relaying information (e.g., communications) between parent nodes 605-*b* and 605-*c*, and one or more of child node 615-*b* and child node UEs 115. The IAB node 610-*b* may include multiple MT entities (e.g., two MT entities) and multiple DU entities (e.g., three DU entities). Further, the each MT entity of IAB node 610-*b* may be connected to a single parent node (e.g., IAB node 610-*b* may be connected to parent node 605-*b* via a first parent link between a first MT of the IAB node 610-*b* and the parent node 605-*b*, and may be connected to parent node 605-*c* via a second parent link between a second MT of the IAB node 610-*b* and the parent node 605-*c*) via a single parent link.

In some cases, for an IAB node with one MT and multiple DUs (e.g., such as IAB node 610-*a*), the downlink resource release indication (e.g., such as the indication 525, as discussed with reference to FIG. 5) received by the IAB node may be applicable to all DUs by default. For example, parent node 605-*a* may transmit a downlink resource release indication to IAB node 610-*a*, and the IAB node 610-*a* may schedule resources (e.g., child link resources associated with the released parent link resources) over all child links (e.g., any or all DUs of IAB node 610-*a* may schedule resources on their respective child links). In other cases, the downlink resource release indication may specify a set of DUs the resource release is applicable for. For example, parent node 605-*a* may transmit a downlink resource release indication to IAB node 610-*a*, and the downlink resource release indication may indicate a set of DUs for which the resource release applies. The IAB node 610-*a* may schedule resources (e.g., child link resources associated with the released parent link resources) over child links associated with the indicated set of DUs (e.g., only the DUs of the indicated set of DUs may schedule resources on their respective child links). For example, IAB node 610-*a* may have three DUs, where each DU serves a sector of the coverage area covered by the IAB node 610-*a*. In some cases, IAB node 610-*a* may have one MT from one sector to connect to parent node 605-*a*. In cases where IAB node 610-*a* includes a DU for each sector, a downlink resource release indication received by the MT may be applied to all DUs, may be applied to a set of DUs indicated by the downlink indication, or may be applied to only the DUs in the MTs sector of IAB node 610-*a*.

For an IAB node with multiple parent nodes (e.g., such as IAB node 610-*b*), the IAB node may be notified of semi-static resource patterns (e.g., resource type assignments for a slot configuration) of its parent nodes. For example, IAB node 610-*b* may be notified of the semi-static resource patterns of each of parent node 605-*b* and parent node 605-*c*. In some cases, parent node 605-*b* and parent node 605-*c* may each send their semi-static resource pattern to IAB node 610-*b* over their respective 5GNR Uu interfaces with IAB node 610-*b*. In some cases, a central entity (e.g., such as a CU of the IAB donor) may notify the IAB node 610-*b* of semi-static resource patterns of each parent node associated with the IAB node 610-*b* (e.g., parent node 605-*b* and parent node 605-*c*) over a F1-AP interface.

The reaction of an IAB node to a downlink resource release indication received from one parent node (e.g., for IAB node control of its soft resources) may depend on the corresponding resource types of the other parent nodes associated with the IAB node. That is, an IAB node with multiple parent nodes may refer to the semi-static resource patterns of each parent node when considering usage of soft resources based on received resource release indications. For example, IAB node 610-*b* may receive a resource release indication from a parent node 605-*b* and may confirm the released resource corresponds to a N.A. resource type of the parent node 605-*c* (e.g., via the semi-static resource pattern of parent node 605-*c*) prior to using the soft resource for the child link of IAB node 610-*b*.

If the corresponding resource type from parent node 605-*c* is known to be a Hard Rx or a Soft Rx (e.g., known from the semi-static resource pattern of parent node 605-*c*), the IAB node 610-*b* may only use the child link Soft Rx if downlink resource release indications are received from both parent node 605-*b* and parent node 605-*c*. That is, for a given child link Soft Rx resource type assignment to be used by IAB node 610-*b*, the IAB node 610-*b* may refer to semi-static resource patterns of each parent node associated with the IAB node 610-*b*. If all parent nodes are configured with a N.A. resource type, the IAB node 610-*b* may use the soft resource. Otherwise, the IAB node 610-*b* may use the soft resource if a downlink resource release indication is received from each parent node that is configured with a Hard Rx or Soft Rx resource type (e.g., a downlink resource release indication may not need to be received from parent nodes with N.A. resource type).

Further, IAB nodes with multiple child nodes may signal other child node's information to one child node to allow interference coordination among them. That is, an IAB node with multiple child nodes may signal information of each child node, to each child node. Child node information may include DU's resource pattern (e.g., Hard Rx, Soft Rx, N.A.) and/or dynamic downlink indication for controlling soft-resources of child IAB node, semi-static and/or dynamic slot format configuration, semi-static resource allocation and/or dynamic resource allocation by DCI scheduling grant, etc. Such information for each child node may be sent to all child nodes served by the IAB node. For example, an IAB node with multiple child nodes may signal each DU resource pattern (e.g., each child link resource pattern) to all child nodes such that the child nodes may more efficiently coordinate communications over the IAB node's child links (e.g., over the child node's parent links to the IAB node).

Figure 7:
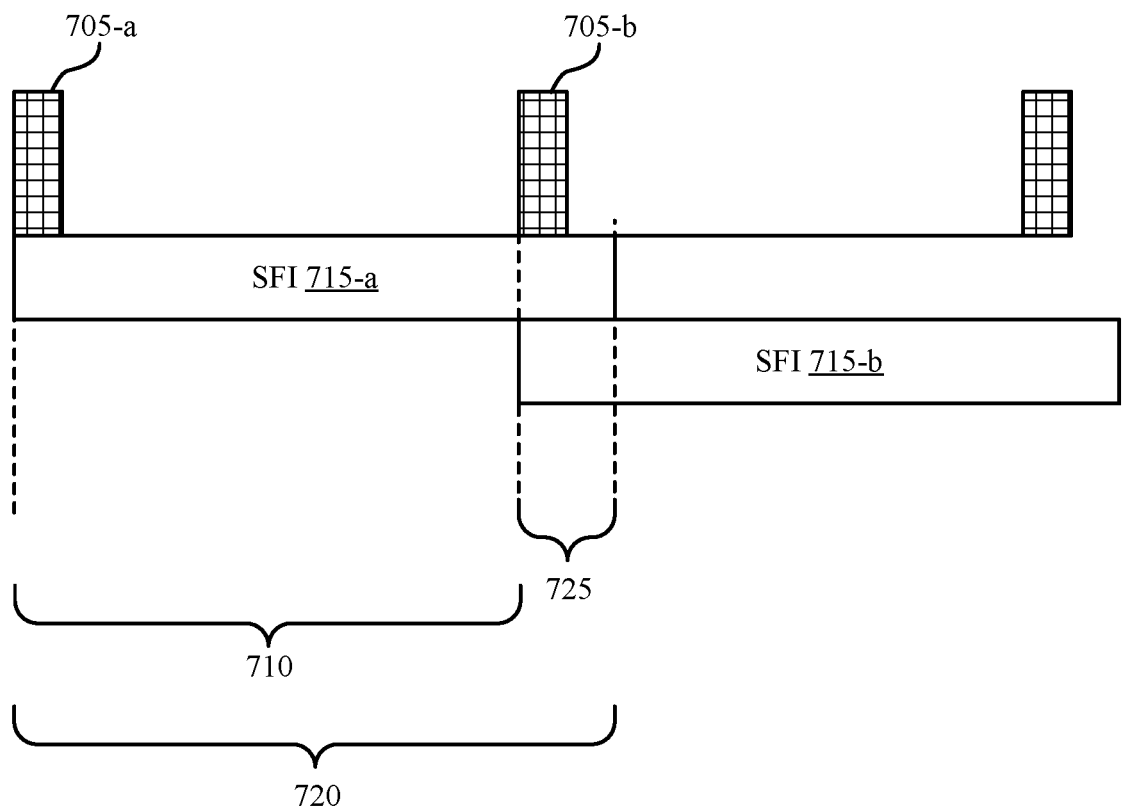
FIG. 7 illustrates an example of slot format indicator (SFI) signaling that supports techniques for updating resource types in accordance with aspects of the present disclosure.

FIG. 7 illustrates an example of SFI signaling 700 which may support techniques for updating resource types in accordance with one or more aspects of the present disclosure. In some examples, SFI signaling 700 may implement aspects of wireless communications system 100, wireless communications system 200, and wireless communications system 300. For example SFI signaling 700 may illustrate SFI signaling from a base station or parent node to a UE 115 or network device (e.g., an access node, IAB node, relay node, etc.), as described above with reference to FIGS. 1 through 6.

In some wireless communications systems (e.g., in 5GNR systems), SFI may be enabled when resources for SFI are configured by RRC. SFI may be included in GC-PDCCH, and may indicate the format of some number of slots. For example, some wireless communications systems may allow for dynamic assignment of symbol or slot link direction (e.g., where uplink and downlink directions may be dynamically assigned for symbols or slots within a subframe). In some cases, a SFI may be used to denote whether a given symbol in a slot is used for uplink, downlink, or flexible.

A UE may periodically monitor configured GC-PDCCH for reception of SFI (e.g., SFI may be included in GC-PDCCH). For example, in cases where a base station (e.g., a gNB) has GC-PDCCH information to transmit or update, the base station may transmit GC-PDCCH 705 at configured periodic occasions according to some GC-PDCCH periodicity 710. A base station (e.g., a gNB) may dynamically determine whether or not to update SFI, and, in some cases, may transmit updated SFI (e.g., when updated). GC-PDCCH 705-*a* may include SFI 715-*a*, where SFI 715-*a* may indicate a format for a number of slots (e.g., a number of slots corresponding to duration 720). In some cases, the number of slots indicated by SFI may be greater than the periodicity of GC-PDCCH (e.g., duration 720, corresponding to the duration SFI 715-*a* applies, may be greater than GC-PDCCH periodicity 710). As such, a next GC-PDCCH (e.g., GC-PDCCH 705-*b*) may be transmitted by the base station prior to the expiration of the SFI 715-*a*. In some cases, GC-PDCCH 705-*b* may include SFI 715-*b*. As duration 720 exceeds GC-PDCCH periodicity 710, the resources associated with duration 725 may be associated with overlapping SFIs (e.g., SFI 715-*a* and SFI 715-*b* may overlap over duration 725). In some cases, the overlapped resources from two SFIs (e.g., slots corresponding to duration 725) may be associated with the same slot format (e.g., SFI 715-*a* and SFI 715-*b* may indicate the same format for slots corresponding to the overlapped region (e.g., duration 725)). In some cases, the overlapped resources with the same indication may be used to handle GC-PDCCH decoding delay (e.g., SFI 715-*a* may indicate a format for a number of slots that exceeds the GC-PDCCH periodicity 710 to allow for decoding of the GC-PDCCH 705-*b*).

Figure 8:
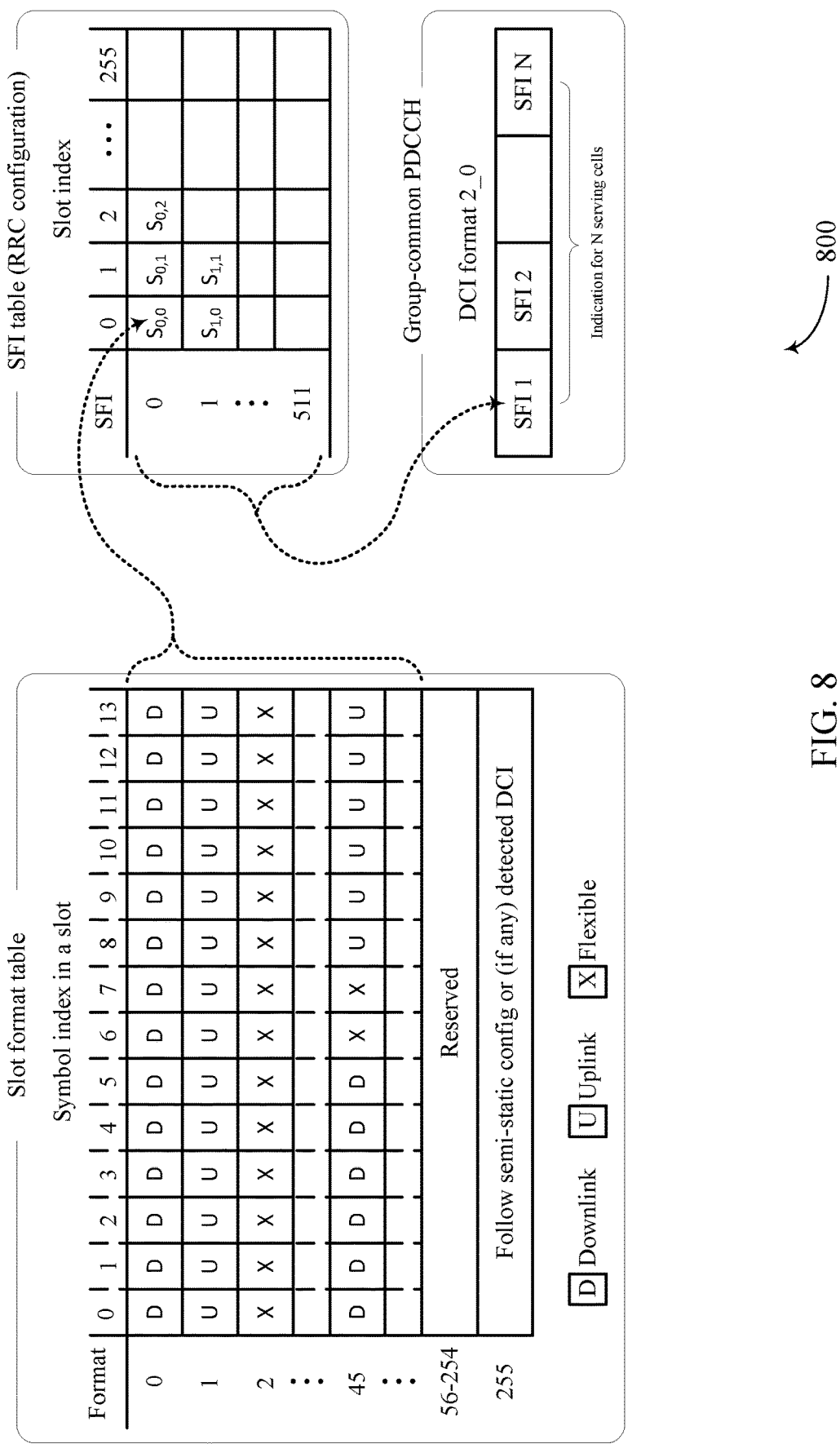
FIG. 8 illustrates an example of SFI mapping that support techniques for updating resource types in accordance with aspects of the present disclosure.

FIG. 8 illustrates an example of SFI mapping 800 which may support techniques for updating resource types in accordance with one or more aspects of the present disclosure. In some examples, SFI mapping 800 may implement aspects of wireless communications system 100, wireless communications system 200, and wireless communications system 300. For example, SFI mapping 800 may illustrate mapping of SFI to slot formats, such that a base station (e.g., or parent node) may convey a slot format to a UE 115 or network device (e.g., an access node, IAB node, relay node, etc.). The receiving device may receive the SFI, and may identify a slot format (e.g., based on a lookup table (LUT) and the SFI).

In some wireless communications systems (e.g., 5GNR systems), the SFI value carried by GC-PDCCH DCI 2_0 for a given cell may point to an entry in a SFI table configured by RRC. Each entry in the RRC-configured SFI table may indicate a slot format over a number of slots. The number of slots in each entry may be different (e.g., with a max value of 255), and each slot may have a different format.

Figure 9:
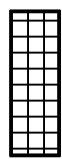
FIG. 9 illustrates an example of SFI signaling that supports techniques for updating resource types in accordance with aspects of the present disclosure.
Figure 9:
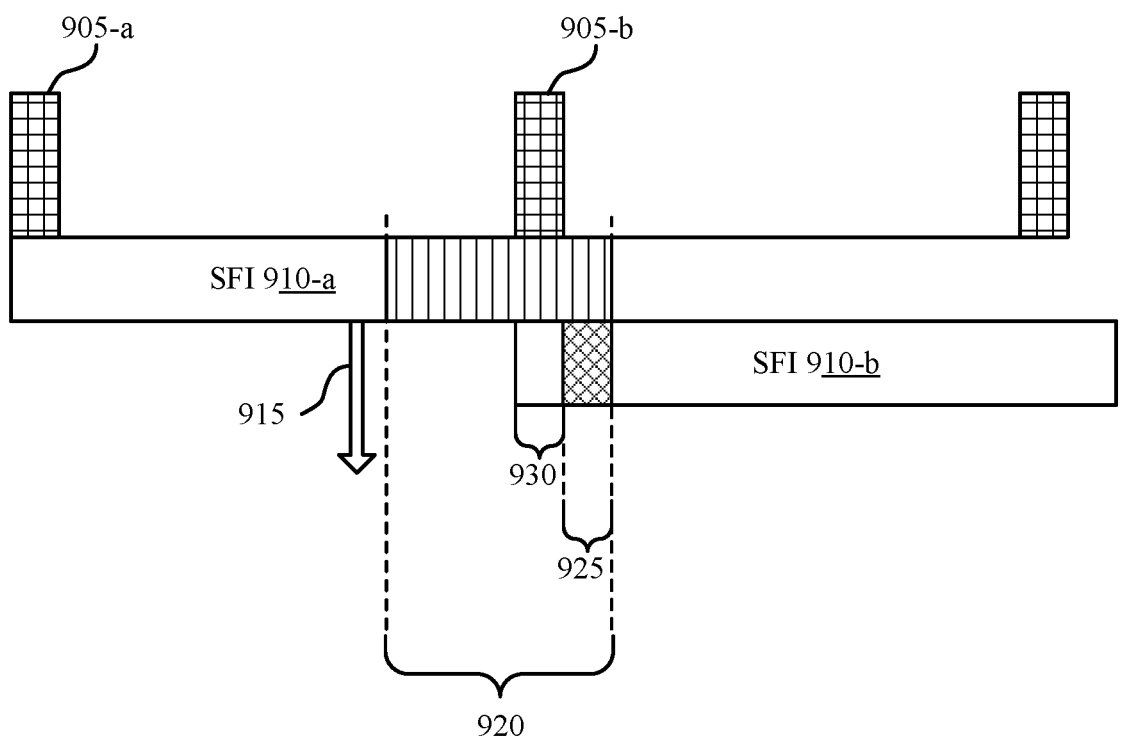

FIG. 9 illustrates an example of SFI signaling 900 which may support techniques for updating resource types in accordance with one or more aspects of the present disclosure. In some examples, SFI signaling 900 may implement aspects of wireless communications system 100, wireless communications system 200, and wireless communications system 300. For example SFI signaling 900 may illustrate SFI signaling from a base station or parent node to a UE 115 or network device (e.g., an access node, IAB node, relay node, etc.), as described above with reference to FIGS. 1 through 8. Specifically, SFI signaling 900 may illustrate two techniques for updating SFI. In some cases, SFI signaling 900 may be implemented between a base station and a UE (e.g., a base station may overwrite SFI indicated to a UE). In other cases, SFI signaling 900 may be implemented in an IAB network between a parent node and a child node (e.g., a parent node may overwrite SFI indicated to a child node).

GC-PDCCH 905-*a* may include SFI 910-*a*, where SFI 910-*a* may indicate a format for a number of slots. According to the techniques described herein, a DCI scheduling grant may be enhanced with a new field to cancel slot format indications (e.g., SFI) for remaining slots indicated by a previously transmitted SFI. For example, DCI grant 915 may include a field to cancel the format indicated by SFI 910-*a* (e.g., for the remaining slots the SFI 910-*a* applies to). A receiving device (e.g., a child node or UE) may receive the DCI grant 915, decode the DCI grant 915, and cancel the SFI 910-*a* (e.g., cancel the format indicated by the SFI 910-*a*) for the remaining duration 920 the SFI 910-*a* applies to. In some cases, the DCI grant 915 (e.g., the new field of DCI grant 915) may include a toggle bit that indicates whether or not the previous SFI (e.g., SFI 910-*a*) is to be canceled. In other cases, the DCI grant 915 (e.g., the new field of DCI grant 915) may include multiple bits to indicate a new format for the remaining duration 920 (e.g., the multiple bits may indicate a new SFI, an SFI offset from the current SFI, a format of some preconfigured default set of SFI that may be indicated by the DCI grant 915, etc.).

As discussed above (e.g., with reference to FIG. 7), in some cases, the number of slots indicated by SFI 910-a may be greater than the periodicity of GC-PDCCH. In such cases, a later SFI (e.g., SFI 910-b) may overwrite a previous SFI (e.g., SFI 910-a) over a subset of overlapped resources (e.g., over duration 925). In some examples, the subset of overlapped resources (e.g., over duration 925) may refer to, or be based on, slots that are N slots away from the latest GC-PDCCH occasion (e.g., GC-PDCCH 905-b), where N depends on PDCCH decoding delay (e.g., duration 930). That is, the SFI overwrite region (e.g., duration 925) may correspond to the time the PDCCH may be decoded, due to when the GC-PDCCH is received and the PDCCH decoding delay, until the time the previous SFI (e.g., SFI 910-a) expires.

The techniques described above may be used in cases where a base station (e.g., gNB) wants to change a previous decision slot formats (e.g., based on most recent information). The techniques are shown as being implemented together (e.g., SFI signaling 900 illustrates an SFI update via enhanced DCI grant 915 and an SFI update via later SFI overwrite), however, in some examples either technique may be implemented alone or a single technique may be repeated for additional SFI updates.

Figure 10:
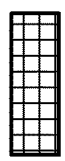
FIG. 10 illustrates an example of SFI signaling that supports techniques for updating resource types in accordance with aspects of the present disclosure.
Figure 10:
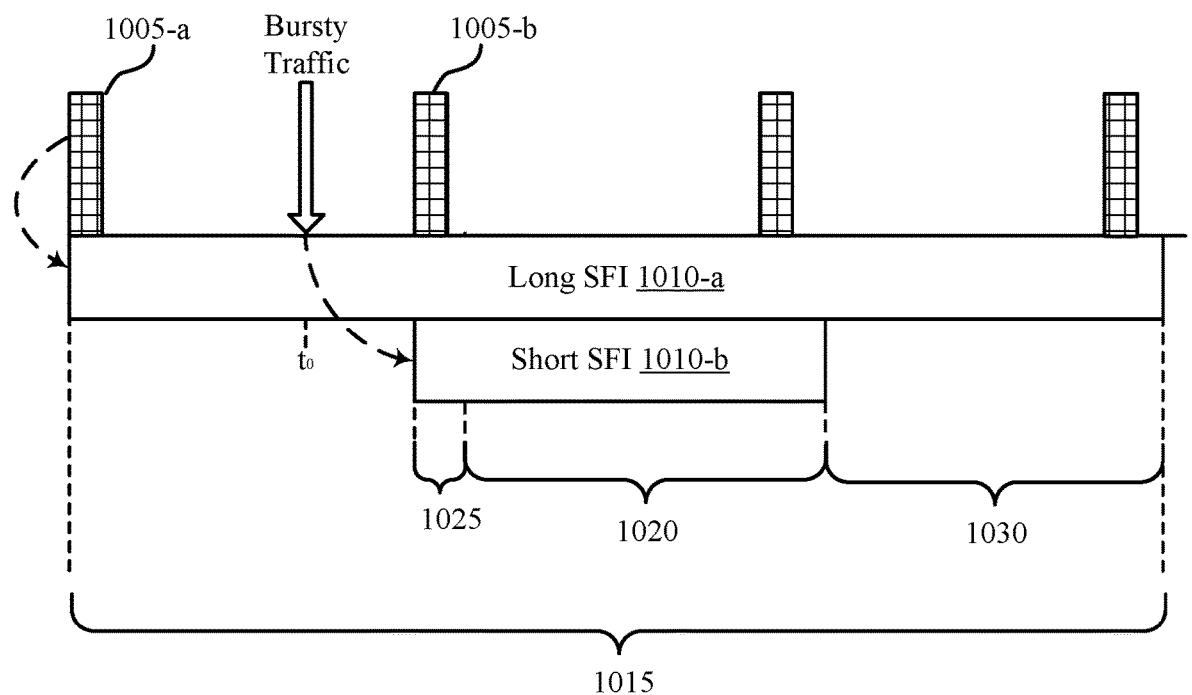

FIG. 10 illustrates an example of SFI signaling 1000 which may support techniques for updating resource types in accordance with one or more aspects of the present disclosure. In some examples, SFI signaling 1000 may implement aspects of wireless communications system 100, wireless communications system 200, and wireless communications system 300. For example SFI signaling 1000 may illustrate SFI signaling from a base station or parent node to a UE 115 or network device (e.g., an access node, IAB node, relay node, etc.), as described above with reference to FIGS. 1 through 9. Specifically, SFI signaling 1000 may illustrate a use case for updating SFI via later SFI overwrite. In some cases, SFI signaling 1000 may be implemented between a base station and a UE (e.g., a base station may overwrite SFI indicated to a UE). In other cases, SFI signaling 1000 may be implemented in an IAB network between a parent node and a child node (e.g., a parent node may overwrite SFI indicated to a child node).

In some cases, slot formats may be selected or configured based on traffic demands (e.g., such that it may be desirable to update SFI when traffic demand varies). For example, on average traffic demand may vary at a time scale of N1 slots. However, occasionally bursty traffic may arrive. As such, a wireless communications system may employ a GC-PDCCH periodicity of N2 slots (e.g., where N2<<N1), and an RRC-configured SFI table may include two set of entries for SFI updating. The RRC-configured SFI table may include a set of "long-format" entries (e.g., format entries for long SFI 1010-a) with a number of indicated slots as N1+delta slots (e.g., where delta slots account for processing delays), and a set of "short-format" entries (e.g., format entries for short SFI 1010-b) with a number of indicated slots as N2+delta slots.

GC-PDCCH 1005-a may include long SFI 1010-a, where long SFI 1010-a may indicate a format for a relatively large (e.g., N1+delta) number of slots (e.g., the number of slots corresponding to a duration 1015). At time $t_0$, bursty traffic may be identified. In some cases, it may be desirable to update the SFI (e.g., the format indicated by SFI 1010-a) upon detection of bursty traffic. As such, at the next GC-PDCCH occasion following time $t_0$ (e.g., GC-PDCCH 1005-b) a short SFI may be overwrite the long SFI (e.g., for the duration of the bursty traffic). For example, GC-PDCCH 1005-b may include short SFI 1010-b, where short SFI 1010-b may indicate a format for a relatively short (e.g., N2+delta) number of slots. The short SFI 1010-b may overwrite the long SFI 1010-a over duration 1020 (e.g., which may be based on PDCCH decoding delay 1025 associated with reception of the GC-PDCCH 1005-b that includes the short SFI 1010-b). In some cases, after the expiration of the SFI 1010-b, the SFI 1010-a may again be valid for the remainder of the N1+delta slots (e.g., over duration 1030). As such, a long SFI may be employed accounting for typical variations in traffic demand, and short SFIs may be used to temporarily overwrite the long SFI in scenarios where bursty traffic arises.

That is, a base station (e.g., gNB, parent node, etc.) may only send SFI with "long-format" every Floor(N1/N2) GD-PDCCH occasions. In some examples, only when bursty traffic arrives does the base station send SFI with "short format" on the next GC-PDCCH occasion to overwrite slot formats for overlapped slots. The techniques described above contemplates varying N1 and N2 based on traffic demand, however, selection of intervals for "long format" SFI and "short format" SFI may be based on traffic priority considerations, IAB network considerations (e.g., changing numbers of parent nodes and/or child nodes), or any other considerations or criteria for selecting slot formats that are readily recognized by one of skill in the art (e.g., as the intervals or frequency at which the criteria varies or the conditions change may be used to select N1 and N2).

Figure 11:
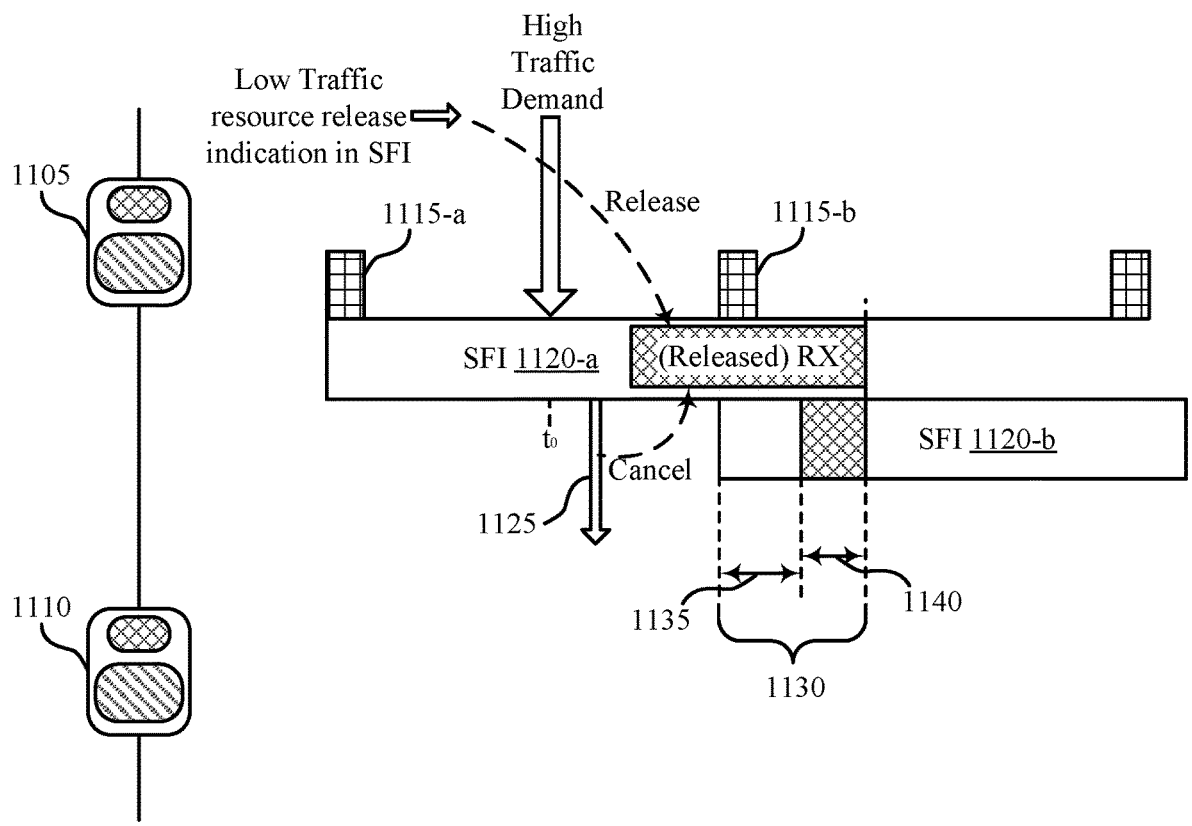
FIG. 11 illustrates an example of SFI signaling that supports techniques for updating resource types in accordance with aspects of the present disclosure.

FIG. 11 illustrates an example of SFI signaling 1100 which may support techniques for updating resource types in accordance with one or more aspects of the present disclosure. In some examples, SFI signaling 1100 may implement aspects of wireless communications system 100, wireless communications system 200, and wireless communications system 300. For example SFI signaling 1100 may illustrate SFI signaling from an IAB node 1105 to a child node 1110, as described above with reference to FIGS. 1 through 10. Specifically, SFI signaling 1100 may illustrate a use case for updating SFI in an IAB network.

At a first GC-PDCCH occasion (e.g., GC-PDCCH 1115-a), IAB node 1105 may have relatively low traffic demand, and IAB node 1105 may decide to release some of its resources so that its child node 1110 may use the related resources (e.g., the corresponding resources of the child node's child link) over the child node's own child links. That is, GC-PDCCH 1115-a may include SFI 1120-a, and SFI 1120-a may include a resource release indication. However, before the next GC-PDCCH occasion (e.g., before GC-PDCCH 1115-b), the IAB node 1105 may suddenly have a high traffic demand (e.g., IAB node 1110 may identify a high traffic demand or high traffic condition at time $t_0$) and may want to reclaim the released resources to the extent possible.

As such, the techniques described herein may provide for SFI resource release as well as SFI resource reclaim. In a first example, the IAB node 1105 may tag a new field on the next available DCI scheduling grant (e.g., DCI grant 1125) to cancel the remaining slot format indications by the previous SFI (e.g., SFI 1120-a). That is, IAB node 1105 may include SFI 1120-a in GC-PDCCH 1115-a, where SFI 1120-a include a resource release indication. At time $t_0$, IAB node 1105 may identify a high traffic demand, and may transmit an enhanced DCI grant 1125 to cancel remaining slot format indications in previous SFI 1120-*a* (e.g., and effectively claim some or all of the resources released by SFI 1120-*a*).

In a second example, at a next GC-PDCCH occasion (e.g. at GC-PDCCH 1115-*b*), the IAB node 1105 may send a new SFI to reclaim the released resources over some overlapped resources. That is, a later SFI (e.g., SFI 1120-*b*) may reclaim released resources over some overlapped resources (e.g., over duration 1140). As discussed above, in some cases, only a portion or subset released resources associated with an overlap duration 1130 may be reclaimed due to PDCCH decoding delay 1135.

Figure 12:
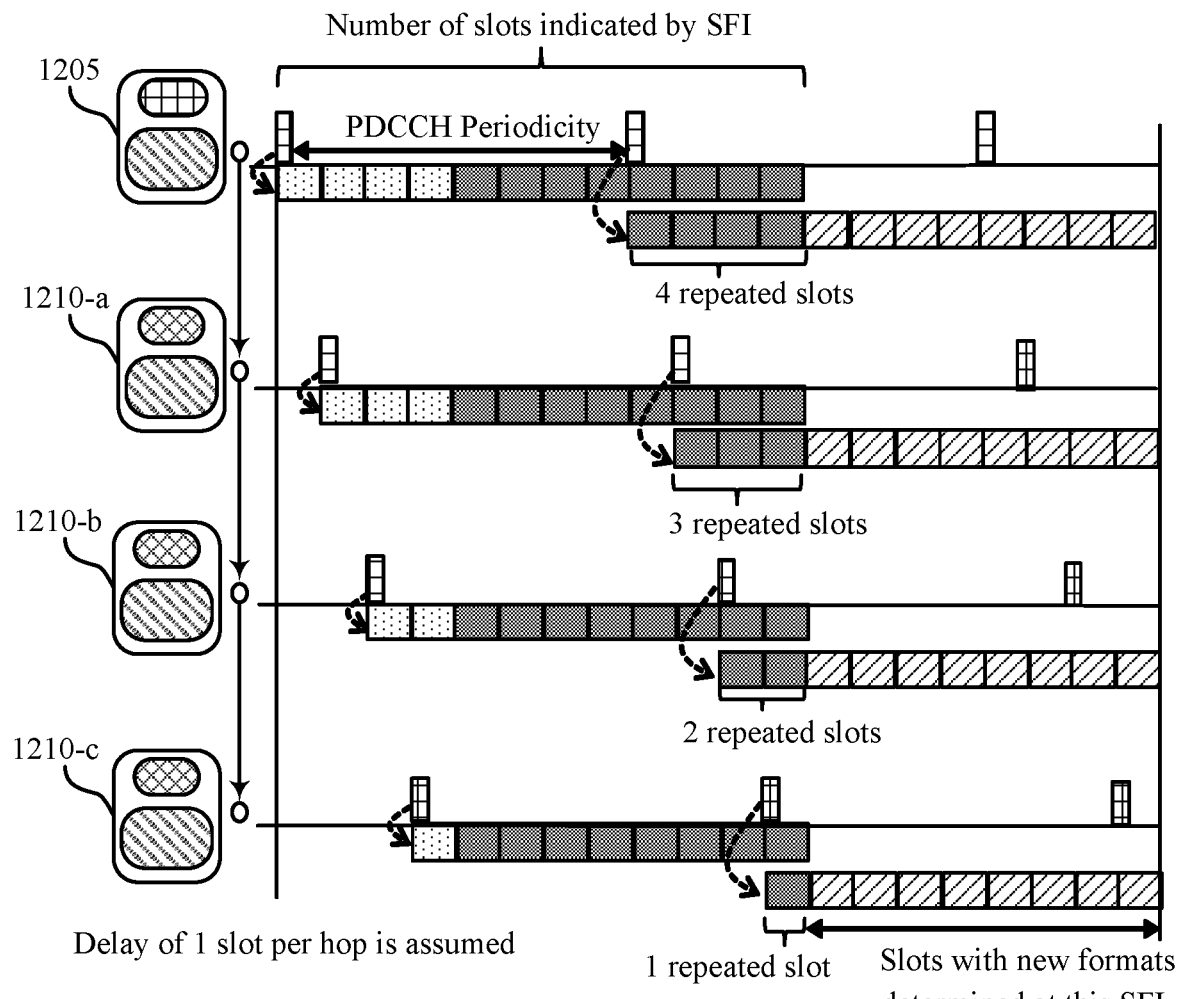
FIG. 12 illustrates an example of an SFI updating configuration that supports techniques for updating resource types in accordance with aspects of the present disclosure.

FIG. 12 illustrates an example of SFI updating configuration 1200 which may support techniques for updating resource types in accordance with one or more aspects of the present disclosure. In some examples, SFI updating configuration 1200 may implement aspects of wireless communications system 100, wireless communications system 200, and wireless communications system 300. For example, SFI updating configuration 1200 may illustrate SFI overwriting propagating through an IAB relay chain of IAB nodes 1205, as described above with reference to FIGS. 1 through 11. Specifically, SFI updating configuration 1200 may illustrate PDCCH decoding delay considerations for updating SFI in an IAB network.

In some cases, wireless communications systems may consider PDCCH decoding delays (e.g., SFI processing delays) when employing SFI overwrite techniques. For example, in an IAB network with multiple hops (e.g., in an IAB network with hops between IAB donor 1205, IAB node 1210-*a*, IAB node 1210-*b*, and IAB node 1210-*c*), the number of overlapped resources of SFI at an IAB node may be large at the first few hops (e.g., the hop between IAB donor 1205 and IAB node 1210-*a*, and the hop between IAB node 1210-*a* and IAB node 1210-*b*) in order to handle accumulated processing delay at the last hop (e.g., the hop between IAB node 1210-*b* and IAB node 1210-*c*). That is, the number of overlapped slots in SFI at an IAB node may depend on the number of hops underneath the IAB node. In some cases, slots with new formats may be determined at the SFI corresponding to the last hop (e.g., the hop between IAB node 1210-*b* and IAB node 1210-*c*). As such, a base station may consider the number of hops in the IAB chain (e.g., as well as the decoding delay ramifications associated with the number of hops) when employing SFI overwrite techniques (e.g., techniques where a later SFI is used to overwrite a previous SFI, as discussed in more detail above).

Figure 13:
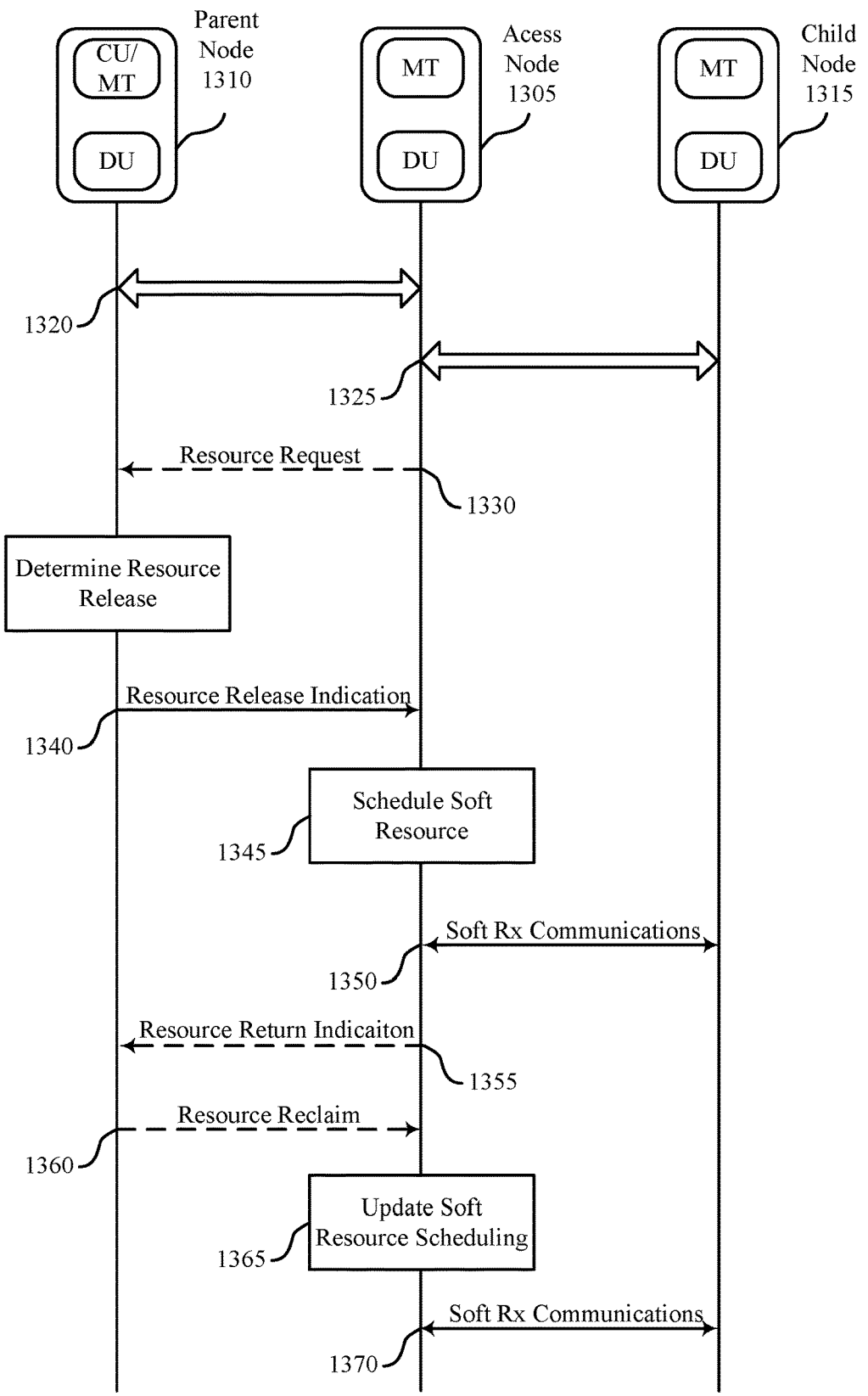
FIG. 13 illustrates an example of a process flow that supports techniques for updating resource types in accordance with aspects of the present disclosure.

FIG. 13 illustrates an example of a process flow 1300 that supports techniques for updating resource types in accordance with aspects of the present disclosure. In some examples, process flow 1300 may implement aspects of wireless communications system 100. Process flow 1300 may include an access node 1305 (e.g., a network device, an IAB node, etc.), a parent node 1310, and a child node 1315, which may be examples of the corresponding devices as described with reference to FIGS. 1 through 12. Process flow 1300 may illustrate a parent node determining to release a resource of a first link that corresponds to a parent-controlled resource of a child access node among various other aspects of the present disclosure. In the following description of the process flow 1300, the operations between the access node 1305, the parent node 1310, and the child node 1315 may be transmitted in a different order than the exemplary order shown, or the operations performed by the access node 1305, the parent node 1310, and the child node 1315 may be performed in different orders or at different times. In some cases, certain operations may also be left out of the process flow 1300, or other operations may be added to the process flow 1300.

At 1320, parent node 1310 may establish a first link between the parent node 1310 and access node 1305.

At 1325, parent node 1310 may establish a link between the access node 1305 and child node 1315.

At 1330, in some cases, access node 1305 may transmit a request to use the parent-controlled resource (e.g., a Soft Rx corresponding to a resource associated with the link established at 1325) to parent node 1310. In some cases, the request may be transmitted as a PUCCH message, an uplink MAC CE message, or a RRC message.

At 1335, parent node 1310 may determine to release resources of the first link (e.g., a resource associated with the link established at 1320) that corresponds to the parent-controlled resource of the access node 1305. That is, the parent node 1310 may determine to release a resource (e.g., associated with the link established at 1320) that corresponds to the parent-controlled resource associated with access node 1305 and the link established at 1325. In some cases, the parent node 1310 may determine to release resources corresponding to the parent controlled resource based on the request received at 1330.

At 1340, parent node 1310 may transmit downlink signaling indicating release of the resource (e.g., parent node 1310 may transmit a resource release indicator) to access node 1305. In some cases, the downlink signaling may include indicating timing information for the release of the resource (e.g., whether the release is a one-time release or a semi-persistent time period release). In some cases, the timing information may be transmitted separately from the resource release indication.

At 1345, the access node 1305 may schedule the parent-controlled resource corresponding to the released resource (e.g., based on the resource release indication received at 1340). That is, the access node 1305 may schedule the soft resources associated with the link established at 1325 for resource(s) that correspond to resources released by the parent node 1310 (e.g., as access node 1305 may be sure there will be no half-duplex conflicts during the resources released by its parent node 1310). In some cases, scheduling the parent-controlled resource may include scheduling DUs of the access node 1305 based at least in part on the downlink signaling received at 1340. For example, access node 1305 may identify a subset of DUs of the access node 1305 to which the downlink signaling corresponds and schedule the subset of the plurality of distributed units of the access node based at least in part on the downlink signaling. In some cases, scheduling the parent-controlled resource may include receiving a semi-static resource pattern for the parent access node and for each additional parent access node of the access node, identifying that a resource type of a resource corresponding to the resource release for the each additional parent access node is a not available resource type, and scheduling the subset of the plurality of DUs of the access node based at least in part on the downlink signaling and the resource type.

At 1350, the access node 1305 may communicate with child node 1315 in accordance with the scheduling performed at 1345.

At 1355, in some cases, access node 1305 may notify the parent node 1310 of returning unused released resources. For example, in some cases access node 1305 may only use some of the released resources, and may send an uplink message to notify parent node 1310 of returning the remaining unused released resources. In some cases, the uplink resource return message (e.g., the resource return indication) may be carried by PUCCH or an uplink MAC CE.

At 1360, in some cases, parent node 1310 may transmit second downlink signaling indicating that at least a portion of a resource corresponding to the resource release is being reclaimed. In some cases, such may be triggered based on the parent node 1310 identify a change in traffic load conditions, a change in traffic priority within the network, an IAB network configuration, etc.

At 1365, the access node 1305 may update its soft resource scheduling based on the resource reclaim request received from parent node 1310 at 1360.

At 1370, the access node 1305 may communicate with child node 1315 in accordance with the updated scheduling performed at 1365. In some cases, this may include refraining from further communication with the child node 1315 during the parent controlled resource (e.g., as the entirety of the remained may have been reclaimed by the parent node 1310).

Figure 14:
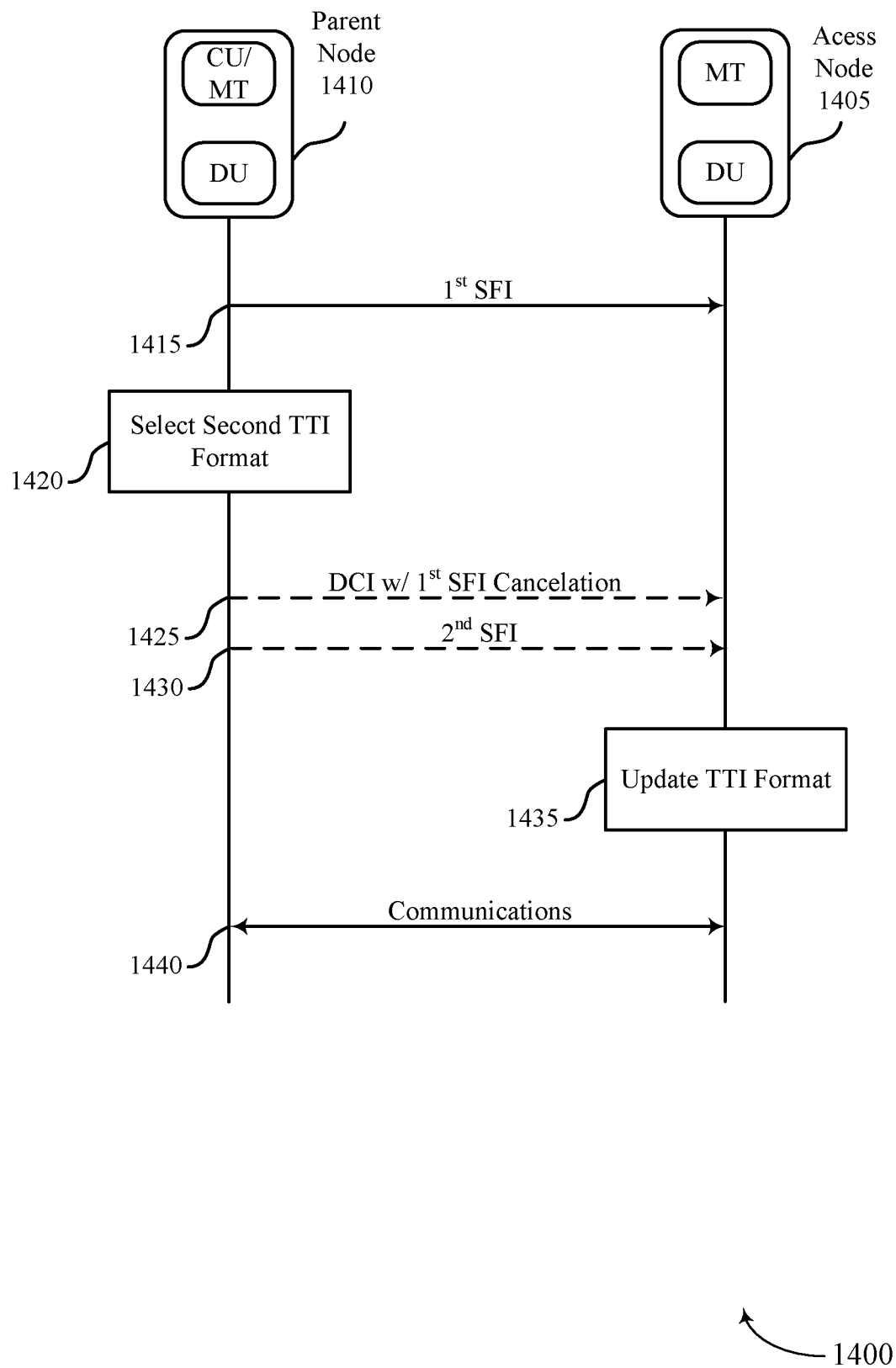
FIG. 14 illustrates an example of a process flow that supports techniques for updating resource types in accordance with aspects of the present disclosure.

FIG. 14 illustrates an example of a process flow 1400 that supports techniques for updating resource types in accordance with aspects of the present disclosure. In some examples, process flow 1400 may implement aspects of wireless communications system 100. Process flow 1400 may include an access node 1405 (e.g., a network device, an IAB node, etc.) and a parent node 1410, which may be examples of the corresponding devices as described with reference to FIGS. 1 through 13. Process flow 1400 may illustrate a parent node reclaiming one or more previously released resources from a child access node among various other aspects of the present disclosure. In the following description of the process flow 1400, the operations between the access node 1405 and the parent node 1410 may be transmitted in a different order than the exemplary order shown, or the operations performed by the access node 1405 and the parent node may be performed in different orders or at different times. In some cases, certain operations may also be left out of the process flow 1400, or other operations may be added to the process flow 1400.

At 1415, parent node 1415 may transmit, via a GC-PDCCH, a first TTI format indicator (e.g., a SFI) that indicates a first TTI format and a number of TTIs to which the TTI format applies. In some cases, the number of TTIs may exceed a periodicity of the GC-PDCCH.

At 1420, the parent node 1415 may select a second TTI format (e.g., a second SFI) for a subset of the number of TTIs. In some cases, the parent node 1415 may select a second TTI format based on a determination by the parent node 1410 to reclaim a subset of the number of TTIs. In some cases, selecting a second TTI format may refer to selecting a default TTI format for the subset of the number of TTIs.

At 1425, the parent node 1415 may, in some cases, transmit DCI including a cancellation indicator comprising a $1^{st}$ SFI cancellation. The DCI may comprise a DCI grant as described with reference to FIGS. 9 and 11. The DCI may indicate to access node 1405 to cancel the $1^{st}$ SFI for a remaining duration. In some cases, the DCI may include a toggle bit that indicates whether or not the previous SFI is to be canceled. In other cases, the DCI may include multiple bits to indicate a new format for the remaining duration.

At 1430, the parent node 1415 may, in some cases, transmit a cancellation indicator that indicates to cancel the first TTI format indicator (e.g., the first SFI) for the subset of the number of TTIs (e.g., for the remainder of the slots the SFI applies to).

At 1435, access node 1405 may update the TTI format based on the signaling received at 1425 and/or 1430. For example, the access node 1405 may cancel the first TTI format if a DCI cancellation is received at 1425, may overwrite the first TTI format with the second TTI format if a second TTI formation is received at 1430, etc.

At 1440, parent node 1410 and access node 1405 may communicate according to the updated TTI format. In some cases, such may refer to access node 1405 determining not to communicate within the subset of the number of TTIs based at least in part on the updated TTI format indicator.

Figure 15:
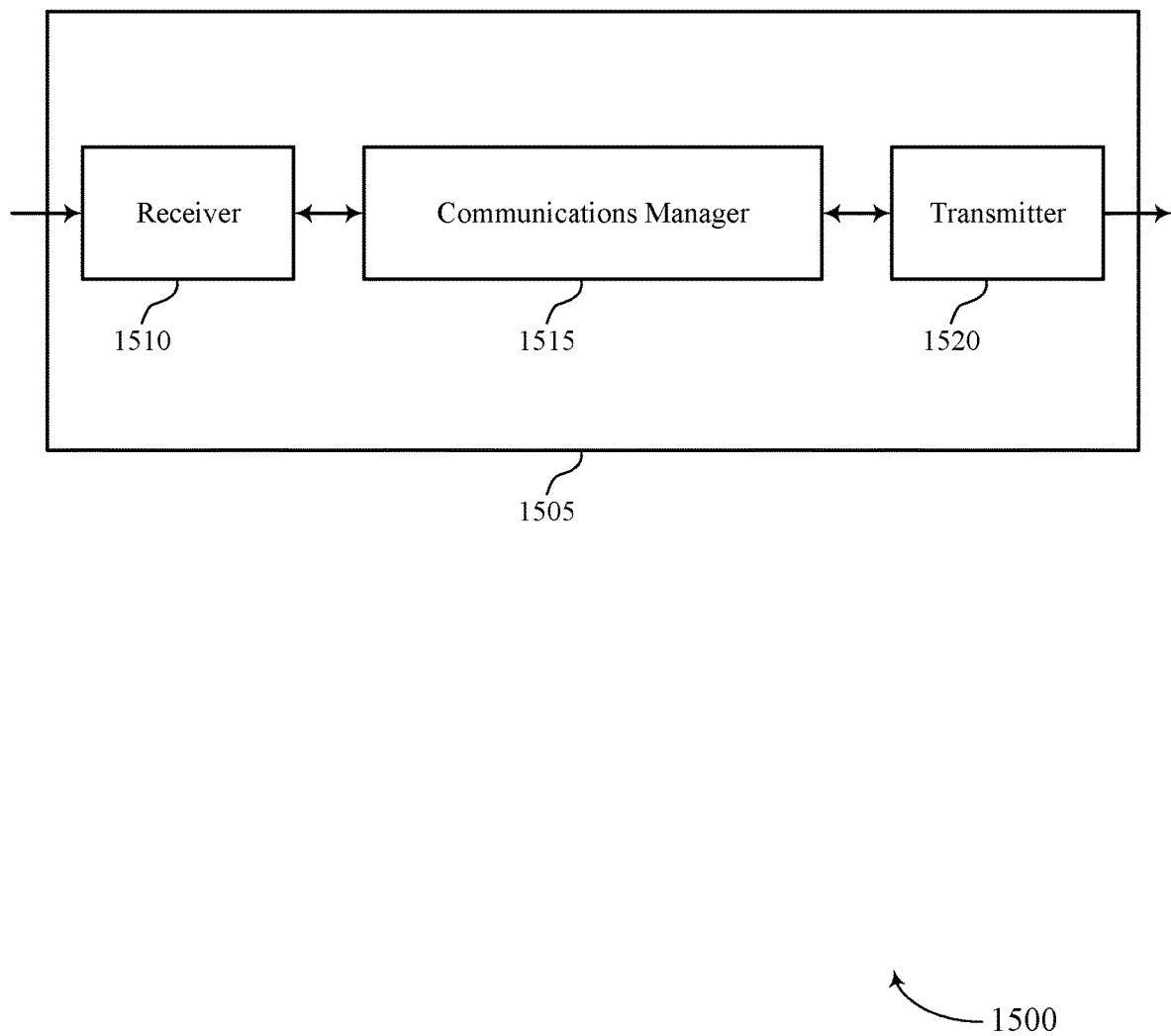
FIGS. 15 and 16 show block diagrams of devices that support techniques for updating resource types in accordance with aspects of the present disclosure.

FIG. 15 shows a block diagram 1500 of a device 1505 that supports techniques for updating resource types in accordance with aspects of the present disclosure. The device 1505 may be an example of aspects of an access node (e.g., a network device, IAB node, relay node, etc.) as described herein. The device 1505 may include a receiver 1510, a communications manager 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, and information related to techniques for updating resource types, etc.). Information may be passed on to other components of the device 1505. The receiver 1510 may be an example of aspects of the transceiver 1820 described with reference to FIG. 18. The receiver 1510 may utilize a single antenna or a set of antennas.

The communications manager 1515 may receive downlink signaling indicating a resource release for a resource of a first link configured between a parent access node and the access node, schedule a parent-controlled resource corresponding to the resource of a second link configured between the access node and a child access node based on the downlink signaling, and communicate with the child access node via the parent-controlled resource based on the scheduling. The communications manager 1515 may also receive, via a group-common control channel, a TTI format indicator (e.g., a SFI), identify a TTI format and a number of TTIs to which the TTI format applies based on the TTI format indicator, the number of TTIs exceeding a periodicity of the group-common control channel, communicate in accordance with the updated TTI format indicator for the subset of the number of TTIs, and update the TTI format indicator for a subset of the number of TTIs. The communications manager 1515 may be an example of aspects of the communications manager 1810 described herein.

The actions performed by the communications manager 1515 as described herein may be implemented to realize one or more potential advantages. One implementation may allow device 1505 to transmit downlink signaling indicating release of a resource. As such, a child node receiving the signaling may schedule a child link resource (e.g., a parent-controlled resource) corresponding to the released resource. This implementation may provide for efficient resource utilization, and may also enable efficient utilization of a processor of device 1505 such that the processor may enter a lower power state or a high power to as fewer resource may be unused by managing resource utilization in accordance with the techniques described herein.

The communications manager 1515, or its sub-components, may be implemented in hardware, code (e.g., software or firmware) executed by a processor, or any combination thereof. If implemented in code executed by a processor, the functions of the communications manager 1515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. In some cases, the communications manager 1515 may be a processor (e.g., a transceiver processor, or a radio processor, or a receiver processor). The processor may be coupled with memory and execute instructions stored in the memory that enable the processor to perform or facilitate the features discussed herein. A transceiver processor may be collocated with and/or communicate with (e.g., direct the operations of) a transceiver of the device. A radio processor may be collocated with and/or communicate with (e.g., direct the operations of) a radio (e.g., an LTE radio or a Wi-Fi radio) of the device. A receiver processor may be collocated with and/or communicate with (e.g., direct the operations of) a receiver of the device.

The communications manager 1515, or its sub-components, may be physically located at various positions, including being distributed such that portions of functions are implemented at different physical locations by one or more physical components. In some examples, the communications manager 1515, or its sub-components, may be a separate and distinct component in accordance with various aspects of the present disclosure. In some examples, the communications manager 1515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1520 may transmit signals generated by other components of the device 1505. In some examples, the transmitter 1520 may be collocated with a receiver 1510 in a transceiver module. For example, the transmitter 1520 may be an example of aspects of the transceiver 1820 described with reference to FIG. 18. The transmitter 1520 may utilize a single antenna or a set of antennas.

Figure 16:
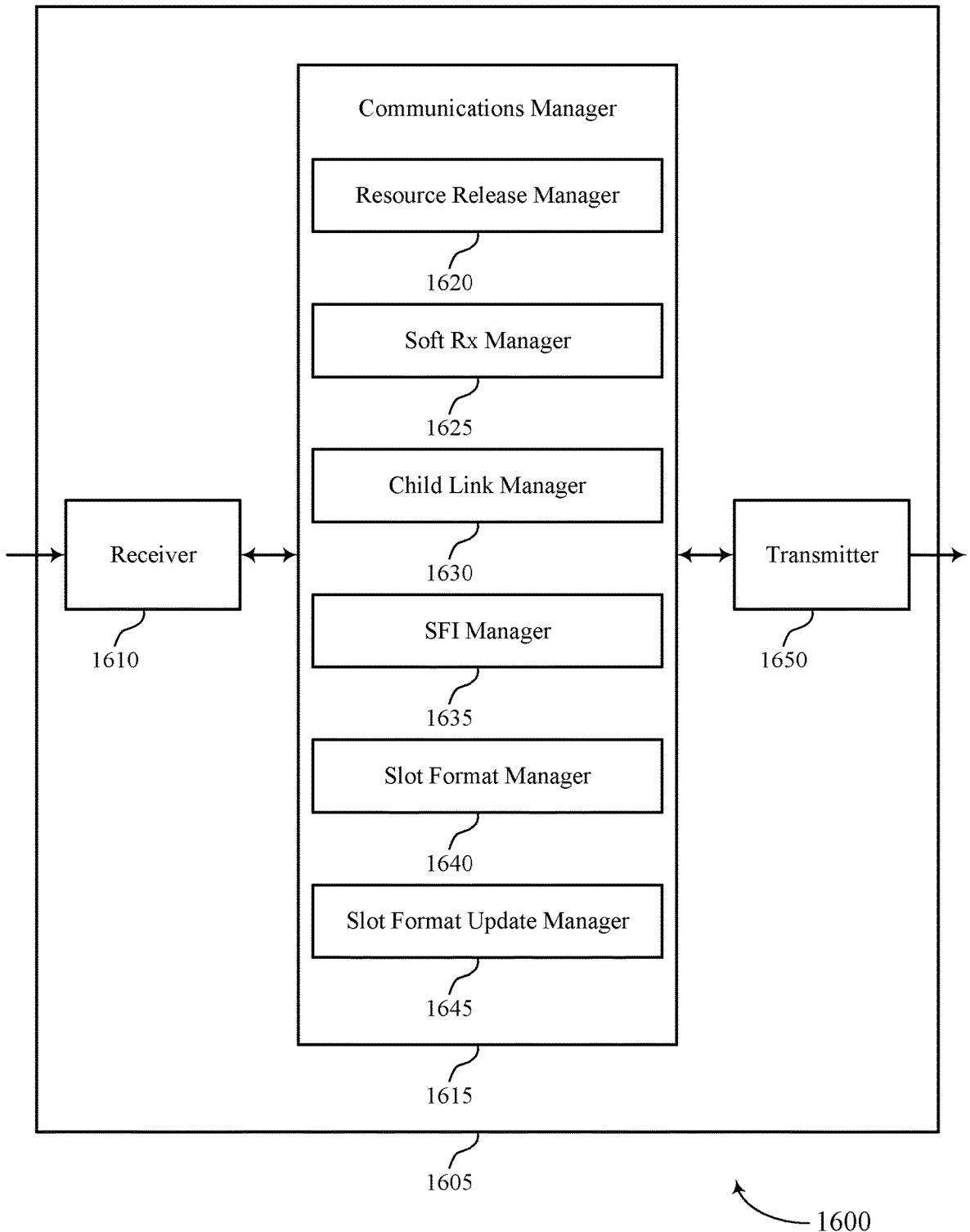

FIG. 16 shows a block diagram 1600 of a device 1605 that supports techniques for updating resource types in accordance with aspects of the present disclosure. The device 1605 may be an example of aspects of a device 1505, or a access node (e.g., a network device, IAB node, relay node, etc.) as described herein. The device 1605 may include a receiver 1610, a communications manager 1615, and a transmitter 1650. The device 1605 may also include a processor. Each of these components may be in communication with one another (e.g., via one or more buses).

The receiver 1610 may receive information such as packets, user data, or control information associated with various information channels (e.g., control channels, data channels, and information related to techniques for updating resource types, etc.). Information may be passed on to other components of the device 1605. The receiver 1610 may be an example of aspects of the transceiver 1820 described with reference to FIG. 18. The receiver 1610 may utilize a single antenna or a set of antennas.

The communications manager 1615 may be an example of aspects of the communications manager 1515 as described herein. The communications manager 1615 may include a resource release manager 1620, a Soft Rx manager 1625, a child link manager 1630, a SFI manager 1635, a slot format manager 1640, and a slot format update manager 1645. The communications manager 1615 may be an example of aspects of the communications manager 1810 described herein. In some cases, the resource release manager 1620, Soft Rx manager 1625, child link manager 1630, SFI manager 1635, slot format manager 1640, and slot format update manager 1645 may be one or more processors (e.g., transceiver processors, or radio processors, or receiver processors). The one or more processors may be coupled with memory and execute instructions stored in the memory that enable the processor to perform or facilitate the features discussed herein. A transceiver processor may be collocated with and/or communicate with (e.g., direct the operations of) a transceiver of the device. A radio processor may be collocated with and/or communicate with (e.g., direct the operations of) a radio (e.g., an LTE radio or a Wi-Fi radio) of the device. A receiver processor may be collocated with and/or communicate with (e.g., direct the operations of) a receiver of the device.

The resource release manager 1620 may receive downlink signaling indicating a resource release for a resource of a first link configured between a parent access node and the access node.

The Soft Rx manager 1625 may schedule a parent-controlled resource corresponding to the resource of a second link configured between the access node and a child access node based on the downlink signaling.

The child link manager 1630 may communicate with the child access node via the parent-controlled resource based on the scheduling.

The SFI manager 1635 may receive, via a group-common control channel, a TTI format indicator.

The slot format manager 1640 may identify a TTI format and a number of TTIs to which the TTI format applies based on the TTI format indicator, the number of TTIs exceeding a periodicity of the group-common control channel and communicate in accordance with the updated TTI format indicator for the subset of the number of TTIs.

The slot format update manager 1645 may update the TTI format indicator for a subset of the number of TTIs.

The transmitter 1650 may transmit signals generated by other components of the device 1605. In some examples, the transmitter 1650 may be collocated with a receiver 1610 in a transceiver module. For example, the transmitter 1650 may be an example of aspects of the transceiver 1820 described with reference to FIG. 18. The transmitter 1650 may utilize a single antenna or a set of antennas.

Figure 17:
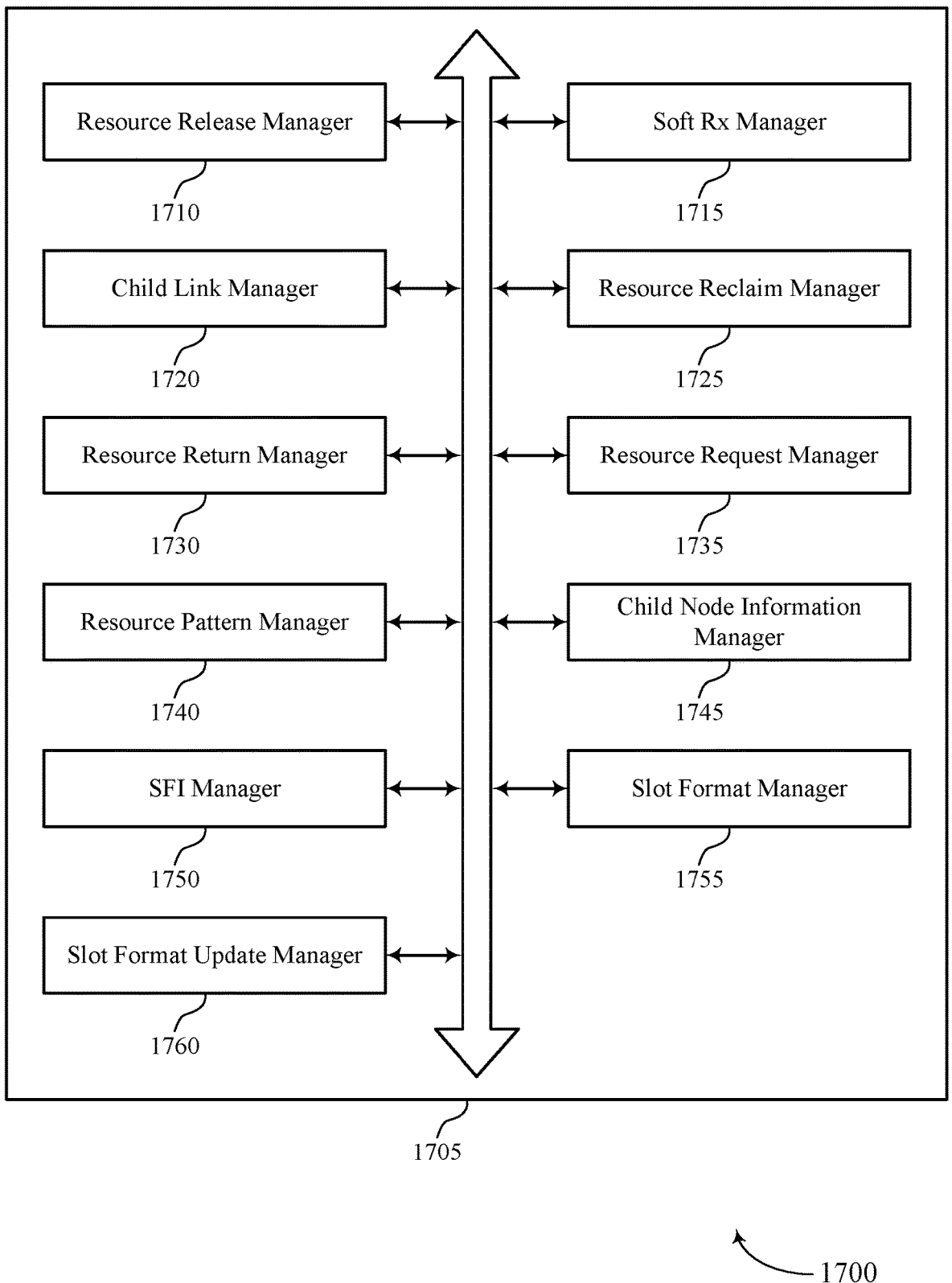
FIG. 17 shows a block diagram of a communications manager that supports techniques for updating resource types in accordance with aspects of the present disclosure.

FIG. 17 shows a block diagram 1700 of a communications manager 1705 that supports techniques for updating resource types in accordance with aspects of the present disclosure. The communications manager 1705 may be an example of aspects of a communications manager 1515, a communications manager 1615, or a communications manager 1810 described herein. The communications manager 1705 may include a resource release manager 1710, a Soft Rx manager 1715, a child link manager 1720, a resource reclaim manager 1725, a resource return manager 1730, a resource request manager 1735, a resource pattern manager 1740, a child node information manager 1745, a SFI manager 1750, a slot format manager 1755, and a slot format update manager 1760. Each of these modules may communicate, directly or indirectly, with one another (e.g., via one or more buses).

In some cases, the resource release manager 1710, Soft Rx manager 1715, child link manager 1720, resource reclaim manager 1725, resource return manager 1730, resource request manager 1735, resource pattern manager 1740, child node information manager 1745, SFI manager 1750, slot format manager 1755, and slot format update manager 1760 may be one or more processors (e.g., transceiver processors, or radio processors, or receiver processors). The one or more processors may be coupled with memory and execute instructions stored in the memory that enable the processor to perform or facilitate the features discussed herein. A transceiver processor may be collocated with and/or communicate with (e.g., direct the operations of) a transceiver of the device. A radio processor may be collocated with and/or communicate with (e.g., direct the operations of) a radio (e.g., an LTE radio or a Wi-Fi radio) of the device. A receiver processor may be collocated with and/or communicate with (e.g., direct the operations of) a receiver of the device.

The resource release manager 1710 may receive downlink signaling indicating a resource release for a resource of a first link configured between a parent access node and the access node. In some examples, the resource release manager 1710 may receive the downlink signaling indicating timing information corresponding to the resource release, where the scheduling of the parent-controlled resource of the second link is based on the timing information. In some examples, the resource release manager 1710 may receive the downlink signaling indicating the timing information that indicates a single time period for the resource release. In some examples, the resource release manager 1710 may receive the downlink signaling indicating the timing information that indicates a semi-persistent time period for the resource release. In some examples, the resource release manager 1710 may monitor for second downlink signaling indicating a second resource release for a third link between the at least one additional parent access node and the access node based on the resource type.

In some cases, the downlink signaling indicating the resource release is a TTI format indicator message, such as an SFI message, carried by a group-common physical downlink control channel, a downlink control information scheduling grant carried by a physical downlink control channel, or a MAC CE.

The Soft Rx manager 1715 may schedule a parent-controlled resource corresponding to the resource of a second link configured between the access node and a child access node based on the downlink signaling. In some examples, the Soft Rx manager 1715 may update scheduling of the parent-controlled resource based on the second downlink signaling. In some examples, the Soft Rx manager 1715 may determine to schedule the parent-controlled resource based on receiving the second downlink signaling indicating the second resource release. In some examples, the Soft Rx manager 1715 may determine not to schedule the parent-controlled resource based on determining that the second downlink signaling has not been received.

The child link manager 1720 may communicate with the child access node via the parent-controlled resource based on the scheduling. In some examples, the child link manager 1720 may schedule a set of distributed units of the access node based on the downlink signaling. In some examples, the child link manager 1720 may identify a subset of a set of distributed units of the access node to which the downlink signaling corresponds. In some examples, the child link manager 1720 may schedule the subset of the set of distributed units of the access node based on the downlink signaling. In some examples, the child link manager 1720 may schedule the subset of the set of distributed units of the access node based on the downlink signaling and the resource type.

The SFI manager 1750 may receive, via a group-common control channel, a TTI format indicator. In some examples, the SFI manager 1750 may receive, via a second instance of the group-common control channel, a second TTI format indicator that indicates a second TTI format, where the communication is in accordance with the second TTI format indicator. In some examples, the SFI manager 1750 may receive configuration signaling indicating a first value for a duration indicator that indicates the first number of TTIs to which the TTI format applies and a second value for the duration indicator that indicates a second number of TTIs to which a second TTI format applies. In some examples, the SFI manager 1750 may receive, via an instance of the group-common control channel, an indicator generated based on the TTI format indicator and the first value for the duration indicator.

The slot format manager 1755 may identify a TTI format and a number of TTIs to which the TTI format applies based on the TTI format indicator, the number of TTIs exceeding a periodicity of the group-common control channel. In some examples, the slot format manager 1755 may communicate in accordance with the updated TTI format indicator for the subset of the number of TTIs.

The slot format update manager 1760 may update the TTI format indicator for a subset of the number of TTIs. In some examples, the slot format update manager 1760 may receive, via a downlink control channel, downlink control information including a cancellation indicator that indicates to cancel the TTI format indicator for the subset of the number of TTIs. In some examples, the slot format update manager 1760 may determine not to communicate within the subset of the number of TTIs based on the updated TTI format indicator. In some examples, the slot format update manager 1760 may update the TTI format indicator to a default TTI format for the subset of the number of TTIs. In some examples, the slot format update manager 1760 may receive downlink control information generated based on the second value for the duration indicator and an indicator of the second TTI format.

The resource reclaim manager 1725 may receive second downlink signaling indicating that at least a portion of a resource corresponding to the resource release is being reclaimed.

The resource return manager 1730 may transmit an uplink message indicating that at least a portion of a resource corresponding to the resource release is not being used. In some cases, the uplink message is a physical uplink control channel message or an uplink medium access control message.

The resource request manager 1735 may indicate a request to use the parent-controlled resource, where the receiving the downlink signaling is based on the indicating. In some examples, the resource request manager 1735 may transmit the request as a physical uplink control channel message, an uplink medium access control message, or a radio resource control message. In some examples, the resource request manager 1735 may transmit at least one of a traffic load indicator or a resource utilization indicator to indicate the request.

The resource pattern manager 1740 may receive a semi-static resource pattern for the parent access node and for each additional parent access node of the access node. In some examples, the resource pattern manager 1740 may identify that a resource type of a resource corresponding to the resource release for the each additional parent access node is a not available resource type. In some examples, the resource pattern manager 1740 may receive a semi-static resource pattern for the parent access node and for each additional parent access node of the access node. In some examples, the resource pattern manager 1740 may determine a resource type for a corresponding resource for the each additional parent access node based on the semi-static resource pattern.

The child node information manager 1745 may receive child access node information corresponding to a child access node of the parent access node, where the parent-controlled resource is scheduled based on the child access node information. In some examples, the child node information manager 1745 may determine that a second child link has been established with a second child access node. In some examples, the child node information manager 1745 may transmit, to the child access node, second child access node information of the second child access node. In some examples, the child node information manager 1745 may transmit the second child access node information indicating a resource pattern of a distributed unit of the access node for the second child access node. In some examples, the child node information manager 1745 may transmit the second child access node information indicating a dynamic downlink indication for controlling a resource of the second child access node. In some examples, the child node information manager 1745 may transmit the second child access node information indicating a semi-static slot format configuration or a dynamic slot format configuration of the second child access node. In some examples, the child node information manager 1745 may transmit the second child access node information indicating a semi-static resource allocation or a dynamic resource allocation scheduled by a grant for the second child access node.

Figure 18:
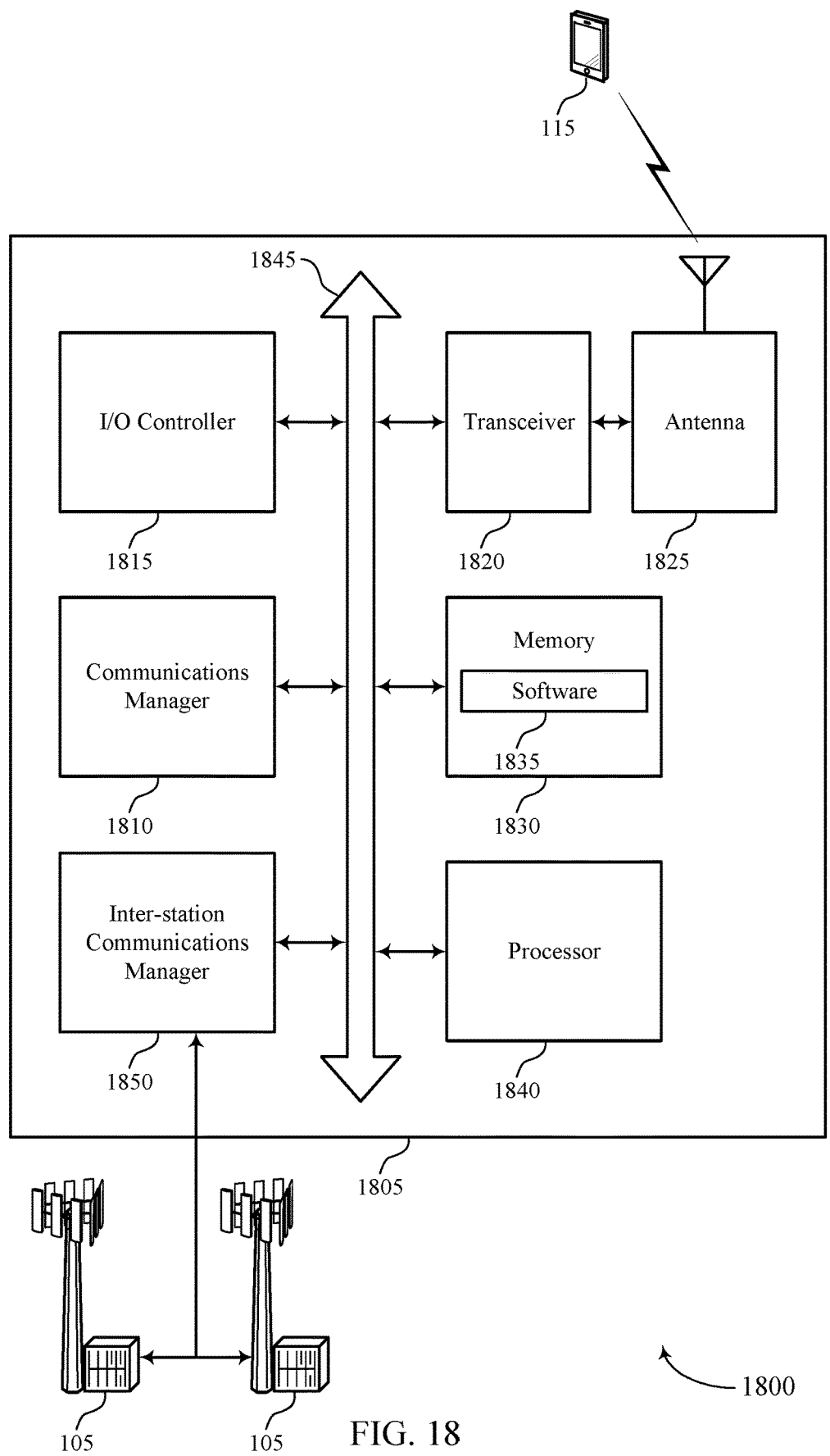
FIG. 18 shows a diagram of a system including a device that supports techniques for updating resource types in accordance with aspects of the present disclosure.

FIG. 18 shows a diagram of a system 1800 including a device 1805 that supports techniques for updating resource types in accordance with aspects of the present disclosure. The device 1805 may be an example of or include the components of device 1505, device 1605, or a access node (e.g., a network device, IAB node, relay node, etc.) as described herein. The device 1805 may include components for bi-directional voice and data communications including components for transmitting and receiving communications, including a communications manager 1810, an I/O controller 1815, a transceiver 1820, an antenna 1825, memory 1830, an inter-station communications manager 1850, and a processor 1840. These components may be in electronic communication via one or more buses (e.g., bus 1845).

The communications manager 1810 may receive downlink signaling indicating a resource release for a resource of a first link configured between a parent access node and the access node, schedule a parent-controlled resource corresponding to the resource of a second link configured between the access node and a child access node based on the downlink signaling, and communicate with the child access node via the parent-controlled resource based on the scheduling. The communications manager 1810 may also receive, via a group-common control channel, a TTI format indicator, identify a TTI format and a number of TTIs to which the TTI format applies based on the TTI format indicator, the number of TTIs exceeding a periodicity of the group-common control channel, communicate in accordance with the updated TTI format indicator for the subset of the number of TTIs, and update the TTI format indicator for a subset of the number of TTIs. The communications manager 1810 may be implemented with any combination of processor 1840, memory 1830, software 1835, and transceiver 1820, as well as with any other of the described components, to perform the various techniques described herein.

The I/O controller 1815 may manage input and output signals for the device 1805. The I/O controller 1815 may also manage peripherals not integrated into the device 1805. In some cases, the I/O controller 1815 may represent a physical connection or port to an external peripheral. In some cases, the I/O controller 1815 may utilize an operating system such as iOS®, ANDROID®, MS-DOS®, MS-WINDOWS®, OS/2®, UNIX®, LINUX®, or another known operating system. In other cases, the I/O controller 1815 may represent or interact with a modem, a keyboard, a mouse, a touchscreen, or a similar device. In some cases, the I/O controller 1815 may be implemented as part of a processor. In some cases, a user may interact with the device 1805 via the I/O controller 1815 or via hardware components controlled by the I/O controller 1815.

The transceiver 1820 may communicate bi-directionally, via one or more antennas, wired, or wireless links as described above. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some cases, the wireless device may include a single antenna 1825. However, in some cases the device may have more than one antenna 1825, which may be capable of concurrently transmitting or receiving multiple wireless transmissions.

The memory 1830 may include RAM and ROM. The memory 1830 may store computer-readable, computer-executable code or software 1835 including instructions that, when executed, cause the processor to perform various functions described herein. In some cases, the memory 1830 may contain, among other things, a BIOS which may control basic hardware or software operation such as the interaction with peripheral components or devices.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting techniques for updating resource types).

The software 1835 may include instructions to implement aspects of the present disclosure, including instructions to support wireless communications. The software 1835 may be stored in a non-transitory computer-readable medium such as system memory or other type of memory. In some cases, the software 1835 may not be directly executable by the processor 1840 but may cause a computer (e.g., when compiled and executed) to perform functions described herein.

The inter-station communications manager 1850 may manage communications with other network devices 105, and may include a controller or scheduler for controlling communications with child nodes in cooperation with other network devices 105. For example, the inter-station communications manager 1850 may coordinate scheduling for transmissions to child nodes for various interference mitigation techniques such as beamforming or joint transmission. In some examples, the inter-station communications manager 1850 may provide a wireless backhaul link for communication network devices 105. In some cases, the inter-station communications manager 1850 may be implemented with any combination of processor 1840, memory 1830, software 1835, and transceiver 1820, as well as with any other of the described components, to perform the various techniques described herein.

Figure 19:
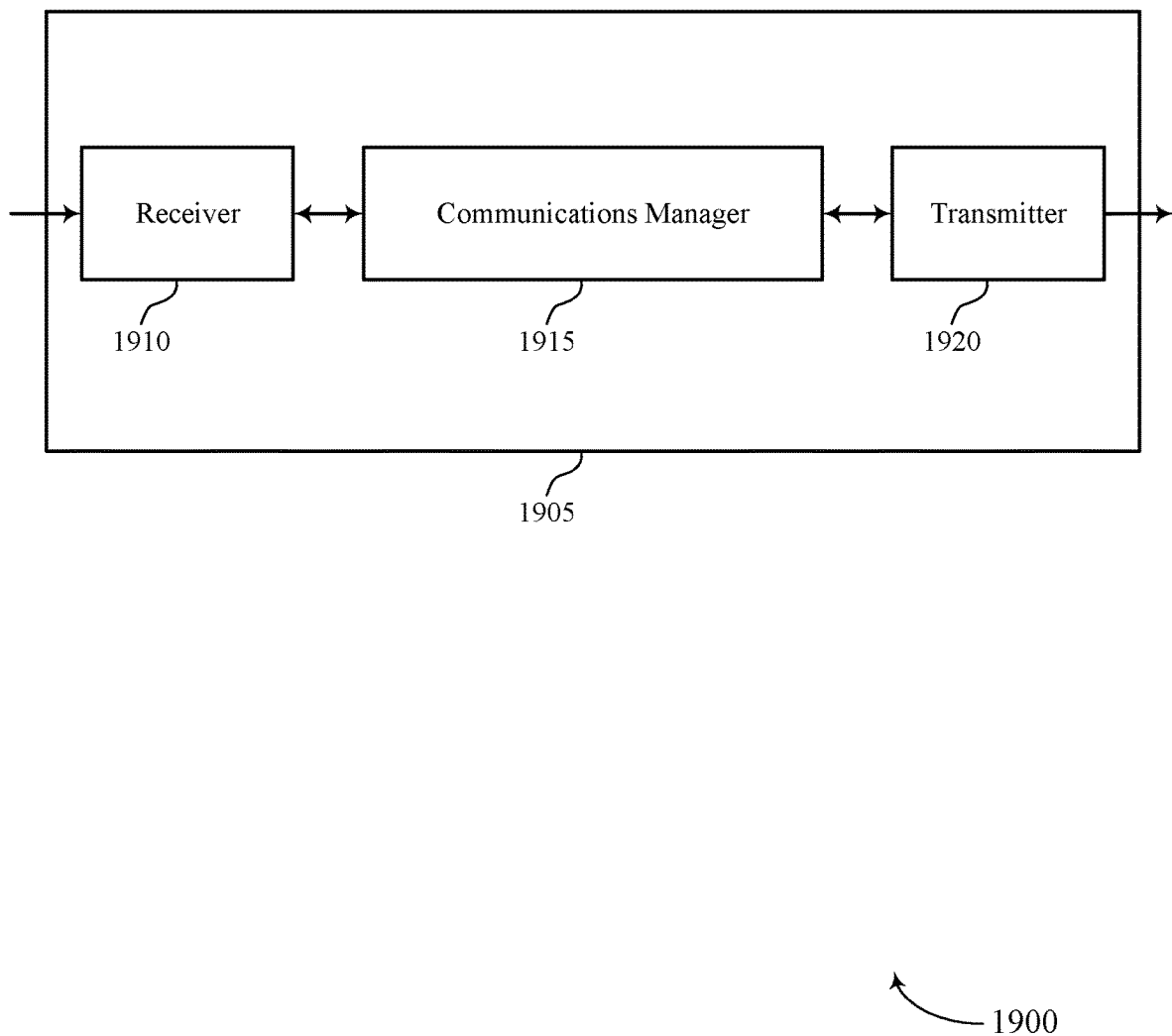
FIGS. 19 and 20 show block diagrams of devices that support techniques for updating resource types in accordance with aspects of the present disclosure.

FIG. 19 shows a block diagram 1900 of a device 1905 that supports techniques for updating resource types in accordance with aspects of the present disclosure. The device 1905 may be an example of aspects of a parent node (e.g., parent IAB node, donor IAB node, etc.) as described herein. The device 1905 may include a receiver 1910, a communications manager 1915, and a transmitter 1920. The device 1905 may also include a processor. Each of these components may be in communication with one another (e.g., via one or more buses).

The receiver 1910 may receive information such as packets, user data, or control information associated with various information channels (e.g., control channels, data channels, and information related to techniques for updating resource types, etc.). Information may be passed on to other components of the device 1905. The receiver 1910 may be an example of aspects of the transceiver 2220 described with reference to FIG. 22. The receiver 1910 may utilize a single antenna or a set of antennas.

The communications manager 1915 may establish a first link between the parent access node and a child access node, transmit downlink signaling indicating release of the resource, and determine to release a resource of the first link that corresponds to a parent-controlled resource of the child access node. The communications manager 1915 may also transmit, via a group-common control channel, a first TTI format indicator that indicates a first TTI format and a number of TTIs to which the TTI format applies, the number of TTIs exceeding a periodicity of the group-common control channel, select a second TTI format for a subset of the number of TTIs, and communicate in accordance with the second TTI format for the subset of the number of TTIs. The communications manager 1915 may be an example of aspects of the communications manager 2210 described herein.

The communications manager 1915, or its sub-components, may be implemented in hardware, code (e.g., software or firmware) executed by a processor, or any combination thereof. If implemented in code executed by a processor, the functions of the communications manager 1915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure. In some cases, the communications manager 1915 may be a processor (e.g., a transceiver processor, or a radio processor, or a receiver processor). The processor may be coupled with memory and execute instructions stored in the memory that enable the processor to perform or facilitate the features discussed herein. A transceiver processor may be collocated with and/or communicate with (e.g., direct the operations of) a transceiver of the device. A radio processor may be collocated with and/or communicate with (e.g., direct the operations of) a radio (e.g., an LTE radio or a Wi-Fi radio) of the device. A receiver processor may be collocated with and/or communicate with (e.g., direct the operations of) a receiver of the device.

The communications manager 1915, or its sub-components, may be physically located at various positions, including being distributed such that portions of functions are implemented at different physical locations by one or more physical components. In some examples, the communications manager 1915, or its sub-components, may be a separate and distinct component in accordance with various aspects of the present disclosure. In some examples, the communications manager 1915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1920 may transmit signals generated by other components of the device 1905. In some examples, the transmitter 1920 may be collocated with a receiver 1910 in a transceiver module. For example, the transmitter 1920 may be an example of aspects of the transceiver 2220 described with reference to FIG. 22. The transmitter 1920 may utilize a single antenna or a set of antennas.

Figure 20:
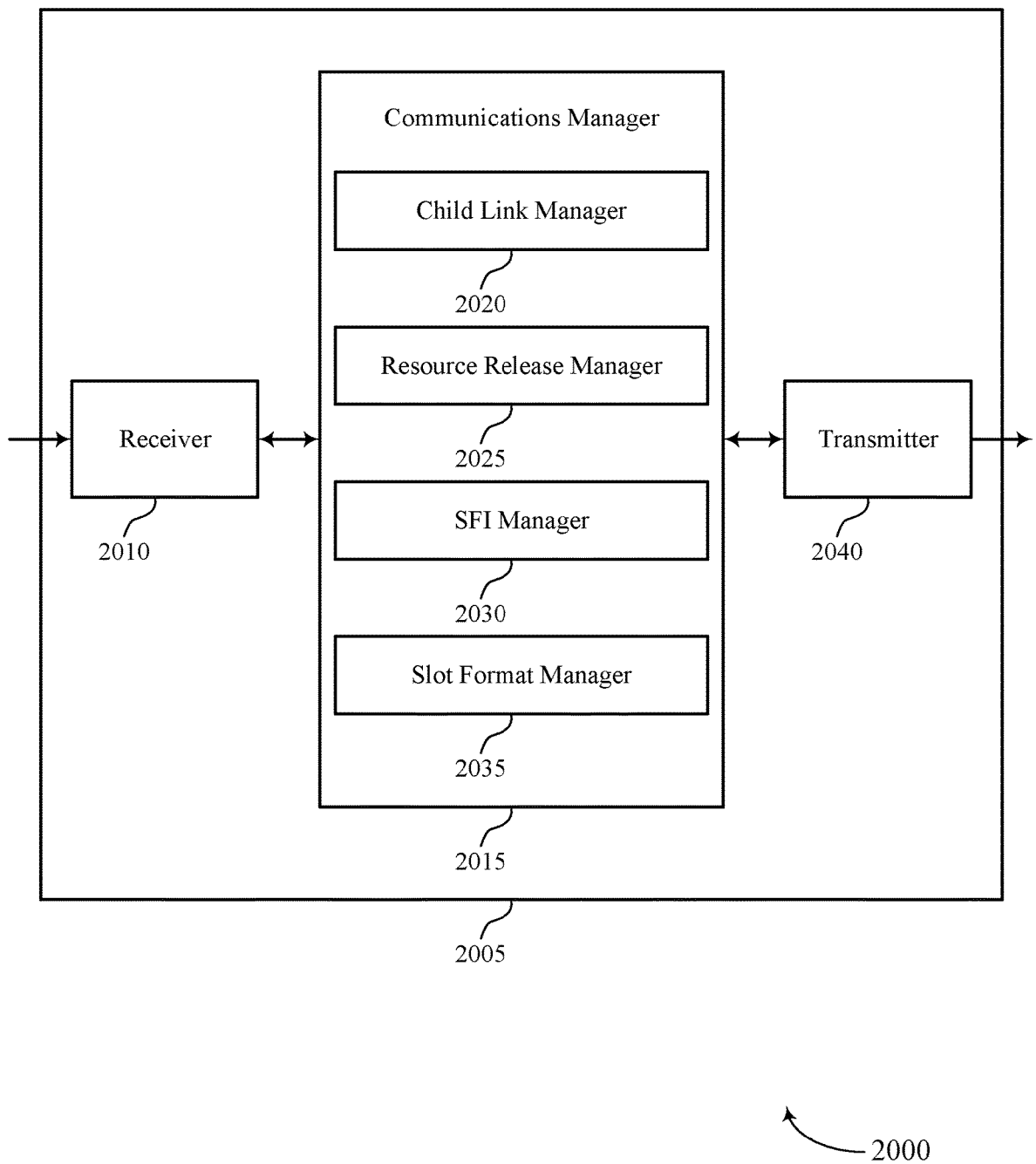

FIG. 20 shows a block diagram 2000 of a device 2005 that supports techniques for updating resource types in accordance with aspects of the present disclosure. The device 2005 may be an example of aspects of a device 1905, or a parent node (e.g., parent IAB node, donor IAB node, etc.) as described herein. The device 2005 may include a receiver 2010, a communications manager 2015, and a transmitter 2040. The device 2005 may also include a processor. Each of these components may be in communication with one another (e.g., via one or more buses).

The receiver 2010 may receive information such as packets, user data, or control information associated with various information channels (e.g., control channels, data channels, and information related to techniques for updating resource types, etc.). Information may be passed on to other components of the device 2005. The receiver 2010 may be an example of aspects of the transceiver 2220 described with reference to FIG. 22. The receiver 2010 may utilize a single antenna or a set of antennas.

The communications manager 2015 may be an example of aspects of the communications manager 1915 as described herein. The communications manager 2015 may include a child link manager 2020, a resource release manager 2025, a SFI manager 2030, and a slot format manager 2035. The communications manager 2015 may be an example of aspects of the communications manager 2210 described herein. In some cases, the child link manager 2020, resource release manager 2025, SFI manager 2030, and slot format manager 2035 may be one or more processors (e.g., transceiver processors, or radio processors, or receiver processors). The one or more processors may be coupled with memory and execute instructions stored in the memory that enable the processor to perform or facilitate the features discussed herein. A transceiver processor may be collocated with and/or communicate with (e.g., direct the operations of) a transceiver of the device. A radio processor may be collocated with and/or communicate with (e.g., direct the operations of) a radio (e.g., an LTE radio or a Wi-Fi radio) of the device. A receiver processor may be collocated with and/or communicate with (e.g., direct the operations of) a receiver of the device.

The child link manager 2020 may establish a first link between the parent access node and a child access node and transmit downlink signaling indicating release of the resource.

The resource release manager 2025 may determine to release a resource of the first link that corresponds to a parent-controlled resource of the child access node.

The SFI manager 2030 may transmit, via a group-common control channel, a first TTI format indicator that indicates a first TTI format and a number of TTIs to which the TTI format applies, the number of TTIs exceeding a periodicity of the group-common control channel.

The slot format manager 2035 may select a second TTI format for a subset of the number of TTIs and communicate in accordance with the second TTI format for the subset of the number of TTIs.

The transmitter 2040 may transmit signals generated by other components of the device 2005. In some examples, the transmitter 2040 may be collocated with a receiver 2010 in a transceiver module. For example, the transmitter 2040 may be an example of aspects of the transceiver 2220 described with reference to FIG. 22. The transmitter 2040 may utilize a single antenna or a set of antennas.

Figure 21:
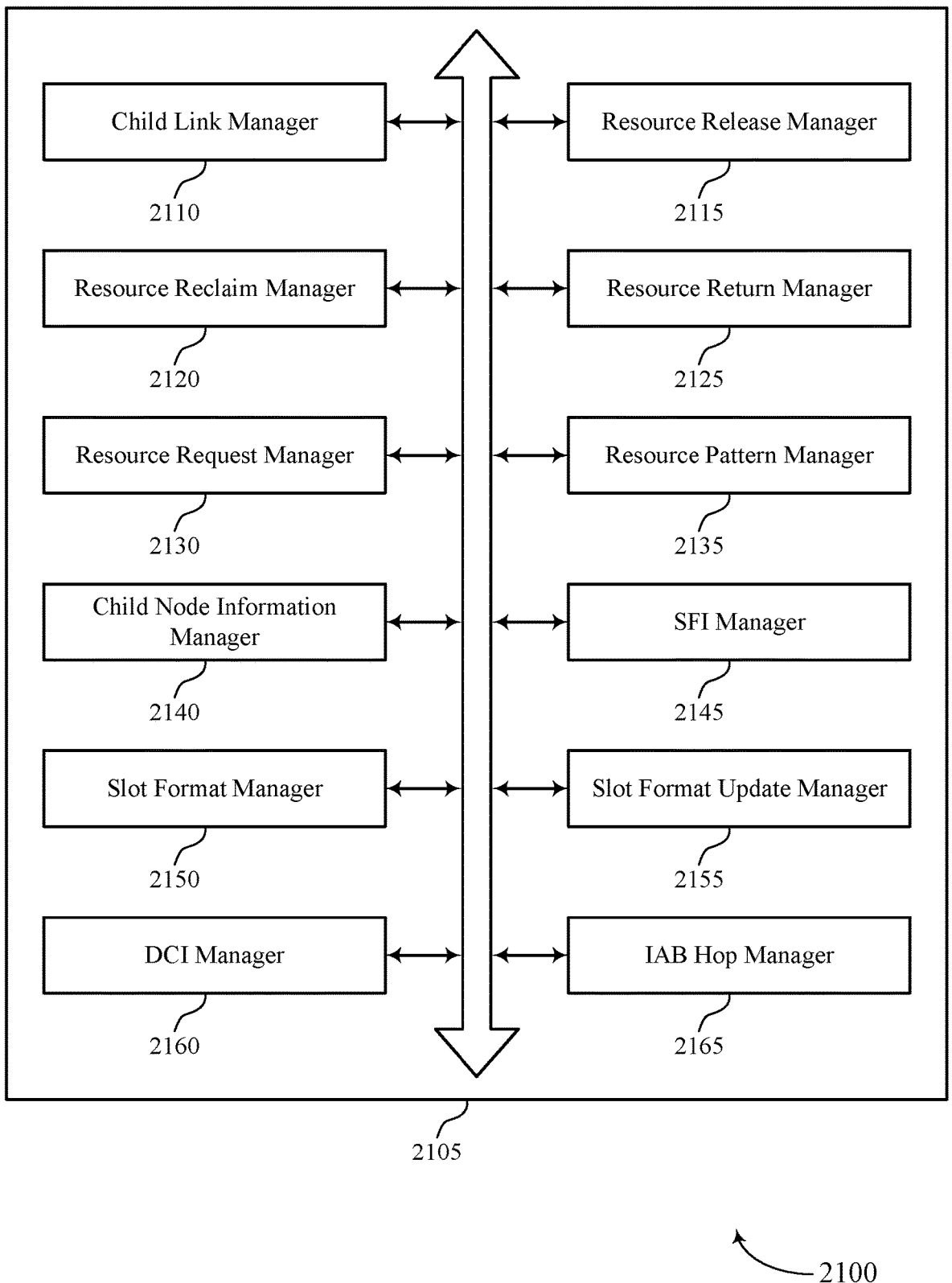
FIG. 21 shows a block diagram of a communications manager that supports techniques for updating resource types in accordance with aspects of the present disclosure.

FIG. 21 shows a block diagram 2100 of a communications manager 2105 that supports techniques for updating resource types in accordance with aspects of the present disclosure. The communications manager 2105 may be an example of aspects of a communications manager 1915, a communications manager 2015, or a communications manager 2210 described herein. The communications manager 2105 may include a child link manager 2110, a resource release manager 2115, a resource reclaim manager 2120, a resource return manager 2125, a resource request manager 2130, a resource pattern manager 2135, a child node information manager 2140, a SFI manager 2145, a slot format manager 2150, a slot format update manager 2155, a DCI manager 2160, and an IAB hop manager 2165. Each of these modules may communicate, directly or indirectly, with one another (e.g., via one or more buses).

In some cases, the child link manager 2110, resource release manager 2115, resource reclaim manager 2120, resource return manager 2125, resource request manager 2130, resource pattern manager 2135, child node information manager 2140, SFI manager 2145, slot format manager 2150, slot format update manager 2155, DCI manager 2160, and IAB hop manager 2165 may be one or more processors (e.g., transceiver processors, or radio processors, or receiver processors). The one or more processors may be coupled with memory and execute instructions stored in the memory that enable the processor to perform or facilitate the features discussed herein. A transceiver processor may be collocated with and/or communicate with (e.g., direct the operations of) a transceiver of the device. A radio processor may be collocated with and/or communicate with (e.g., direct the operations of) a radio (e.g., an LTE radio or a Wi-Fi radio) of the device. A receiver processor may be collocated with and/or communicate with (e.g., direct the operations of) a receiver of the device.

The child link manager 2110 may establish a first link between the parent access node and a child access node. In some examples, the child link manager 2110 may transmit downlink signaling indicating release of the resource.

The resource release manager 2115 may determine to release a resource of the first link that corresponds to a parent-controlled resource of the child access node. In some examples, the resource release manager 2115 may transmit the downlink signaling indicating timing information for the release of the resource. In some cases, the timing information indicates a single time period or a semi-persistent time period for the resource release. In some cases, the downlink signaling indicates at least one distributed unit of the child access node to which the downlink signaling applies. In some cases, the downlink signaling indicating the resource release is a TTI indicator message carried by a group-common physical downlink control channel, a downlink control information scheduling grant carried by a physical downlink control channel, or a MAC CE.

The SFI manager 2145 may transmit, via a group-common control channel, a first TTI format indicator that indicates a first TTI format and a number of TTIs to which the TTI format applies, the number of TTIs exceeding a periodicity of the group-common control channel. In some examples, the SFI manager 2145 may transmit, via a second instance of the group-common control channel that occurs before a last TTI of the number of TTIs, a second TTI format indicator. In some examples, the SFI manager 2145 may transmit configuration signaling indicating a first value for a duration indicator that indicates a first number of TTIs to which the first TTI format applies and a second value for the duration indicator that indicates a second number of TTIs to which a second TTI format applies.

The slot format manager 2150 may select a second TTI format for a subset of the number of TTIs. In some examples, the slot format manager 2150 may communicate in accordance with the second TTI format for the subset of the number of TTIs.

The resource reclaim manager 2120 may transmit second downlink signaling indicating that at least a portion of a resource corresponding to the resource release is being reclaimed.

The resource return manager 2125 may receive an uplink message indicating that at least a portion of the resource is not being used. In some examples, the resource return manager 2125 may schedule a transmission via the at least the portion of the resource.

In some cases, the uplink message is a physical uplink control channel message or an uplink medium access control message. The resource request manager 2130 may receive an indication of a request for the parent-controlled resource, where transmitting the downlink signaling is based on the indication. In some examples, the resource request manager 2130 may receive the request as a physical uplink control channel message, an uplink medium access control message, or a radio resource control message. In some examples, the resource request manager 2130 may receive at least one of a traffic load indicator or resource utilization indicator to indicate the request, where transmitting the downlink signaling is based on receiving the traffic load indicator or the resource utilization indicator.

The resource pattern manager 2135 may transmit a semi-static resource pattern of the parent access node to the child access node.

The child node information manager 2140 may transmit, to the child access node, child access node information corresponding to a second child access node of the parent access node.

The slot format update manager 2155 may transmit, via a downlink control channel, downlink control information including a cancellation indicator that indicates to cancel the first TTI format indicator for the subset of the number of TTIs. In some examples, the slot format update manager 2155 may select a second TTI format based on determining to reclaim the subset of the number of TTIs. In some examples, the slot format update manager 2155 may select a default TTI format for the subset of the number of TTIs. In some examples, the slot format update manager 2155 may determine to select the second format based on the number of overlapping TTIs and the number of downstream nodes.

The DCI manager 2160 may transmit downlink control information generated based on the TTI format indicator and the first value for the duration indicator. In some examples, the DCI manager 2160 may transmit, via a second instance of the group-common control channel, downlink control information generated based on the second value for the duration indicator and an indicator of the second TTI format.

The IAB hop manager 2165 may determine a number of overlapping TTIs of the first TTI format and the second TTI format and a number of downstream access nodes relative to the parent access node.

Figure 22:
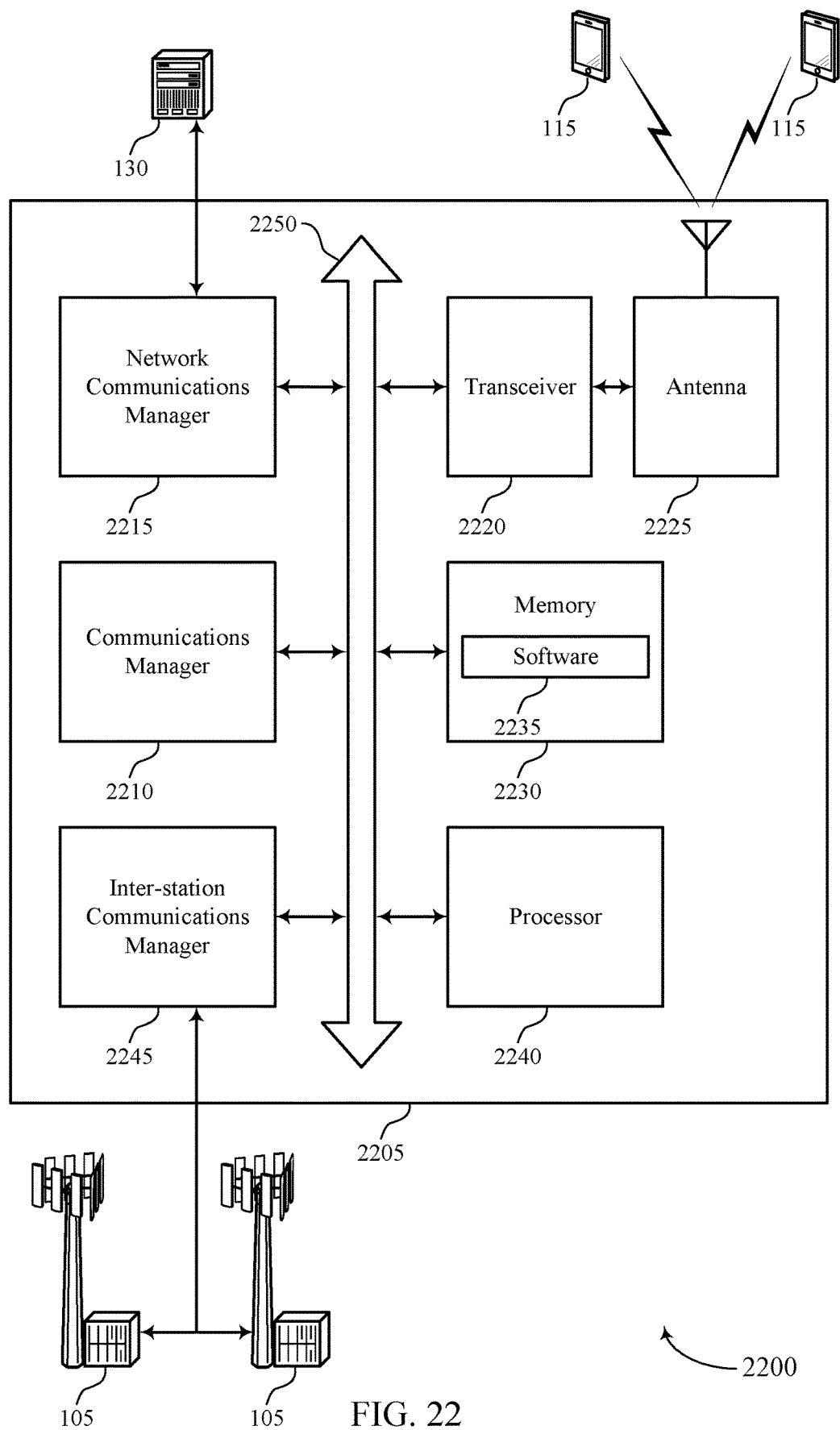
FIG. 22 shows a diagram of a system including a device that supports techniques for updating resource types in accordance with aspects of the present disclosure.

FIG. 22 shows a diagram of a system 2200 including a device 2205 that supports techniques for updating resource types in accordance with aspects of the present disclosure. The device 2205 may be an example of or include the components of device 1905, device 2005, or a parent node (e.g., parent IAB node, donor IAB node, etc.) as described herein. The device 2205 may include components for bi-directional voice and data communications including components for transmitting and receiving communications, including a communications manager 2210, a network communications manager 2215, a transceiver 2220, an antenna 2225, memory 2230, a processor 2240, and an inter-station communications manager 2245. These components may be in electronic communication via one or more buses (e.g., bus 2250).

The communications manager 2210 may establish a first link between the parent access node and a child access node, transmit downlink signaling indicating release of the resource, and determine to release a resource of the first link that corresponds to a parent-controlled resource of the child access node. The communications manager 2210 may also transmit, via a group-common control channel, a first TTI format indicator that indicates a first TTI format and a number of TTIs to which the TTI format applies, the number of TTIs exceeding a periodicity of the group-common control channel, select a second TTI format for a subset of the number of TTIs, and communicate in accordance with the second TTI format for the subset of the number of TTIs. The communications manager 2210 may be implemented with any combination of processor 2240, memory 2230, software 2235, and transceiver 2220, as well as with any other of the described components, to perform the various techniques described herein.

The network communications manager 2215 may manage communications with the core network (e.g., via one or more wired backhaul links). For example, the network communications manager 2215 may manage the transfer of data communications for client devices, such as one or more UEs 115.

The transceiver 2220 may communicate bi-directionally, via one or more antennas, wired, or wireless links as described above. For example, the transceiver 2220 may represent a wireless transceiver and may communicate bi-directionally with another wireless transceiver. The transceiver 2220 may also include a modem to modulate the packets and provide the modulated packets to the antennas for transmission, and to demodulate packets received from the antennas.

In some cases, the wireless device may include a single antenna 2225. However, in some cases the device may have more than one antenna 2225, which may be capable of concurrently transmitting or receiving multiple wireless transmissions.

The memory 2230 may include RAM, ROM, or a combination thereof. The memory 2230 may store computer-readable code or software 2235 including instructions that, when executed by a processor (e.g., the processor 2240) cause the device to perform various functions described herein. In some cases, the memory 2230 may contain, among other things, a BIOS which may control basic hardware or software operation such as the interaction with peripheral components or devices.

The processor 2240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2240 may be configured to operate a memory array using a memory controller. In some cases, a memory controller may be integrated into processor 2240. The processor 2240 may be configured to execute computer-readable instructions stored in a memory (e.g., the memory 2230) to cause the device 2205 to perform various functions (e.g., functions or tasks supporting techniques for updating resource types).

The inter-station communications manager 2245 may manage communications with other network devices 105, and may include a controller or scheduler for controlling communications with child nodes in cooperation with other network devices 105. For example, the inter-station communications manager 2245 may coordinate scheduling for transmissions to child nodes for various interference mitigation techniques such as beamforming or joint transmission. In some examples, the inter-station communications manager 2245 may provide a wireless backhaul link for communication network devices 105. In some cases, the inter-station communications manager 2245 may be implemented with any combination of processor 2240, memory 2230, software 2235, and transceiver 2220, as well as with any other of the described components, to perform the various techniques described herein.

The software 2235 may include instructions to implement aspects of the present disclosure, including instructions to support wireless communications. The software 2235 may be stored in a non-transitory computer-readable medium such as system memory or other type of memory. In some cases, the software 2235 may not be directly executable by the processor 2240 but may cause a computer (e.g., when compiled and executed) to perform functions described herein.

Figure 23:
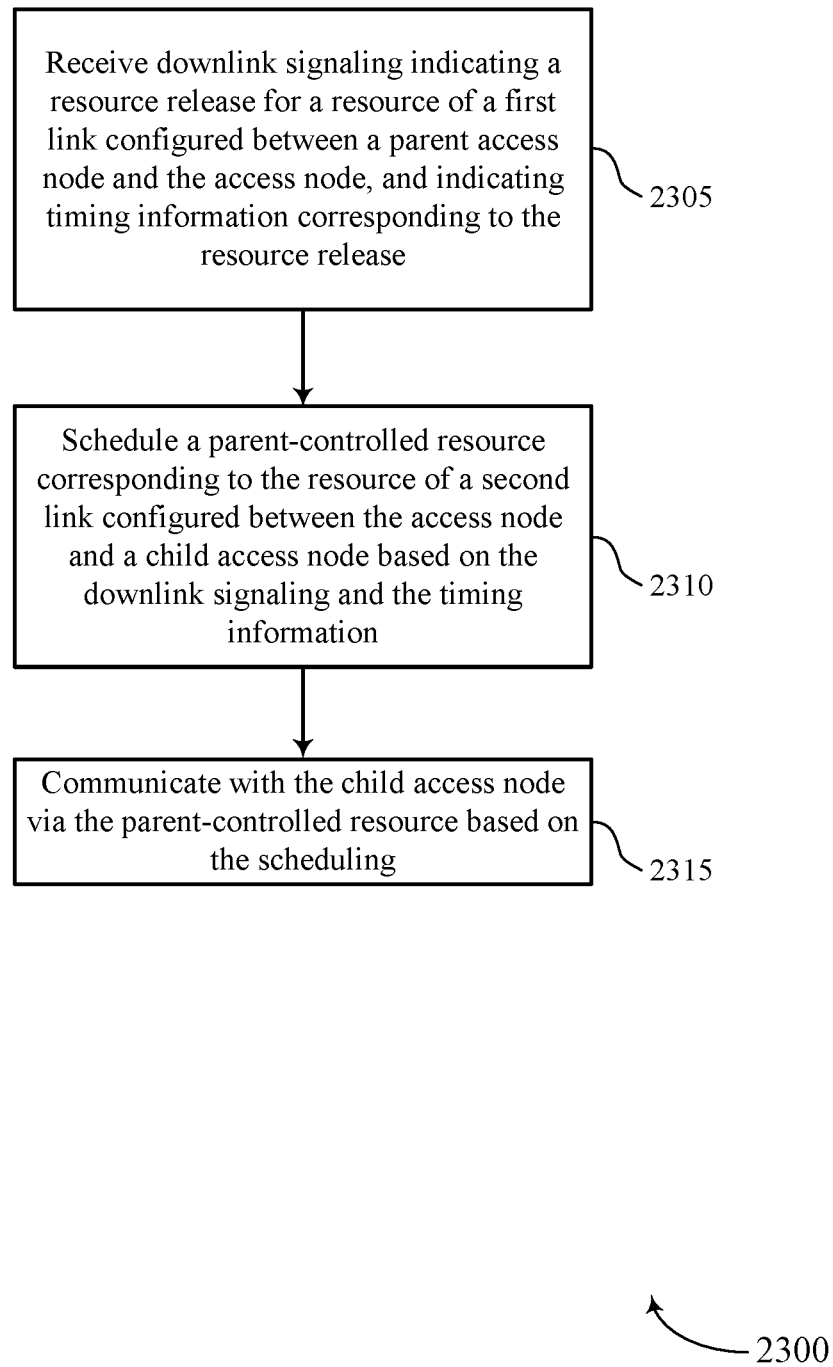
FIGS. 23 through 28 show flowcharts illustrating methods that support techniques for updating resource types in accordance with aspects of the present disclosure.

FIG. 23 shows a flowchart illustrating a method 2300 that supports techniques for updating resource types in accordance with aspects of the present disclosure. The operations of method 2300 may be implemented by an access node (e.g., a network device, IAB node, relay node, etc.) or its components as described herein. For example, the operations of method 2300 may be performed by a communications manager as described with reference to FIGS. 15 through 18. In some examples, an access node may execute a set of instructions to control the functional elements of the access node to perform the functions described below. Additionally or alternatively, a access node may perform aspects of the functions described below using special-purpose hardware.

At 2305, the access node may receive downlink signaling indicating a resource release for a resource of a first link configured between a parent access node and the access node, and indicating timing information corresponding to the resource release. The operations of 2305 may be performed according to the methods described herein. In some examples, aspects of the operations of 2305 may be performed by a resource release manager as described with reference to FIGS. 15 through 18. Additionally or alternatively, means for performing 2305 may, but not necessarily, include, for example, antenna 1825, transceiver 1820, communications manager 1810, memory 1830 (including software 1835), processor 1840 and/or bus 1845.

At 2310, the access node may schedule a parent-controlled resource corresponding to the resource of a second link configured between the access node and a child access node based on the downlink signaling and the timing information. The operations of 2310 may be performed according to the methods described herein. In some examples, aspects of the operations of 2310 may be performed by a Soft Rx manager as described with reference to FIGS. 15 through 18. Additionally or alternatively, means for performing 2310 may, but not necessarily, include, for example, antenna 1825, transceiver 1820, communications manager 1810, memory 1830 (including software 1835), processor 1840 and/or bus 1845.

At 2315, the access node may communicate with the child access node via the parent-controlled resource based on the scheduling. The operations of 2315 may be performed according to the methods described herein. In some examples, aspects of the operations of 2315 may be performed by a child link manager as described with reference to FIGS. 15 through 18. Additionally or alternatively, means for performing 2315 may, but not necessarily, include, for example, antenna 1825, transceiver 1820, communications manager 1810, memory 1830 (including software 1835), processor 1840 and/or bus 1845.

Figure 24:
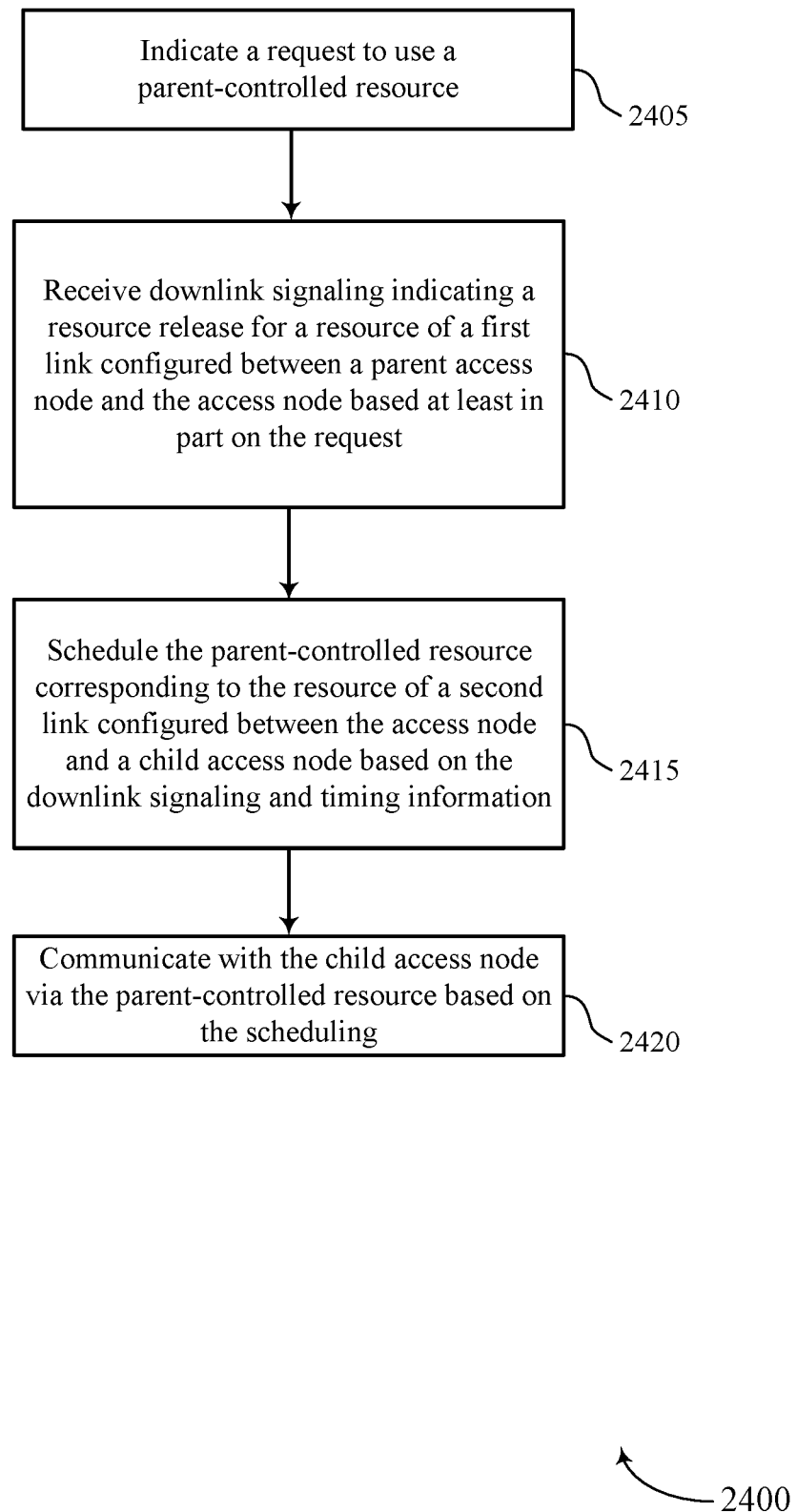

FIG. 24 shows a flowchart illustrating a method 2400 that supports techniques for updating resource types in accordance with aspects of the present disclosure. The operations of method 2400 may be implemented by an access node (e.g., a network device, IAB node, relay node, etc.) or its components as described herein. For example, the operations of method 2400 may be performed by a communications manager as described with reference to FIGS. 15 through 18. In some examples, an access node may execute a set of instructions to control the functional elements of the access node to perform the functions described below. Additionally or alternatively, a access node may perform aspects of the functions described below using special-purpose hardware.

At 2405, the access node may indicate a request to use a parent-controlled resource. The operations of 2405 may be performed according to the methods described herein. In some examples, aspects of the operations of 2405 may be performed by a resource release manager as described with reference to FIGS. 15 through 18. Additionally or alternatively, means for performing 2405 may, but not necessarily, include, for example, antenna 1825, transceiver 1820, communications manager 1810, memory 1830 (including software 1835), processor 1840 and/or bus 1845.

At 2410, the access node may receive downlink signaling indicating a resource release for a resource of a first link configured between a parent access node and the access node based at least in part on the request. The operations of 2405 may be performed according to the methods described herein. In some examples, aspects of the operations of 2405 may be performed by a resource release manager as described with reference to FIGS. 15 through 18. Additionally or alternatively, means for performing 2410 may, but not necessarily, include, for example, antenna 1825, transceiver 1820, communications manager 1810, memory 1830 (including software 1835), processor 1840 and/or bus 1845.

At 2415, the access node may schedule a parent-controlled resource corresponding to the resource of a second link configured between the access node and a child access node based on the downlink signaling and the timing information. The operations of 2415 may be performed according to the methods described herein. In some examples, aspects of the operations of 2415 may be performed by a Soft Rx manager as described with reference to FIGS. 15 through 18. Additionally or alternatively, means for performing 2415 may, but not necessarily, include, for example, antenna 1825, transceiver 1820, communications manager 1810, memory 1830 (including software 1835), processor 1840 and/or bus 1845.

At 2420, the access node may communicate with the child access node via the parent-controlled resource based on the scheduling. The operations of 2420 may be performed according to the methods described herein. In some examples, aspects of the operations of 2420 may be performed by a child link manager as described with reference to FIGS. 15 through 18. Additionally or alternatively, means for performing 2420 may, but not necessarily, include, for example, antenna 1825, transceiver 1820, communications manager 1810, memory 1830 (including software 1835), processor 1840 and/or bus 1845.

Figure 25:
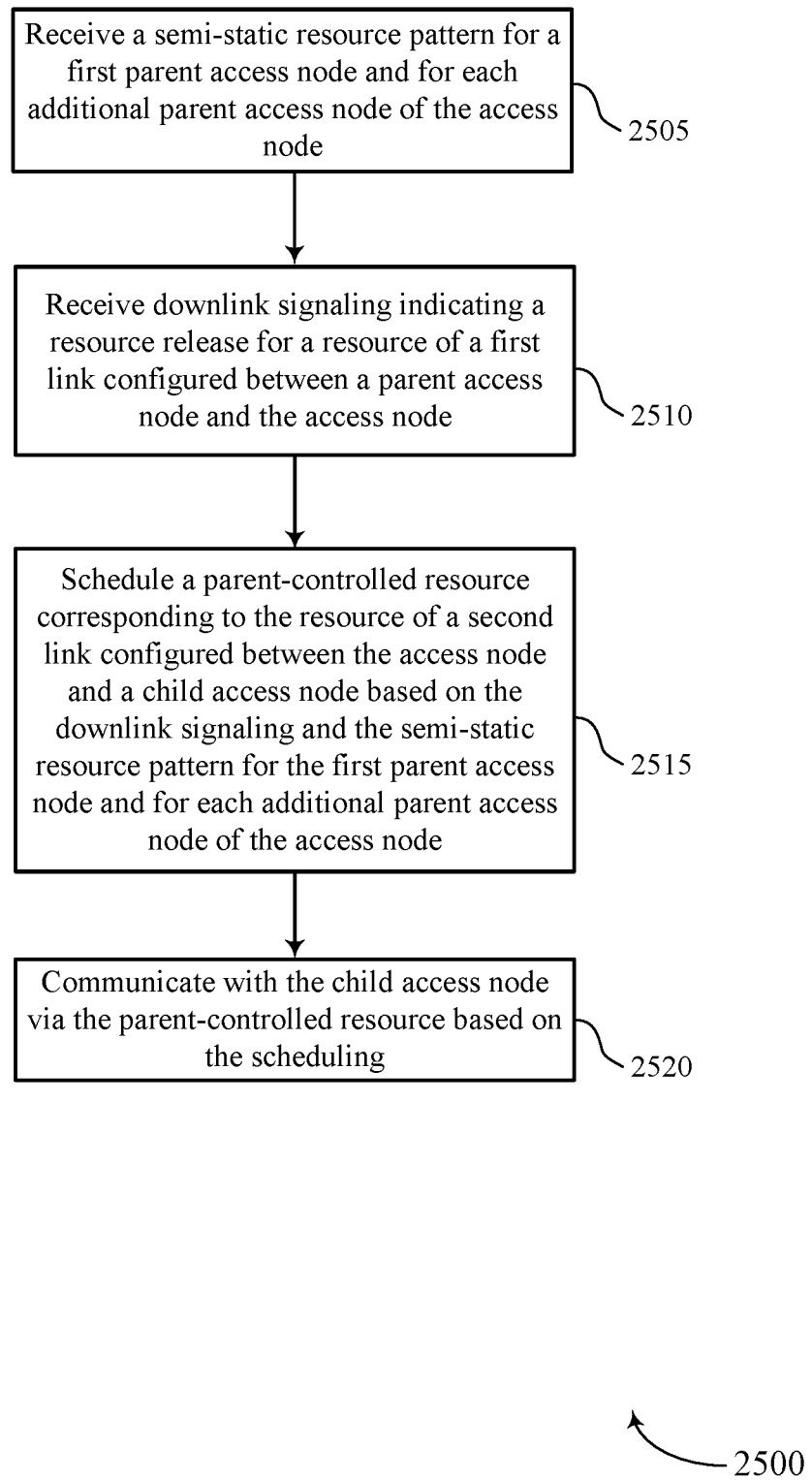

FIG. 25 shows a flowchart illustrating a method 2500 that supports techniques for updating resource types in accordance with aspects of the present disclosure. The operations of method 2500 may be implemented by an access node (e.g., a network device, IAB node, relay node, etc.) or its components as described herein. For example, the operations of method 2500 may be performed by a communications manager as described with reference to FIGS. 15 through 18. In some examples, an access node may execute a set of instructions to control the functional elements of the access node to perform the functions described below. Additionally or alternatively, a access node may perform aspects of the functions described below using special-purpose hardware.

At 2505, the access node may receive a semi-static resource pattern for a first parent access node and for each additional parent access node of the access node. The operations of 2505 may be performed according to the methods described herein. In some examples, aspects of the operations of 2505 may be performed by a resource release manager as described with reference to FIGS. 15 through 18. Additionally or alternatively, means for performing 2505 may, but not necessarily, include, for example, antenna 1825, transceiver 1820, communications manager 1810, memory 1830 (including software 1835), processor 1840 and/or bus 1845.

At 2510, the access node may receive downlink signaling indicating a resource release for a resource of a first link configured between a parent access node and the access node, and indicating timing information corresponding to the resource release. The operations of 2510 may be performed according to the methods described herein. In some examples, aspects of the operations of 2510 may be performed by a resource release manager as described with reference to FIGS. 15 through 18. Additionally or alternatively, means for performing 2510 may, but not necessarily, include, for example, antenna 1825, transceiver 1820, communications manager 1810, memory 1830 (including software 1835), processor 1840 and/or bus 1845.

At 2515, the access node may schedule a parent-controlled resource corresponding to the resource of a second link configured between the access node and a child access node based on the downlink signaling and the semi-static resource pattern for the first parent access node and for each additional parent access node of the access node. The operations of 2515 may be performed according to the methods described herein. In some examples, aspects of the operations of 2515 may be performed by a Soft Rx manager as described with reference to FIGS. 15 through 18. Additionally or alternatively, means for performing 2515 may, but not necessarily, include, for example, antenna 1825, transceiver 1820, communications manager 1810, memory 1830 (including software 1835), processor 1840 and/or bus 1845.

At 2520, the access node may communicate with the child access node via the parent-controlled resource based on the scheduling. The operations of 2520 may be performed according to the methods described herein. In some examples, aspects of the operations of 2520 may be performed by a child link manager as described with reference to FIGS. 15 through 18. Additionally or alternatively, means for performing 2520 may, but not necessarily, include, for example, antenna 1825, transceiver 1820, communications manager 1810, memory 1830 (including software 1835), processor 1840 and/or bus 1845.

Figure 26:
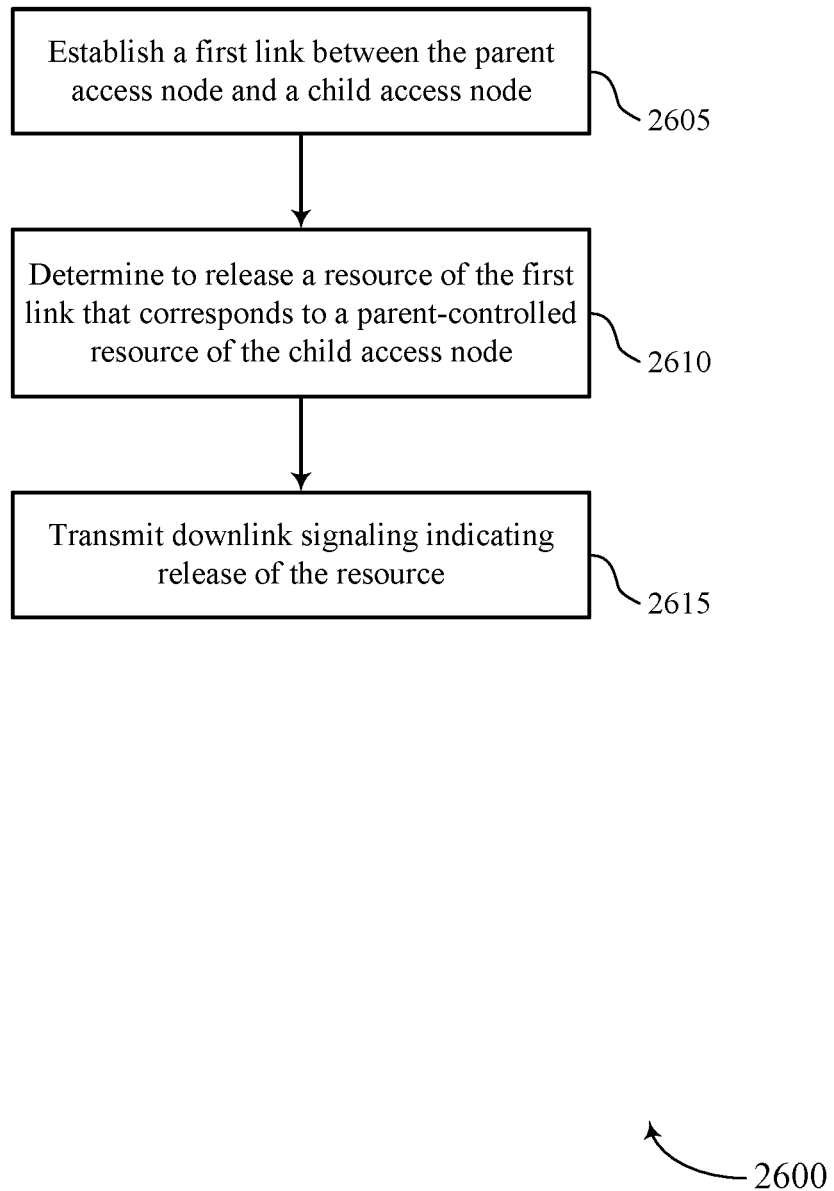

FIG. 26 shows a flowchart illustrating a method 2600 that supports techniques for updating resource types in accordance with aspects of the present disclosure. The operations of method 2600 may be implemented by a parent node (e.g., a parent IAB node, a donor IAB node, etc.) or its components as described herein. For example, the operations of method 2600 may be performed by a communications manager as described with reference to FIGS. 19 through 22. In some examples, a base station may execute a set of instructions to control the functional elements of the base station to perform the functions described below. Additionally or alternatively, a base station may perform aspects of the functions described below using special-purpose hardware.

At 2605, the parent node may establish a first link between the parent access node and a child access node. The operations of 2605 may be performed according to the methods described herein. In some examples, aspects of the operations of 2605 may be performed by a child link manager as described with reference to FIGS. 19 through 22. Additionally or alternatively, means for performing 2605 may, but not necessarily, include, for example, antenna 2225, transceiver 2220, communications manager 2210, memory 2230 (including software 2235), processor 2240 and/or bus 2245.

At 2610, the parent node may determine to release a resource of the first link that corresponds to a parent-controlled resource of the child access node. The operations of 2610 may be performed according to the methods described herein. In some examples, aspects of the operations of 2610 may be performed by a resource release manager as described with reference to FIGS. 19 through 22. Additionally or alternatively, means for performing 2610 may, but not necessarily, include, for example, antenna 2225, transceiver 2220, communications manager 2210, memory 2230 (including software 2235), processor 2240 and/or bus 2245.

At 2615, the parent node may transmit downlink signaling indicating release of the resource. The operations of 2615 may be performed according to the methods described herein. In some examples, aspects of the operations of 2615 may be performed by a child link manager as described with reference to FIGS. 19 through 22. Additionally or alternatively, means for performing 2615 may, but not necessarily, include, for example, antenna 2225, transceiver 2220, communications manager 2210, memory 2230 (including software 2235), processor 2240 and/or bus 2245.

Figure 27:
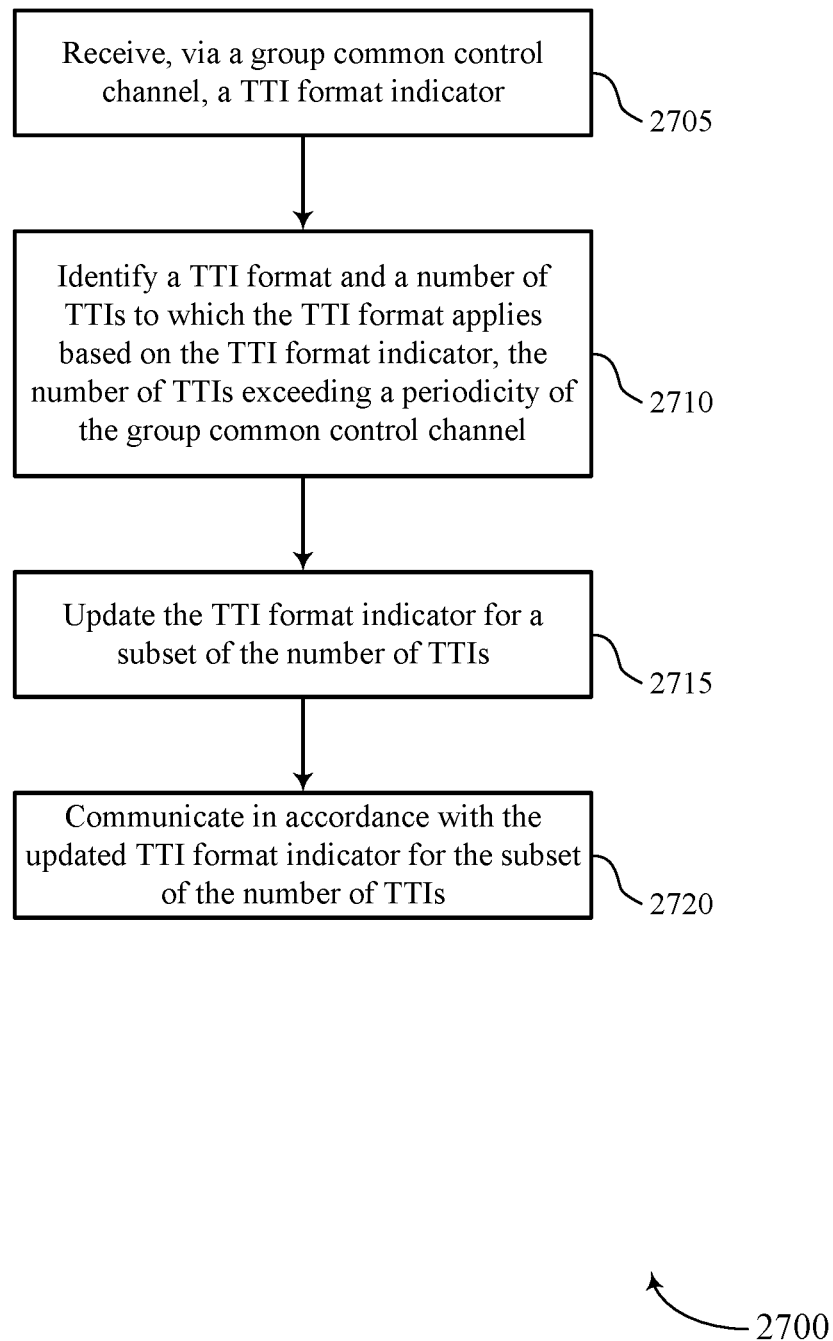

FIG. 27 shows a flowchart illustrating a method 2700 that supports techniques for updating resource types in accordance with aspects of the present disclosure. The operations of method 2700 may be implemented by an access node (e.g., a network device, IAB node, relay node, etc.) or its components as described herein. For example, the operations of method 2700 may be performed by a communications manager as described with reference to FIGS. 15 through 18. In some examples, an access node may execute a set of instructions to control the functional elements of the access node to perform the functions described below. Additionally or alternatively, an access node may perform aspects of the functions described below using special-purpose hardware.

At 2705, the access node may receive, via a group-common control channel, a TTI format indicator. The operations of 2705 may be performed according to the methods described herein. In some examples, aspects of the operations of 2705 may be performed by a SFI manager as described with reference to FIGS. 15 through 18. Additionally or alternatively, means for performing 2705 may, but not necessarily, include, for example, antenna 1825, transceiver 1820, communications manager 1810, memory 1830 (including software 1835), processor 1840 and/or bus 1845.

At 2710, the access node may identify a TTI format and a number of TTIs to which the TTI format applies based on the TTI format indicator, the number of TTIs exceeding a periodicity of the group-common control channel. The operations of 2710 may be performed according to the methods described herein. In some examples, aspects of the operations of 2710 may be performed by a slot format manager as described with reference to FIGS. 15 through 18. Additionally or alternatively, means for performing 2710 may, but not necessarily, include, for example, antenna 1825, transceiver 1820, communications manager 1810, memory 1830 (including software 1835), processor 1840 and/or bus 1845.

At 2715, the access node may update the TTI format indicator for a subset of the number of TTIs. The operations of 2715 may be performed according to the methods described herein. In some examples, aspects of the operations of 2715 may be performed by a slot format update manager as described with reference to FIGS. 15 through 18. Additionally or alternatively, means for performing 2715 may, but not necessarily, include, for example, antenna 1825, transceiver 1820, communications manager 1810, memory 1830 (including software 1835), processor 1840 and/or bus 1845.

At 2720, the access node may communicate in accordance with the updated TTI format indicator for the subset of the number of TTIs. The operations of 2720 may be performed according to the methods described herein. In some examples, aspects of the operations of 2720 may be performed by a slot format manager as described with reference to FIGS. 15 through 18. Additionally or alternatively, means for performing 2720 may, but not necessarily, include, for example, antenna 1825, transceiver 1820, communications manager 1810, memory 1830 (including software 1835), processor 1840 and/or bus 1845.

Figure 28:
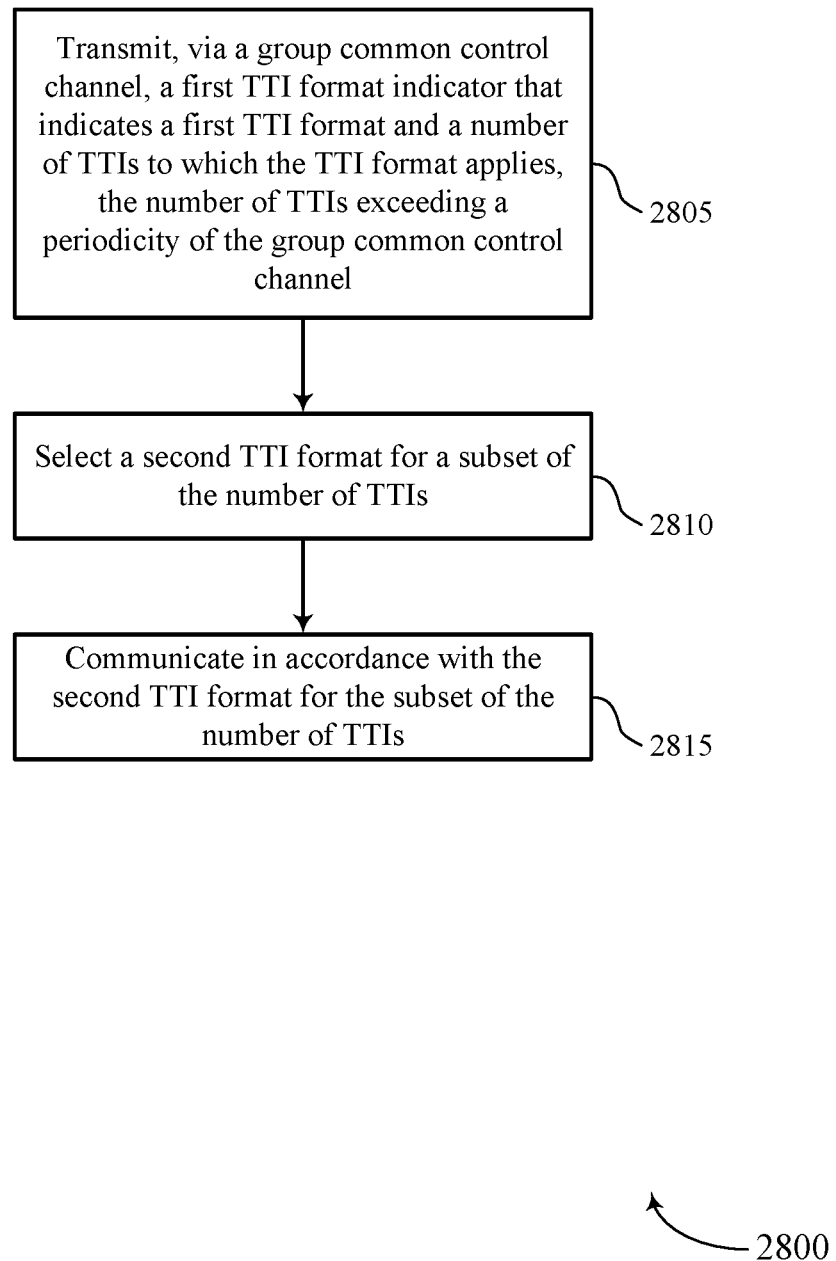

FIG. 28 shows a flowchart illustrating a method 2800 that supports techniques for updating resource types in accordance with aspects of the present disclosure. The operations of method 2800 may be implemented by a parent node or its components as described herein. For example, the operations of method 2800 may be performed by a communications manager as described with reference to FIGS. 19 through 22. In some examples, a parent node may execute a set of instructions to control the functional elements of the parent node to perform the functions described below. Additionally or alternatively, a parent node may perform aspects of the functions described below using special-purpose hardware.

At 2805, the parent node may transmit, via a group-common control channel, a first TTI format indicator that indicates a first TTI format and a number of TTIs to which the TTI format applies, the number of TTIs exceeding a periodicity of the group-common control channel. The operations of 2805 may be performed according to the methods described herein. In some examples, aspects of the operations of 2805 may be performed by a SFI manager as described with reference to FIGS. 19 through 22. Additionally or alternatively, means for performing 2805 may, but not necessarily, include, for example, antenna 2225, transceiver 2220, communications manager 2210, memory 2230 (including software 2235), processor 2240 and/or bus 2245.

At 2810, the parent node may select a second TTI format for a subset of the number of TTIs. The operations of 2810 may be performed according to the methods described herein. In some examples, aspects of the operations of 2810 may be performed by a slot format manager as described with reference to FIGS. 19 through 22. Additionally or alternatively, means for performing 2810 may, but not necessarily, include, for example, antenna 2225, transceiver 2220, communications manager 2210, memory 2230 (including software 2235), processor 2240 and/or bus 2245.

At 2815, the parent node may communicate in accordance with the second TTI format for the subset of the number of TTIs. The operations of 2815 may be performed according to the methods described herein. In some examples, aspects of the operations of 2815 may be performed by a slot format manager as described with reference to FIGS. 19 through 22. Additionally or alternatively, means for performing 2815 may, but not necessarily, include, for example, antenna 2225, transceiver 2220, communications manager 2210, memory 2230 (including software 2235), processor 2240 and/or bus 2245.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication by an access node, comprising:
   a processor,
   memory in electronic communication with the processor; and
   instructions stored in the memory and executable by the processor to cause the apparatus to:
   receive a semi-static resource pattern for a first parent access node and for each additional parent access node of the access node;
   receive downlink signaling indicating a resource release for a resource of a first link configured between the first parent access node and the access node;
   determine that the resource released on the first link is available on a second link configured between a second parent access node and the access node based at least in part on the semi-static resource pattern;
   schedule a parent-controlled resource, corresponding to the resource released on the first link, of a third link configured between the access node and a child access node based at least in part on the resource release for the resource of the first link and the resource released on the first link being available on the second link; and
   communicate with the child access node via the parent-controlled resource based at least in part on the scheduling.

2. The apparatus of claim 1, wherein the instructions to schedule the parent-controlled resource of the third link further are executable by the processor to cause the apparatus to:
   identify that a resource type of a resource corresponding to the resource release for the each additional parent access node is a not available resource type; and
   schedule a subset of a plurality of distributed units of the access node to which the downlink signaling corresponds based at least in part on the downlink signaling and the resource type.

3. The apparatus of claim 1, wherein the instructions to schedule the parent-controlled resource further are executable by the processor to cause the apparatus to:
  determine that a corresponding resource type for a corresponding resource for the each additional parent access node is a resource type based at least in part on the semi-static resource pattern.

4. The apparatus of claim 3, wherein the instructions to schedule the parent-controlled resource further are executable by the processor to cause the apparatus to:
  monitor for second downlink signaling indicating a second resource release for a fourth link between at least one additional parent access node and the access node based at least in part on the resource type; and
  determine to schedule the parent-controlled resource based at least in part on receiving the second downlink signaling indicating the second resource release.

5. The apparatus of claim 3, wherein the instructions to schedule the parent-controlled resource further are executable by the processor to cause the apparatus to:
  monitor for second downlink signaling indicating a second resource release for a fourth link between at least one additional parent access node and the access node based at least in part on the resource type; and
  determine not to schedule the parent-controlled resource based at least in part on determining that the second downlink signaling has not been received.

6. The apparatus of claim 1, wherein the instructions to schedule the parent-controlled resource further are executable by the processor to cause the apparatus to:
  receive child access node information corresponding to a first child access node of the first parent access node, wherein the parent-controlled resource is scheduled based at least in part on the child access node information.

7. The apparatus of claim 1, wherein the instructions are further executable by the processor to cause the apparatus to:
  determine that a second child link has been established with a second child access node; and
  transmit, to the child access node, second child access node information of the second child access node.

8. The apparatus of claim 7, wherein the instructions to transmit the second child access node information further are executable by the processor to cause the apparatus to:
  transmit the second child access node information indicating a resource pattern of a distributed unit of the access node for the second child access node.

9. The apparatus of claim 7, wherein the instructions to transmit the second child access node information further are executable by the processor to cause the apparatus to:
  transmit the second child access node information indicating a dynamic downlink indication for controlling a resource of the second child access node.

10. The apparatus of claim 7, wherein the instructions to transmit the second child access node information further are executable by the processor to cause the apparatus to:
  transmit the second child access node information indicating a semi-static slot format configuration or a dynamic slot format configuration of the second child access node.

11. The apparatus of claim 7, wherein the instructions to transmit the second child access node information further are executable by the processor to cause the apparatus to:
  transmit the second child access node information indicating a semi-static resource allocation or a dynamic resource allocation scheduled by a grant for the second child access node.

12. The apparatus of claim 1, wherein the downlink signaling indicating the resource release is a slot format indicator (SFI) message carried by a group-common physical downlink control channel, a downlink control information scheduling grant carried by a physical downlink control channel, or a medium access control (MAC) control element.

13. The apparatus of claim 1, wherein the instructions to receive the downlink signaling further are executable by the processor to cause the apparatus to:
  receive an indication that the resource release is a one-time resource release or a semi-persistent resource release.

14. A method for wireless communications by an access node, comprising:
  receiving a semi-static resource pattern for a first parent access node and for each additional parent access node of the access node;
  receiving downlink signaling indicating a resource release for a resource of a first link configured between the first parent access node and the access node;
  determining that the resource released on the first link is available on a second link configured between a second parent access node and the access node based at least in part on the semi-static resource pattern;
  scheduling a parent-controlled resource, corresponding to the resource released on the first link, of a third link configured between the access node and a child access node based at least in part on the resource release for the resource of the first link and the resource released on the first link being available on the second link; and
  communicating with the child access node via the parent-controlled resource based at least in part on the scheduling.

15. The method of claim 14, wherein scheduling the parent-controlled resource of the third link further comprises:
  identifying that a resource type of a resource of at least one of the each additional parent access node that corresponds to the resource of the first link is a not available resource type; and
  scheduling a subset of a plurality of distributed units of the access node to which the downlink signaling corresponds based at least in part on the downlink signaling and the resource type.

16. The method of claim 14, wherein scheduling the parent-controlled resource further comprises:
  determining that a corresponding resource type for a corresponding resource for the each additional parent access node is a resource type based at least in part on the semi-static resource pattern.

17. The method of claim 16, wherein scheduling the parent-controlled resource further comprises:
  monitoring for second downlink signaling indicating a second resource release for a fourth link between at least one additional parent access node and the access node based at least in part on the resource type; and
  determining to schedule the parent-controlled resource based at least in part on receiving the second downlink signaling indicating the second resource release.

18. The method of claim 16, wherein scheduling the parent-controlled resource further comprises:
  monitoring for second downlink signaling indicating a second resource release for a fourth link between at least one additional parent access node and the access node based at least in part on the resource type; and determining not to schedule the parent-controlled resource based at least in part on determining that the second downlink signaling has not been received.

19. The method of claim 14, wherein scheduling the parent-controlled resource further comprises:
receiving child access node information corresponding to a first child access node of the first parent access node, wherein the parent-controlled resource is scheduled based at least in part on the child access node information.

20. The method of claim 14, further comprising:
determining that a second child link has been established with a second child access node; and
transmitting, to the child access node, second child access node information of the second child access node.

21. The method of claim 20, wherein transmitting the second child access node information further comprises:
transmitting the second child access node information indicating a resource pattern of a distributed unit of the access node for the second child access node.

22. The method of claim 20, wherein transmitting the second child access node information further comprises:
transmitting the second child access node information indicating a dynamic downlink indication for controlling a resource of the second child access node.

23. The method of claim 20, wherein transmitting the second child access node information further comprises:
transmitting the second child access node information indicating a semi-static slot format configuration or a dynamic slot format configuration of the second child access node.

24. The method of claim 20, wherein transmitting the second child access node information further comprises:
transmit the second child access node information indicating a semi-static resource allocation or a dynamic resource allocation scheduled by a grant for the second child access node.

25. The method of claim 14, wherein the downlink signaling indicating the resource release is a slot format indicator (SFI) message carried by a group-common physical downlink control channel, a downlink control information scheduling grant carried by a physical downlink control channel, or a medium access control (MAC) control element.

26. An apparatus for wireless communications by an access node, comprising:
means for receiving a semi-static resource pattern for a first parent access node and for each additional parent access node of the access node;
means for receiving downlink signaling indicating a resource release for a resource of a first link configured between the first parent access node and the access node;
means for determining that the resource released on the first link is available on a second link configured between a second parent access node and the access node based at least in part on the semi-static resource pattern;
means for scheduling a parent-controlled resource, corresponding to the resource released on the first link, of a third link configured between the access node and a child access node based at least in part on the resource release for the resource of the first link and the resource released on the first link being available on the second link; and
means for communicating with the child access node via the parent-controlled resource based at least in part on the scheduling.

27. The apparatus of claim 26, further comprising:
means for identifying that a resource type of a resource corresponding to the resource release for the each additional parent access node is a not available resource type; and
means for scheduling a subset of a plurality of distributed units of the access node to which the downlink signaling corresponds based at least in part on the downlink signaling and the resource type.

28. The apparatus of claim 26, further comprising:
means for determining that a corresponding resource type for a corresponding resource for the each additional parent access node is a resource type based at least in part on the semi-static resource pattern.

29. A non-transitory computer-readable medium storing code for wireless communications by an access node, the code comprising instructions executable by a processor to:
receive a semi-static resource pattern for a first parent access node and for each additional parent access node of the access node;
receive downlink signaling indicating a resource release for a resource of a first link configured between the first parent access node and the access node;
determine that the resource released on the first link is available on a second link configured between a second parent access node and the access node based at least in part on the semi-static resource pattern;
schedule a parent-controlled resource, corresponding to the resource released on the first link, of a third link configured between the access node and a child access node based at least in part on the resource release for the resource of the first link and the resource released on the first link being available on the second link; and
communicate with the child access node via the parent-controlled resource based at least in part on the scheduling.

30. The non-transitory computer-readable medium of claim 29, wherein the instructions to schedule the parent-controlled resource of the third link further are executable by the processor to:
identify that a resource type of a resource corresponding to the resource release for the each additional parent access node is a not available resource type; and
schedule a subset of a plurality of distributed units of the access node to which the downlink signaling corresponds based at least in part on the downlink signaling and the resource type.

31. The non-transitory computer-readable medium of claim 29, wherein the instructions to schedule the parent-controlled resource further are executable by the processor to:
determine that a corresponding resource type for a corresponding resource for the each additional parent access node is a resource type based at least in part on the semi-static resource pattern.

* * * * *